United States Patent
Gao et al.

(10) Patent No.: US 11,424,803 B2
(45) Date of Patent: Aug. 23, 2022

(54) COMMUNICATION METHOD AND DEVICE

(71) Applicant: HUAWEI TECHNOLOGIES CO., LTD., Guangdong (CN)

(72) Inventors: Xiang Gao, Beijing (CN); Kunpeng Liu, Beijing (CN); Ruiqi Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/349,007

(22) Filed: Jun. 16, 2021

(65) Prior Publication Data
US 2022/0149908 A1    May 12, 2022

Related U.S. Application Data

(63) Continuation of application No. PCT/CN2019/126116, filed on Dec. 17, 2019.

(30) Foreign Application Priority Data

Dec. 17, 2018 (CN) .......................... 201811544609.X

(51) Int. Cl.
 *H04B 7/06* (2006.01)
 *H04B 7/0413* (2017.01)
(52) U.S. Cl.
 CPC ......... *H04B 7/0626* (2013.01); *H04B 7/0413* (2013.01)
(58) Field of Classification Search
 CPC .......... H04B 7/04; H04B 7/06; H04B 7/0413; H04B 7/0456; H04B 7/0617;
 (Continued)

(56) References Cited

U.S. PATENT DOCUMENTS

2013/0201912 A1* 8/2013 Sheng .................. H04B 7/0634
 370/328
2017/0353222 A1 12/2017 Wei et al.
(Continued)

FOREIGN PATENT DOCUMENTS

CN 102325013 A 1/2012
CN 103119860 A 5/2013
(Continued)

OTHER PUBLICATIONS

3GPP TS 38.212 V15.3.0 (Sep. 2018), "3rd Generation Partnership Project; Technical Specification Group Radio Access Network; NR; Multiplexing and channel coding(Release 15)," Sep. 2018, 99 pages.
(Continued)

*Primary Examiner* — Shawkat M Ali
(74) *Attorney, Agent, or Firm* — Fish & Richardson P.C.

(57) ABSTRACT

Example communication methods and devices are provided. One example method includes a first device determines a first channel state information CSI report based on a precoding matrix type, where the precoding matrix type is a compressed type or an uncompressed type. The first device sends the first CSI report to a second device, where the first CSI report includes a CSI part 1 and a CSI part 2, the CSI part 1 indicates a number of bits of the CSI part 2 and the precoding matrix type, the CSI part 2 indicates wideband precoding matrix indicator (PMI) information, the wideband PMI information indicates an oversampling factor of a preset orthogonal beam vector and/or an index of the preset orthogonal beam vector, and the preset orthogonal beam vector is a spatial-domain orthogonal basis vector selected by the first device from a spatial-domain basis vector set.

22 Claims, 5 Drawing Sheets

(58) Field of Classification Search
CPC ....... H04B 7/0626; H04B 7/0663; H04L 1/00; H04L 5/00; H04L 5/0023; H04L 5/0051; H04L 5/0057; H04L 25/02; H04L 25/0224; H04W 28/20; H04W 52/54; H04W 72/02; H04W 72/04; H04W 72/048; H04W 72/0413; H04W 88/08
USPC ........ 370/328, 329, 332; 375/219, 260, 267, 375/295, 316

See application file for complete search history.

(56) References Cited

U.S. PATENT DOCUMENTS

| | | | | |
|---|---|---|---|---|
| 2018/0278315 | A1* | 9/2018 | Wu | H04B 7/0478 |
| 2018/0294848 | A1* | 10/2018 | Park | H04W 24/10 |
| 2018/0295606 | A1 | 10/2018 | Krishnamurthy et al. | |
| 2019/0260429 | A1* | 8/2019 | Xu | H04L 5/0057 |
| 2021/0099992 | A1* | 4/2021 | Mao | H04W 72/085 |

FOREIGN PATENT DOCUMENTS

| | | | |
|---|---|---|---|
| CN | 107888323 | A | 4/2018 |
| CN | 108462519 | A | 8/2018 |
| WO | 2014142506 | A1 | 9/2014 |
| WO | 2017166219 | A1 | 10/2017 |

OTHER PUBLICATIONS

3GPP TS 38.214 V15.3.0 (Sep. 2018), "3rd Generation Partnership Project; Technical Specification Group Radio Access Network; NR; Physical layer procedures for data (Release 15)," Sep. 2018, 96 pages.

Office Action issued in Chinese Application No. 201811544609.X dated Oct. 27, 2020, 12 pages (with English translation).

PCT International Search Report and Written Opinion issued in International Application No. PCT/CN2019/126116 dated Mar. 19, 2020, 13 pages (with English translation).

Qualcomm Incorporated, "CSI Enhancement for MU-MIMO Support," 3GPP TSG RAN WG1 Meeting #94bis, R1-1811276, Chengdu, China, Oct. 8-12, 2018, 6 pages.

Vivo, "Discussion on CSI reporting," 3GPP TSG RAN WG1 Meeting #90bis, R1-1717471, Prague, CZ, Oct. 9-13, 2017, 5 pages.

Extended European Search Report issued in European Application No. 19897971.8 dated Dec. 17, 2021, 11 pages.

Nokia, Nokia Shanghai Bell, "CSI Enhancements for MU-MIMO Support," 3GPP TSG RAN WG1 Meeting #94-bis, R1-1811406, Chengdu, P.R. China, Oct. 8-12, 2018, 14 pages.

Nokia, Nokia Shanghai Bell,"Remaining details on CSI reporting for Type II and Type I codebook," 3GPP TSG RAN WG1 Meeting 90bis, R1-1718510, Prague, CZ, Oct. 9-13, 2017, 10 pages.

Office Action issued in Chinese Application No. 202110796491.5 dated Mar. 16, 2022, 17 pages (with English translation).

* cited by examiner

COMMUNICATION METHOD AND DEVICE

CROSS-REFERENCE TO RELATED APPLICATION

This application is a continuation of International Application No. PCT/CN2019/126116, filed on Dec. 17, 2019, which claims priority to Chinese Patent Application No. 201811544609.X, filed on Dec. 17, 2018. The disclosures of the aforementioned applications are hereby incorporated by reference in their entireties.

TECHNICAL FIELD

Embodiments of this application relate to the communications field, and in particular, to a communication method and a device.

BACKGROUND

Emergence of a multiple input multiple output (multiple input multiple output, MIMO) technology has brought revolutionary changes to wireless communication. A plurality of antennas are deployed on a transmit end and a receive end, so that the MIMO technology can significantly improve performance of a wireless communications system. For example, the MIMO technology can effectively improve transmission reliability in a diversity scenario, and the MIMO technology can greatly increase a transmission throughput in a multiplex scenario.

In a MIMO precoding process, a precoding matrix needs to be used to process a transmit signal. The receive end feeds back a precoding matrix indicator (precoding matrix indicator, PMI) to the transmit end, which is an effective method in which a base station obtains an optimal downlink precoding matrix. Specifically, in a MIMO system, a receive end feeds back information about a selected orthogonal beam vector and a combination coefficient corresponding to each orthogonal beam vector to a transmit end, where the combination coefficient is represented by a quantized amplitude coefficient and a quantized phase coefficient. The transmit end may determine a precoding vector based on the orthogonal beam vector and the combination coefficient corresponding to the orthogonal beam vector, to further improve a channel based on the determined precoding vector, thereby improving transmission reliability.

In the prior art, a receive end needs to report a combination coefficient corresponding to each orthogonal beam vector in each frequency-domain subband to a transmit end. Therefore, a large quantity of combination coefficients need to be reported, resulting in high reporting overheads. To reduce overheads for reporting a combination coefficient set, the receive end may compress the combination coefficient set before reporting the combination coefficient set. In the prior art, only an uncompressed-format combination coefficient set can be reported, and a compressed-format combination coefficient set cannot be reported.

SUMMARY

Embodiments of this application provide a communication method and a device, so that a compressed-format combination coefficient set can be reported.

To achieve the foregoing objective, the following technical solutions are used in the embodiments of this application.

According to a first aspect, a communication method is disclosed. The method includes:

A first device determines a first CSI report based on a precoding matrix type, where the precoding matrix type is a compressed type or an uncompressed type. The first device sends the first CSI report to a second device, where the first CSI report includes a CSI part 1 and a CSI part 2. Specifically, the CSI part 1 is used to indicate a number of bits of the CSI part 2 and the precoding matrix type, and the CSI part 2 is used to indicate wideband precoding matrix indicator PMI information. The wideband PMI information is used to indicate an oversampling factor of a preset orthogonal beam vector and/or an index of the preset orthogonal beam vector, and the preset orthogonal beam vector is a spatial-domain orthogonal basis vector selected by the first device from a spatial-domain basis vector set.

According to the communication method provided in this embodiment of the present invention, a compressed-format combination coefficient set can be reported, so that a problem that a current CSI reporting format cannot be applied to a compressed-type CSI report is resolved. In addition, UE uses a CSI part 1 to indicate a precoding matrix type, and may autonomously select, based on a requirement, whether to report an uncompressed-type CSI report or a compressed-type CSI report. Therefore, the UE has more autonomous selection capabilities.

With reference to the first aspect, in a first possible implementation of the first aspect, the method further includes: The first device determines a combination coefficient set based on the precoding matrix type, where the combination coefficient set includes at least one combination coefficient.

In this embodiment of the present invention, the first device may determine a combination coefficient set based on an actually used precoding matrix type, so as to report a CSI report based on the combination coefficient set and other information.

With reference to the first possible implementation of the first aspect, in a second possible implementation of the first aspect, when the precoding matrix type is the compressed type, the first CSI report is a compressed-type CSI report, and the combination coefficient includes an amplitude coefficient and a phase coefficient.

In this embodiment of the present invention, a terminal is compatible with an existing CSI report to report a combination coefficient, wideband PMI information, and the like, and may switch a reporting format based on a requirement of the terminal. When a precoding matrix type actually used by the terminal is a compressed type, the terminal reports a compressed-type CSI report. When the precoding matrix type is the compressed type, the compressed-type CSI report is used to report a combination coefficient set, PMI information, and the like. In addition, the combination coefficient is a combination coefficient of a space-frequency two-dimensional basis vector, and includes the amplitude coefficient and the phase coefficient. This can reduce reporting overheads.

With reference to the second possible implementation of the first aspect, in a third possible implementation of the first aspect, the CSI part 1 includes a combination coefficient quantity indication field, and the combination coefficient quantity indication field is a first value corresponding to each spatial layer or a second value corresponding to each spatial layer, where the first value is a quantity of combination coefficients whose amplitude coefficients are zero in the combination coefficient set or a quantity of combination coefficients whose amplitude coefficients are non-zero in the combination coefficient set, the second value is a quantity of combination coefficients corresponding to the preset orthogonal beam vector, and all preset orthogonal beam vectors correspond to a same quantity of combination coefficients. The CSI part 2 includes a wideband PMI information field and a combination coefficient information field that corresponds to all the preset orthogonal beam vectors at each spatial layer in each spatial layer group, where the combination coefficient information field includes Q combination coefficients corresponding to all the preset orthogonal beam vectors at one spatial layer in one spatial layer group.

This embodiment of the present invention provides a field included in an existing CSI report when the CSI report is used to report a compressed combination coefficient set. According to the method provided in this embodiment of the present invention, the terminal may report the compressed combination coefficient set by using the existing CSI report.

With reference to the third possible implementation of the first aspect, in a fourth possible implementation of the first aspect, the combination coefficient information field includes a first combination coefficient information field and a second combination coefficient information field. The first combination coefficient information field includes the first $\lfloor Q/2 \rfloor$ combination coefficients in the Q combination coefficients that are arranged in descending order of power, and the second combination coefficient information field includes the last $(Q-\lfloor Q/2 \rfloor)$ combination coefficients in the Q combination coefficients that are arranged in descending order of the power.

This embodiment of the present invention provides some other fields included in the existing CSI report when the CSI report is used to report the compressed combination coefficient set. According to the method provided in this embodiment of the present invention, the terminal may report the compressed combination coefficient set by using the existing CSI report.

With reference to the first possible implementation of the first aspect, in a fifth possible implementation of the first aspect, when the precoding matrix type is the uncompressed type, the first CSI report is an uncompressed-type CSI report, and the combination coefficient includes a wideband amplitude coefficient, a subband amplitude coefficient, and a subband phase coefficient.

In this embodiment of the present invention, the terminal uses an existing CSI report to report a combination coefficient, wideband PMI information, and the like, and may switch a reporting format based on a requirement of the terminal. When a precoding matrix type actually used by the terminal is an uncompressed type, the terminal reports an uncompressed-type CSI report.

With reference to the fifth possible implementation of the first aspect, in a sixth possible implementation of the first aspect, the CSI part 1 includes a combination coefficient quantity indication field, and the combination coefficient quantity indication field is a third value corresponding to each spatial layer, where the third value is a quantity of preset orthogonal beam vectors whose wideband amplitude coefficients are non-zero in the combination coefficient set. The CSI part 2 includes a wideband PMI information field, a first subband PMI information field, and a second subband PMI information field.

This embodiment of the present invention provides some fields included in an existing CSI report when the CSI report is used to report an uncompressed combination coefficient set. According to the method provided in this embodiment of the present invention, the terminal may report the uncompressed combination coefficient set by using the existing CSI report.

With reference to the second to the sixth possible implementations of the first aspect, in a seventh possible implementation of the first aspect, the CSI part 1 further includes a first indicator, and the first indicator is used to indicate whether the precoding matrix type is the compressed type or the uncompressed type.

In a possible implementation, the CSI part 1 may explicitly indicate, by using the first indicator, the precoding matrix type actually used by the terminal.

With reference to the second to the sixth possible implementations of the first aspect, in an eighth possible implementation of the first aspect, if the combination coefficient quantity indication field is zero, the precoding matrix type is the compressed type; or if the combination coefficient quantity indication field is non-zero, the precoding matrix type is the uncompressed type.

In a possible implementation, the CSI part 1 may implicitly indicate, by using an existing combination coefficient quantity indication field, the precoding matrix type actually used by the terminal.

With reference to the seventh or the eighth possible implementation of the first aspect, in a ninth possible implementation of the first aspect, the CSI part 1 further includes a rank indicator, a wideband channel quality indicator CQI of a first transport block, and a subband differential CQI of the first transport block; and the first transport block is the $1^{st}$ transport block on a physical downlink data channel corresponding to the first CSI report.

This embodiment of the present invention further provides some fields included in the CSI part 1 of the CSI report.

With reference to any one of the first aspect and the first to the ninth possible implementations of the first aspect, in a tenth possible implementation of the first aspect, the method further includes: The first device obtains a precoding matrix type preconfigured by the second device, and determines the precoding matrix type based on the preconfigured precoding matrix type.

In this embodiment of the present invention, the terminal may determine a finally used precoding matrix type based on a precoding matrix type preconfigured by a base station.

With reference to the tenth possible implementation of the first aspect, in an eleventh possible implementation of the first aspect, that the first device determines the precoding matrix type based on the preconfigured precoding matrix type includes: When the preconfigured precoding matrix type is the uncompressed type, the first device determines that the precoding matrix type is the uncompressed type; or when the preconfigured precoding matrix type is the compressed type, the first device determines uplink control information UCI including at least one compressed-type CSI report; and if a code rate of the UCI is greater than a first threshold, the first device determines that the precoding matrix type is the uncompressed type; or if a code rate of the UCI is less than or equal to a first threshold, the first device determines that the precoding matrix type is the compressed type; or when the preconfigured precoding matrix type is the compressed type, if the first device determines that a number of bits of a CSI part 2 corresponding to a compressed-type CSI report is less than a number of bits of a CSI part 2 corresponding to an uncompressed-type CSI report, the first device determines that the precoding matrix type is the compressed type; or if the first device determines that a number of bits of a CSI part 2 corresponding to a compressed-type CSI report is greater than or equal to a number of bits of a CSI part 2 corresponding to an uncompressed-type CSI report, the first device determines that the precoding matrix type is the uncompressed type.

This embodiment of the present invention provides several possible implementations in which the terminal determines the finally used precoding matrix type based on the precoding matrix type preconfigured by the base station. The terminal may flexibly switch a reporting format based on a requirement of the terminal and the precoding matrix type preconfigured by the base station.

With reference to the eleventh possible implementation of the first aspect, in a twelfth possible implementation of the first aspect, the method further includes: The first device determines UCI including the first CSI report, the UCI further includes at least one second CSI report, and the at least one second CSI report and the first CSI report are of a same type.

With reference to the twelfth possible implementation of the first aspect, in a thirteenth possible implementation of the first aspect, when the precoding matrix type is the uncompressed type and a code rate of the UCI is greater than the first threshold, the first device deletes a first subband PMI information field and/or a second subband PMI information field in a CSI part 2 corresponding to at least one CSI report in the UCI, until a code rate of the UCI is less than or equal to the first threshold.

In this embodiment of the present invention, when a code rate of UCI used for sending a CSI report does not satisfy an overhead requirement, first subband PMI information fields and/or second subband PMI information fields in some CSI reports may be deleted from the UCI. When a code rate of the UCI from which the fields are deleted is less than or equal to the first threshold, the deletion operation is stopped, and the UCI whose code rate satisfies the requirement is reported to the base station.

With reference to any one of the first aspect and the first to the thirteenth possible implementations of the first aspect, in a fourteenth possible implementation of the first aspect, a number of bits of a CSI part 1 used when the precoding matrix type is the compressed type is the same as a number of bits of a CSI part 1 used when the precoding matrix type is the uncompressed type.

In this embodiment of the present invention, a format of an existing CSI report is compatible to report a compressed-type combination coefficient set. Therefore, for a number of bits of a CSI part 1, refer to a CSI part 1 of the existing CSI report.

According to a second aspect, a communication method is disclosed. The method includes: A first device determines a first CSI report based on a compressed-type precoding matrix, where the first CSI report is a compressed-type CSI report, the first CSI report includes a CSI part 1 and a CSI part 2, the CSI part 1 is used to indicate a number of bits of the CSI part 2, the CSI part 2 is used to indicate wideband precoding matrix indicator PMI information, the wideband PMI information is used to indicate an oversampling factor of a preset orthogonal beam vector and/or an index of the preset orthogonal beam vector, and the preset orthogonal beam vector is a spatial-domain orthogonal basis vector selected by the first device from a spatial-domain basis vector set. The first device sends the first CSI report to a second device.

According to the communication method provided in this embodiment of the present invention, a CSI report in a new format is provided, so that a compressed-format combination coefficient set can be reported, thereby resolving a problem that a current CSI reporting format cannot be applied to a compressed-type CSI report. For a compressed-type precoding matrix and a compressed combination coefficient set, a new CSI format is designed, to achieve an optimum compromise between reporting overheads and system performance.

With reference to the second aspect, in a first possible implementation of the second aspect, the method further includes: The first device determines a combination coefficient set based on the compressed-type precoding matrix, where the combination coefficient set includes at least one combination coefficient, and the combination coefficient includes an amplitude coefficient and a phase coefficient.

In this embodiment of the present invention, if a terminal uses a compressed-type precoding matrix, the terminal reports a compressed combination coefficient set to a base station, where a combination coefficient in the compressed combination coefficient set includes an amplitude coefficient and a phase coefficient. The method provided in this embodiment of the present invention supports reporting of an amplitude coefficient and a phase coefficient.

With reference to the first possible implementation of the second aspect, in a second possible implementation of the second aspect, the CSI part 1 includes a combination coefficient quantity indication field, and the combination coefficient quantity indication field is a first value or a second value, where the first value is a quantity of combination coefficients whose amplitude coefficients are zero in the combination coefficient set or a quantity of combination coefficients whose amplitude coefficients are non-zero in the combination coefficient set, and the second value is a quantity of combination coefficients corresponding to the preset orthogonal beam vector.

This embodiment of the present invention provides a field that may be included in a compressed-type CSI report and a possible value of the field. The terminal may report a compressed-type CSI report to the base station in a field format provided in this embodiment of the present invention.

With reference to the second possible implementation of the second aspect, in a third possible implementation of the second aspect, all spatial layers correspond to a same first value, or different spatial layers correspond to different first values.

This embodiment of the present invention provides a possible implementation in which the combination coefficient quantity indication field is the first value. The terminal may configure the first value based on a requirement of the terminal.

With reference to the second possible implementation of the second aspect, in a fourth possible implementation of the second aspect, all spatial layers correspond to a same second value, and all preset orthogonal beam vectors correspond to a same quantity of combination coefficients at one spatial layer; or all spatial layers correspond to a same second value, and all preset orthogonal beam vectors correspond to different quantities of combination coefficients at one spatial layer; or different spatial layers correspond to different second values, and all preset orthogonal beam vectors correspond to a same quantity of combination coefficients at one spatial layer; or different spatial layers correspond to different second values, and all preset orthogonal beam vectors correspond to different quantities of combination coefficients at one spatial layer.

This embodiment of the present invention provides a possible implementation in which the combination coefficient quantity indication field is the second value. The base station may configure the second value based on a channel condition or an overhead requirement.

With reference to any one of the second to the fourth possible implementations of the second aspect, in a fifth possible implementation of the second aspect, the CSI part 1 further includes a rank indicator, a wideband channel quality indicator CQI of a first transport block, and a subband differential CQI of the first transport block; and the first transport block is the $1^{st}$ transport block on a physical downlink data channel corresponding to the CSI part 1 and the CSI part 2.

This embodiment of the present invention further provides another field included in the CSI part 1. The terminal may report a compressed-type CSI report to the base station according to the method provided in this embodiment of the present invention.

With reference to any one of the second to the fifth possible implementations of the second aspect, in a sixth possible implementation of the second aspect, the CSI part 2 includes a wideband PMI information field $X_1$ and a PMI information field $X_2$.

The wideband PMI information field $X_1$ includes information of a selected information of an oversampling rotation factor of a spatial-domain beam, selection information of a spatial-domain beam vector, and selection information of a strongest combination coefficient corresponding to each spatial layer.

The PMI information field $X_2$ includes a combination coefficient information field corresponding to all preset orthogonal beam vectors at each spatial layer in each spatial layer group, a non-zero combination coefficient index corresponding to each spatial layer, and a frequency-domain basis vector index corresponding to each spatial layer, where the combination coefficient information field is used to indicate Q combination coefficients, and the combination coefficients include combination coefficient amplitude quantized values corresponding to 2L beam vectors at each spatial layer and combination coefficient phase quantized values corresponding to 2L beam vectors at each spatial layer.

Alternatively, the CSI part 2 includes a wideband PMI information field and a combination coefficient information field that corresponds to all preset orthogonal beam vectors at each spatial layer in each spatial layer group, where the combination coefficient information field includes Q combination coefficients corresponding to all the preset orthogonal beam vectors at one spatial layer in one spatial layer group.

With reference to the sixth possible implementation of the second aspect, in a seventh possible implementation of the second aspect, the combination coefficient information field includes a first combination coefficient information field and a second combination coefficient information field. The first combination coefficient information field includes $\lfloor Q/2 \rfloor$ combination coefficients in the Q combination coefficients, and the second combination coefficient information field includes $(Q-\lfloor Q/2 \rfloor)$ combination coefficients in the Q combination coefficients other than the $\lfloor Q/2 \rfloor$ combination coefficients.

With reference to the seventh possible implementation of the second aspect, in an eighth possible implementation of the second aspect, the $\lfloor Q/2 \rfloor$ combination coefficients are the first $\lfloor Q/2 \rfloor$ combination coefficients in the Q combination coefficients that are arranged in descending order of power, and the $(Q-\lfloor Q/2 \rfloor)$ combination coefficients are the last $(Q-\lfloor Q/2 \rfloor)$ combination coefficients in the Q combination coefficients that are arranged in descending order of the power.

Alternatively, the first combination coefficient information field includes the first $\lfloor Q/2 \rfloor$ combination coefficients in the Q combination coefficients that are arranged in descending order of power, and the second combination coefficient information field includes the last $(Q-\lfloor Q/2 \rfloor)$ combination coefficients in the Q combination coefficients that are arranged in descending order of the power.

With reference to the eighth possible implementation of the second aspect, in a ninth possible implementation of the second aspect, a priority of the wideband PMI information field is higher than a priority of the combination coefficient information field. A smaller number of a CSI report indicates a higher priority of a combination coefficient information field in the CSI report. When CSI reports have a same number, a higher priority of a spatial layer group corresponding to a combination coefficient information field in a CSI report indicates a higher priority of the combination coefficient information field in the CSI report.

This embodiment of the present invention provides a priority of each field in a CSI report.

With reference to the ninth possible implementation of the second aspect, in a tenth possible implementation of the second aspect, when CSI reports have a same number, and spatial layer groups corresponding to combination coefficient information fields in the CSI reports have a same priority, a priority of the first combination coefficient information field is higher than a priority of the second combination coefficient information field.

With reference to the tenth possible implementation of the second aspect, in an eleventh possible implementation of the second aspect, the method further includes: The first device determines uplink control information UCI including the first CSI report, where the UCI further includes at least one second CSI report, and the at least one second CSI report is a compressed-type CSI report.

This embodiment of the present invention provides a possible implementation in which the terminal reports a CSI report. To be specific, the terminal may report a plurality of CSI reports of a same type by using UCI.

With reference to the eleventh possible implementation of the second aspect, in a twelfth possible implementation of the second aspect, the method further includes: when a code rate of the UCI is greater than a first threshold, deleting at least one combination coefficient information field from the UCI in ascending order of priorities of combination coefficient information fields, until a code rate of the UCI is less than or equal to the first threshold; or when a code rate of the UCI is greater than a first threshold, deleting at least one first combination coefficient information field and/or at least one second combination coefficient information field from the UCI in ascending order of priorities of combination coefficient information fields, until a code rate of the UCI is less than or equal to the first threshold.

X combination coefficient information fields are inserted into the UCI in descending order of priorities of combination coefficient information fields, so that a code rate of the UCI is less than or equal to the first threshold, where X is a positive integer, and X satisfies the following condition: If the UCI includes X+1 combination coefficient information fields, a code rate of the UCI is greater than the first threshold.

In this embodiment of the present invention, when a code rate of UCI used for sending a compressed-type CSI report does not satisfy the overhead requirement, combination coefficient information fields in some CSI reports may be deleted from the UCI. When a code rate of the UCI from which the fields are deleted is less than or equal to the first threshold, the deletion operation is stopped, and the UCI whose code rate satisfies the requirement is reported to the base station.

According to a third aspect, a communication method is disclosed. The method includes:

A second device receives a first CSI report from a first device, where the first CSI report includes a CSI part 1 and a CSI part 2, the CSI part 1 is used to indicate a number of bits of the CSI part 2 and a precoding matrix type, the CSI part 2 is used to indicate wideband precoding matrix indicator PMI information, the wideband PMI information is used to indicate an oversampling factor of a preset orthogonal beam vector and/or an index of the preset orthogonal beam vector, the preset orthogonal beam vector is a spatial-domain orthogonal basis vector selected by the first device from a spatial-domain basis vector set, and the precoding matrix type is a compressed type or an uncompressed type. Further, the second device may determine a precoding matrix type based on the first CSI report, and precode a transmit signal based on the precoding matrix.

With reference to the third aspect, in a first possible implementation of the third aspect, when the precoding matrix type is the compressed type, the first CSI report is a compressed-type CSI report, and a combination coefficient includes an amplitude coefficient and a phase coefficient.

With reference to the first possible implementation of the third aspect, in a second possible implementation of the third aspect, the CSI part 1 includes a combination coefficient quantity indication field, and the combination coefficient quantity indication field is a first value corresponding to each spatial layer or a second value corresponding to each spatial layer, where the first value is a quantity of combination coefficients whose amplitude coefficients are zero in a combination coefficient set or a quantity of combination coefficients whose amplitude coefficients are non-zero in a combination coefficient set, the second value is a quantity of combination coefficients corresponding to the preset orthogonal beam vector, and all preset orthogonal beam vectors correspond to a same quantity of combination coefficients. The CSI part 2 includes a wideband PMI information field and a combination coefficient information field that corresponds to all the preset orthogonal beam vectors at each spatial layer in each spatial layer group, where the combination coefficient information field includes Q combination coefficients corresponding to all the preset orthogonal beam vectors at one spatial layer in one spatial layer group.

With reference to the second possible implementation of the third aspect, in a third possible implementation of the third aspect, the combination coefficient information field includes a first combination coefficient information field and a second combination coefficient information field.

The first combination coefficient information field includes the first $\lfloor Q/2 \rfloor$ combination coefficients in the Q combination coefficients that are arranged in descending order of power, and the second combination coefficient information field includes the last $(Q-\lfloor Q/2 \rfloor)$ combination coefficients in the Q combination coefficients that are arranged in descending order of the power.

With reference to the third aspect, in a fourth possible implementation of the third aspect, when the precoding matrix type is the uncompressed type, the first CSI report is an uncompressed-type CSI report, and a combination coefficient includes a wideband amplitude coefficient, a subband amplitude coefficient, and a subband phase coefficient.

With reference to the fourth possible implementation of the third aspect, in a fifth possible implementation of the third aspect, the CSI part 1 includes a combination coefficient quantity indication field, and the combination coefficient quantity indication field is a third value corresponding to each spatial layer, where the third value is a quantity of preset orthogonal beam vectors whose wideband amplitude coefficients are non-zero in a combination coefficient set. The CSI part 2 includes a wideband PMI information field, a first subband PMI information field, and a second subband PMI information field.

With reference to any one of the foregoing possible implementations of the third aspect, in a sixth possible implementation of the third aspect, the CSI part 1 further includes a first indicator, and the first indicator is used to indicate whether the precoding matrix type is the compressed type or the uncompressed type.

With reference to any one of the foregoing possible implementations of the third aspect, in a seventh possible implementation of the third aspect, if the combination coefficient quantity indication field is zero, the precoding matrix type is the compressed type; or if the combination coefficient quantity indication field is non-zero, the precoding matrix type is the uncompressed type.

With reference to any one of the foregoing possible implementations of the third aspect, in an eighth possible implementation of the third aspect, the CSI part 1 further includes a rank indicator, a wideband channel quality indicator CQI of a first transport block, and a subband differential CQI of the first transport block; and the first transport block is the $1^{st}$ transport block on a physical downlink data channel corresponding to the first CSI report.

With reference to any one of the foregoing possible implementations of the third aspect, in a ninth possible implementation of the third aspect, the method further includes: The first device obtains a precoding matrix type preconfigured by the second device, and determines the precoding matrix type based on the preconfigured precoding matrix type.

With reference to any one of the foregoing possible implementations of the third aspect, in a tenth possible implementation of the third aspect, that the first device determines the precoding matrix type based on the preconfigured precoding matrix type includes: When the preconfigured precoding matrix type is the uncompressed type, the first device determines that the precoding matrix type is the uncompressed type; or when the preconfigured precoding matrix type is the compressed type, the first device determines uplink control information UCI including at least one compressed-type CSI report; and if a code rate of the UCI is greater than a first threshold, the first device determines that the precoding matrix type is the uncompressed type; or if a code rate of the UCI is less than or equal to a first threshold, the first device determines that the precoding matrix type is the compressed type; or when the preconfigured precoding matrix type is the compressed type, if the first device determines that a number of bits of a CSI part 2 corresponding to a compressed-type CSI report is less than a number of bits of a CSI part 2 corresponding to an uncompressed-type CSI report, the first device determines that the precoding matrix type is the compressed type; or if the first device determines that a number of bits of a CSI part 2 corresponding to a compressed-type CSI report is greater than or equal to a number of bits of a CSI part 2 corresponding to an uncompressed-type CSI report, the first device determines that the precoding matrix type is the uncompressed type.

With reference to any one of the foregoing possible implementations of the third aspect, in an eleventh possible implementation of the third aspect, the method further includes: The second device receives UCI including the first CSI report, where the UCI further includes at least one second CSI report, and the at least one second CSI report and the first CSI report are of a same type.

With reference to any one of the foregoing possible implementations of the third aspect, in a twelfth possible implementation of the third aspect, when the precoding matrix type is the uncompressed type, a CSI part 2 corresponding to at least one CSI report in the UCI does not include a first subband PMI information field and/or a second subband PMI information field, so that a code rate of the UCI is less than or equal to the first threshold.

With reference to any one of the foregoing possible implementations of the third aspect, in a thirteenth possible implementation of the third aspect, a number of bits of a CSI part 1 used when the precoding matrix type is the compressed type is the same as a number of bits of a CSI part 1 used when the precoding matrix type is the uncompressed type.

According to a fourth aspect, a communication method is disclosed. The method includes:

A second device receives a first CSI report from a first device, where the first CSI report is a compressed-type CSI report, the first CSI report includes a CSI part 1 and a CSI part 2, the CSI part 1 is used to indicate a number of bits of the CSI part 2, the CSI part 2 is used to indicate wideband precoding matrix indicator PMI information, the wideband PMI information is used to indicate an oversampling factor of a preset orthogonal beam vector and/or an index of the preset orthogonal beam vector, and the preset orthogonal beam vector is a spatial-domain orthogonal basis vector selected by the first device from a spatial-domain basis vector set. Further, the second device determines a precoding matrix based on the first CSI report, and precodes a transmit signal based on the precoding matrix.

With reference to the fourth aspect, in a first possible implementation of the fourth aspect, the method further includes: The first device determines a combination coefficient set based on the compressed-type precoding matrix, where the combination coefficient set includes at least one combination coefficient, and the combination coefficient includes an amplitude coefficient and a phase coefficient.

With reference to the foregoing possible implementation of the fourth aspect, in a second possible implementation of the fourth aspect, the CSI part 1 includes a combination coefficient quantity indication field, and the combination coefficient quantity indication field is a first value or a second value, where the first value is a quantity of combination coefficients whose amplitude coefficients are zero in the combination coefficient set or a quantity of combination coefficients whose amplitude coefficients are non-zero in the combination coefficient set, and the second value is a quantity of combination coefficients corresponding to the preset orthogonal beam vector.

With reference to any one of the foregoing possible implementations of the fourth aspect, in a third possible implementation of the fourth aspect, all spatial layers correspond to a same first value, or different spatial layers correspond to different first values.

With reference to any one of the foregoing possible implementations of the fourth aspect, in a fourth possible implementation of the fourth aspect, all spatial layers correspond to a same second value, and all preset orthogonal beam vectors correspond to a same quantity of combination coefficients at one spatial layer; or all spatial layers correspond to a same second value, and all preset orthogonal beam vectors correspond to different quantities of combination coefficients at one spatial layer; or different spatial layers correspond to different second values, and all preset orthogonal beam vectors correspond to a same quantity of combination coefficients at one spatial layer; or different spatial layers correspond to different second values, and all preset orthogonal beam vectors correspond to different quantities of combination coefficients at one spatial layer.

With reference to any one of the foregoing possible implementations of the fourth aspect, in a fifth possible implementation of the fourth aspect, the CSI part 1 further includes a rank indicator, a wideband channel quality indicator CQI of a first transport block, and a subband differential CQI of the first transport block; and the first transport block is the $1^{st}$ transport block on a physical downlink data channel corresponding to the CSI part 1 and the CSI part 2.

With reference to any one of the foregoing possible implementations of the fourth aspect, in a sixth possible implementation of the fourth aspect, the CSI part 2 includes a wideband PMI information field $X_1$ and a PMI information field $X_2$.

The wideband PMI information field $X_1$ includes information of a selected information of an oversampling rotation factor of a spatial-domain beam, selection information of a spatial-domain beam vector, and selection information of a strongest combination coefficient corresponding to each spatial layer.

The PMI information field $X_2$ includes a combination coefficient information field corresponding to all preset orthogonal beam vectors at each spatial layer in each spatial layer group, a non-zero combination coefficient index corresponding to each spatial layer, and a frequency-domain basis vector index corresponding to each spatial layer, where the combination coefficient information field is used to indicate Q combination coefficients, and the combination coefficients include combination coefficient amplitude quantized values corresponding to 2L beam vectors at each spatial layer and combination coefficient phase quantized values corresponding to 2L beam vectors at each spatial layer.

Alternatively, the CSI part 2 includes a wideband PMI information field and a combination coefficient information field that corresponds to all preset orthogonal beam vectors at each spatial layer in each spatial layer group, where the combination coefficient information field includes Q combination coefficients corresponding to all the preset orthogonal beam vectors at one spatial layer in one spatial layer group.

With reference to any one of the foregoing possible implementations of the fourth aspect, in a seventh possible implementation of the fourth aspect, the combination coefficient information field includes a first combination coefficient information field and a second combination coefficient information field. The first combination coefficient information field includes $\lfloor Q/2 \rfloor$ combination coefficients in the Q combination coefficients, and the second combination coefficient information field includes $(Q-\lfloor Q/2 \rfloor)$ combination coefficients in the Q combination coefficients other than the $\lfloor Q/2 \rfloor$ combination coefficients.

With reference to any one of the foregoing possible implementations of the fourth aspect, in an eighth possible implementation of the fourth aspect, the $\lfloor Q/2 \rfloor$ combination coefficients are the first $\lfloor Q/2 \rfloor$ combination coefficients in the Q combination coefficients that are arranged in descending order of power, and the $(Q-\lfloor Q/2 \rfloor)$ combination coefficients are the last $(Q-\lfloor Q/2 \rfloor)$ combination coefficients in the Q combination coefficients that are arranged in descending order of the power.

Alternatively, the first combination coefficient information field includes the first $\lfloor Q/2 \rfloor$ combination coefficients in the Q combination coefficients that are arranged in descending order of power, and the second combination coefficient information field includes the last $(Q-\lfloor Q/2 \rfloor)$ combination coefficients in the Q combination coefficients that are arranged in descending order of the power.

With reference to any one of the foregoing possible implementations of the fourth aspect, in a ninth possible implementation of the fourth aspect, a priority of the wideband PMI information field is higher than a priority of the combination coefficient information field.

A smaller number of a CSI report indicates a higher priority of a combination coefficient information field in the CSI report.

When CSI reports have a same number, a higher priority of a spatial layer group corresponding to a combination coefficient information field in a CSI report indicates a higher priority of the combination coefficient information field in the CSI report.

With reference to any one of the foregoing possible implementations of the fourth aspect, in a tenth possible implementation of the fourth aspect, w % ben CSI reports have a same number, and spatial layer groups corresponding to combination coefficient information fields in the CSI reports have a same priority, a priority of the first combination coefficient information field is higher than a priority of the second combination coefficient information field.

With reference to any one of the foregoing possible implementations of the fourth aspect, in an eleventh possible implementation of the fourth aspect, the method further includes: The second device receives uplink control information UCI including the first CSI report, where the UCI further includes at least one second CSI report, and the at least one second CSI report is a compressed-type CSI report.

With reference to any one of the foregoing possible implementations of the fourth aspect, in a twelfth possible implementation of the fourth aspect, at least one CSI report in the UCI includes some combination coefficient information fields, so that a code rate of the UCI is less than or equal to a first threshold; or Alternatively, at least one CSI report in the UCI includes some first combination coefficient information fields and/or some second combination coefficient information fields, so that a code rate of the UCI is less than or equal to a first threshold.

According to a fifth aspect, a device is disclosed. The device is the first device described in the foregoing embodiment of the present invention, and includes: a processing unit, configured to determine a first CSI report based on a precoding matrix type, where the precoding matrix type is a compressed type or an uncompressed type; and a communications unit, configured to send the first CSI report to a second device, where the first CSI report includes a CSI part 1 and a CSI part 2. Specifically, the CSI part 1 is used to indicate a number of bits of the CSI part 2 and the precoding matrix type, and the CSI part 2 is used to indicate wideband precoding matrix indicator PMI information. The wideband PMI information is used to indicate an oversampling factor of a preset orthogonal beam vector and/or an index of the preset orthogonal beam vector, and the preset orthogonal beam vector is a spatial-domain orthogonal basis vector selected by the first device from a spatial-domain basis vector set.

With reference to the fifth aspect, in a first possible implementation of the fifth aspect, the processing unit is further configured to determine a combination coefficient set based on the precoding matrix type, where the combination coefficient set includes at least one combination coefficient.

With reference to the first possible implementation of the fifth aspect, in a second possible implementation of the fifth aspect, when the precoding matrix type is the compressed type, the first CSI report is a compressed-type CSI report, and the combination coefficient includes an amplitude coefficient and a phase coefficient.

With reference to the second possible implementation of the fifth aspect, in a third possible implementation of the fifth aspect, the CSI part 1 includes a combination coefficient quantity indication field, and the combination coefficient quantity indication field is a first value corresponding to each spatial layer or a second value corresponding to each spatial layer, where the first value is a quantity of combination coefficients whose amplitude coefficients are zero in the combination coefficient set or a quantity of combination coefficients whose amplitude coefficients are non-zero in the combination coefficient set, the second value is a quantity of combination coefficients corresponding to the preset orthogonal beam vector, and all preset orthogonal beam vectors correspond to a same quantity of combination coefficients. The CSI part 2 includes a wideband PMI information field and a combination coefficient information field that corresponds to all the preset orthogonal beam vectors at each spatial layer in each spatial layer group, where the combination coefficient information field includes Q combination coefficients corresponding to all the preset orthogonal beam vectors at one spatial layer in one spatial layer group.

With reference to the third possible implementation of the fifth aspect, in a fourth possible implementation of the fifth aspect, the combination coefficient information field includes a first combination coefficient information field and a second combination coefficient information field. The first combination coefficient information field includes the first $\lfloor Q/2 \rfloor$ combination coefficients in the Q combination coefficients that are arranged in descending order of power, and the second combination coefficient information field includes the last $(Q-\lfloor Q/2 \rfloor)$ combination coefficients in the Q combination coefficients that are arranged in descending order of the power.

With reference to the first possible implementation of the fifth aspect, in a fifth possible implementation of the fifth aspect, when the precoding matrix type is the uncompressed type, the first CSI report is an uncompressed-type CSI report, and the combination coefficient includes a wideband amplitude coefficient, a subband amplitude coefficient, and a subband phase coefficient.

With reference to the fifth possible implementation of the fifth aspect, in a sixth possible implementation of the fifth aspect, the CSI part 1 includes a combination coefficient quantity indication field, and the combination coefficient quantity indication field is a third value corresponding to each spatial layer, where the third value is a quantity of preset orthogonal beam vectors whose wideband amplitude coefficients are non-zero in the combination coefficient set. The CSI part 2 includes a wideband PMI information field, a first subband PMI information field, and a second subband PMI information field.

With reference to the second to the sixth possible implementations of the fifth aspect, in a seventh possible implementation of the fifth aspect, the CSI part 1 further includes a first indicator, and the first indicator is used to indicate whether the precoding matrix type is the compressed type or the uncompressed type.

With reference to the second to the sixth possible implementations of the fifth aspect, in an eighth possible implementation of the fifth aspect, if the combination coefficient quantity indication field is zero, the precoding matrix type is the compressed type; or if the combination coefficient quantity indication field is non-zero, the precoding matrix type is the uncompressed type.

With reference to the seventh or the eighth possible implementation of the fifth aspect, in a ninth possible implementation of the fifth aspect, the CSI part 1 further includes a rank indicator, a wideband channel quality indicator CQI of a first transport block, and a subband differential CQI of the first transport block; and the first transport block is the $1^{st}$ transport block on a physical downlink data channel corresponding to the first CSI report.

With reference to any one of the fifth aspect or the first to the ninth possible implementations of the fifth aspect, in a tenth possible implementation of the fifth aspect, the communications unit is further configured to obtain a precoding matrix type preconfigured by the second device, and the processing unit is further configured to determine the precoding matrix type based on the preconfigured precoding matrix type.

With reference to the tenth possible implementation of the fifth aspect, in an eleventh possible implementation of the fifth aspect, the processing unit is specifically configured to: when the preconfigured precoding matrix type is the uncompressed type, determine that the precoding matrix type is the uncompressed type; or when the preconfigured precoding matrix type is the compressed type, determine uplink control information UCI including at least one compressed-type CSI report; and if a code rate of the UCI is greater than a first threshold, determine that the precoding matrix type is the uncompressed type; or if a code rate of the UCI is less than or equal to a first threshold, determine that the precoding matrix type is the compressed type; or when the preconfigured precoding matrix type is the compressed type, if the first device determines that a number of bits of a CSI part 2 corresponding to a compressed-type CSI report is less than a number of bits of a CSI part 2 corresponding to an uncompressed-type CSI report, determine that the precoding matrix type is the compressed type; or if the first device determines that a number of bits of a CSI part 2 corresponding to a compressed-type CSI report is greater than or equal to a number of bits of a CSI part 2 corresponding to an uncompressed-type CSI report, determine that the precoding matrix type is the uncompressed type.

With reference to the eleventh possible implementation of the fifth aspect, in a twelfth possible implementation of the fifth aspect, the processing unit is further configured to determine UCI including the first CSI report, the UCI further includes at least one second CSI report, and the at least one second CSI report and the first CSI report are of a same type.

With reference to the twelfth possible implementation of the fifth aspect, in a thirteenth possible implementation of the fifth aspect, the processing unit is further configured to: when the precoding matrix type is the uncompressed type and a code rate of the UCI is greater than the first threshold, delete a first subband PMI information field and/or a second subband PMI information field in a CSI part 2 corresponding to at least one CSI report in the UCI, until a code rate of the UCI is less than or equal to the first threshold.

With reference to any one of the fifth aspect and the first to the thirteenth possible implementations of the fifth aspect, in a fourteenth possible implementation of the fifth aspect, a number of bits of a CSI part 1 used when the precoding matrix type is the compressed type is the same as a number of bits of a CSI part 1 used when the precoding matrix type is the uncompressed type.

According to a sixth aspect, a communication method is disclosed. The device includes: a processing unit, configured to determine a first CSI report based on a compressed-type precoding matrix, where the first CSI report is a compressed-type CSI report, the first CSI report includes a CSI part 1 and a CSI part 2, the CSI part 1 is used to indicate a number of bits of the CSI part 2, the CSI part 2 is used to indicate wideband precoding matrix indicator PMI information, the wideband PMI information is used to indicate an oversampling factor of a preset orthogonal beam vector and/or an index of the preset orthogonal beam vector, and the preset orthogonal beam vector is a spatial-domain orthogonal basis vector selected by a first device from a spatial-domain basis vector set; and a communications unit, configured to send the first CSI report to a second device.

With reference to the sixth aspect, in a first possible implementation of the sixth aspect, the processing unit is further configured to determine a combination coefficient set based on the compressed-type precoding matrix, where the combination coefficient set includes at least one combination coefficient, and the combination coefficient includes an amplitude coefficient and a phase coefficient.

In this embodiment of the present invention, if a terminal uses a compressed-type precoding matrix, the terminal reports a compressed combination coefficient set to a base station, where a combination coefficient in the compressed combination coefficient set includes an amplitude coefficient and a phase coefficient. The method provided in this embodiment of the present invention supports reporting of an amplitude coefficient and a phase coefficient.

With reference to the first possible implementation of the sixth aspect, in a second possible implementation of the sixth aspect, the CSI part 1 includes a combination coefficient quantity indication field, and the combination coefficient quantity indication field is a first value or a second value, where the first value is a quantity of combination coefficients whose amplitude coefficients are zero in the combination coefficient set or a quantity of combination coefficients whose amplitude coefficients are non-zero in the combination coefficient set, and the second value is a quantity of combination coefficients corresponding to the preset orthogonal beam vector.

This embodiment of the present invention provides a field that may be included in a compressed-type CSI report and a possible value of the field. The terminal may report a compressed-type CSI report to the base station in a field format provided in this embodiment of the present invention.

With reference to the second possible implementation of the sixth aspect, in a third possible implementation of the sixth aspect, all spatial layers correspond to a same first value, or different spatial layers correspond to different first values.

This embodiment of the present invention provides a possible implementation in which the combination coefficient quantity indication field is the first value. The terminal may configure the first value based on a requirement of the terminal.

With reference to the second possible implementation of the sixth aspect, in a fourth possible implementation of the sixth aspect, all spatial layers correspond to a same second value, and all preset orthogonal beam vectors correspond to a same quantity of combination coefficients at one spatial layer; or all spatial layers correspond to a same second value, and all preset orthogonal beam vectors correspond to different quantities of combination coefficients at one spatial layer; or different spatial layers correspond to different second values, and all preset orthogonal beam vectors correspond to a same quantity of combination coefficients at one spatial layer; or different spatial layers correspond to different second values, and all preset orthogonal beam vectors correspond to different quantities of combination coefficients at one spatial layer.

This embodiment of the present invention provides a possible implementation in which the combination coefficient quantity indication field is the second value. The base station may configure the second value based on a channel condition and overheads.

With reference to any one of the first to the fourth possible implementations of the sixth aspect, in a fifth possible implementation of the sixth aspect, the CSI part 1 further includes a rank indicator, a wideband channel quality indicator CQI of a first transport block, and a subband differential CQI of the first transport block; and the first transport block is the $1^{st}$ transport block on a physical downlink data channel corresponding to the CSI part 1 and the CSI part 2.

This embodiment of the present invention further provides another field included in the CSI part 1. The terminal may report a compressed-type CSI report to the base station according to the method provided in this embodiment of the present invention.

With reference to any one of the second to the fifth possible implementations of the sixth aspect, in a sixth possible implementation of the sixth aspect, the CSI part 2 includes a wideband PMI information field $X_1$ and a PMI information field $X_2$.

The wideband PMI information field $X_1$ includes information of a selected information of an oversampling rotation factor of a spatial-domain beam, selection information of a spatial-domain beam vector, and selection information of a strongest combination coefficient corresponding to each spatial layer.

The PMI information field $X_2$ includes a combination coefficient information field corresponding to all preset orthogonal beam vectors at each spatial layer in each spatial layer group, a non-zero combination coefficient index corresponding to each spatial layer, and a frequency-domain basis vector index corresponding to each spatial layer, where the combination coefficient information field is used to indicate Q combination coefficients, and the combination coefficients include combination coefficient amplitude quantized values corresponding to 2L beam vectors at each spatial layer and combination coefficient phase quantized values corresponding to 2L beam vectors at each spatial layer.

Alternatively, the CSI part 2 includes a wideband PMI information field and a combination coefficient information field that corresponds to all preset orthogonal beam vectors at each spatial layer in each spatial layer group, where the combination coefficient information field includes Q combination coefficients corresponding to all the preset orthogonal beam vectors at one spatial layer in one spatial layer group.

With reference to the sixth possible implementation of the sixth aspect, in a seventh possible implementation of the sixth aspect, the combination coefficient information field includes a first combination coefficient information field and a second combination coefficient information field. The first combination coefficient information field includes $\lfloor Q/2 \rfloor$ combination coefficients in the Q combination coefficients, and the second combination coefficient information field includes $(Q-\lfloor Q/2 \rfloor)$ combination coefficients in the Q combination coefficients other than the $\lfloor Q/2 \rfloor$ combination coefficients.

With reference to the seventh possible implementation of the sixth aspect, in an eighth possible implementation of the sixth aspect, the $\lfloor Q/2 \rfloor$ combination coefficients are the first $\lfloor Q/2 \rfloor$ combination coefficients in the Q combination coefficients that are arranged in descending order of power, and the $(Q-\lfloor Q/2 \rfloor)$ combination coefficients are the last $(Q-\lfloor Q/2 \rfloor)$ combination coefficients in the Q combination coefficients that are arranged in descending order of the power.

Alternatively, the first combination coefficient information field includes the first $\lfloor Q/2 \rfloor$ combination coefficients in the Q combination coefficients that are arranged in descending order of power, and the second combination coefficient information field includes the last $(Q-\lfloor Q/2 \rfloor)$ combination coefficients in the Q combination coefficients that are arranged in descending order of the power.

With reference to the eighth possible implementation of the sixth aspect, in a ninth possible implementation of the sixth aspect, a priority of the wideband PMI information field is higher than a priority of the combination coefficient information field. A smaller number of a CSI report indicates a higher priority of a combination coefficient information field in the CSI report. When CSI reports have a same number, a higher priority of a spatial layer group corresponding to a combination coefficient information field in a CSI report indicates a higher priority of the combination coefficient information field in the CSI report.

This embodiment of the present invention provides a priority of each field in a CSI report.

With reference to the ninth possible implementation of the sixth aspect, in a tenth possible implementation of the sixth aspect, when CSI reports have a same number, and spatial layer groups corresponding to combination coefficient information fields in the CSI reports have a same priority, a priority of the first combination coefficient information field is higher than a priority of the second combination coefficient information field.

With reference to the tenth possible implementation of the sixth aspect, in an eleventh possible implementation of the sixth aspect, the processing unit is further configured to determine uplink control information UCI including the first CSI report, where the UCI further includes at least one second CSI report, and the at least one second CSI report is a compressed-type CSI report.

This embodiment of the present invention provides a possible implementation in which the terminal reports a CSI report. To be specific, the terminal may report a plurality of CSI reports of a same type by using UCI.

With reference to the eleventh possible implementation of the sixth aspect, in a twelfth possible implementation of the sixth aspect, the processing unit is further configured to: when a code rate of the UCI is greater than a first threshold, delete at least one combination coefficient information field from the UCI in ascending order of priorities of combination coefficient information fields, until a code rate of the UCI is less than or equal to the first threshold, or when a code rate of the UCI is greater than a first threshold, delete at least one first combination coefficient information field and/or at least one second combination coefficient information field from the UCI in ascending order of priorities of combination coefficient information fields, until a code rate of the UCI is less than or equal to the first threshold.

In this embodiment of the present invention, when a code rate of UCI used for sending a compressed-type CSI report does not satisfy an overhead requirement, combination coefficient information fields in some CSI reports may be deleted from the UCI. When a code rate of the UCI from which the fields are deleted is less than or equal to the first threshold, the deletion operation is stopped, and the UCI whose code rate satisfies the requirement is reported to the base station.

According to a seventh aspect, a device is disclosed. The device is the second device described in the foregoing embodiment of the present invention, and includes: a communications unit, configured to receive a first CSI report from a first device, where the first CSI report includes a CSI part 1 and a CSI part 2, the CSI part 1 is used to indicate a number of bits of the CSI part 2 and a precoding matrix type, the CSI part 2 is used to indicate wideband precoding matrix indicator PMI information, the wideband PMI information is used to indicate an oversampling factor of a preset orthogonal beam vector and/or an index of the preset orthogonal beam vector, the preset orthogonal beam vector is a spatial-domain orthogonal basis vector selected by the first device from a spatial-domain basis vector set, and the precoding matrix type is a compressed type or an uncompressed type; and a processing unit, configured to determine a precoding matrix based on the first CSI report, and precode a transmit signal based on the precoding matrix.

With reference to the seventh aspect, in a first possible implementation of the seventh aspect, when the precoding matrix type is the compressed type, the first CSI report is a compressed-type CSI report, and a combination coefficient includes an amplitude coefficient and a phase coefficient.

With reference to the first possible implementation of the seventh aspect, in a second possible implementation of the seventh aspect, the CSI part 1 includes a combination coefficient quantity indication field, and the combination coefficient quantity indication field is a first value corresponding to each spatial layer or a second value corresponding to each spatial layer, where the first value is a quantity of combination coefficients whose amplitude coefficients are zero in a combination coefficient set or a quantity of combination coefficients whose amplitude coefficients are non-zero in a combination coefficient set, the second value is a quantity of combination coefficients corresponding to the preset orthogonal beam vector, and all preset orthogonal beam vectors correspond to a same quantity of combination coefficients. The CSI part 2 includes a wideband PMI information field and a combination coefficient information field that corresponds to all the preset orthogonal beam vectors at each spatial layer in each spatial layer group, where the combination coefficient information field includes Q combination coefficients corresponding to all the preset orthogonal beam vectors at one spatial layer in one spatial layer group.

With reference to the second possible implementation of the seventh aspect, in a third possible implementation of the seventh aspect, the combination coefficient information field includes a first combination coefficient information field and a second combination coefficient information field.

The first combination coefficient information field includes the first $\lfloor Q/2 \rfloor$ combination coefficients in the Q combination coefficients that are arranged in descending order of power, and the second combination coefficient information field includes the last $(Q-\lfloor Q/2 \rfloor)$ combination coefficients in the Q combination coefficients that are arranged in descending order of the power.

With reference to the seventh aspect, in a fourth possible implementation of the seventh aspect, when the precoding matrix type is the uncompressed type, the first CSI report is an uncompressed-type CSI report, and a combination coefficient includes a wideband amplitude coefficient, a subband amplitude coefficient, and a subband phase coefficient.

With reference to the fourth possible implementation of the seventh aspect, in a fifth possible implementation of the seventh aspect, the CSI part 1 includes a combination coefficient quantity indication field, and the combination coefficient quantity indication field is a third value corresponding to each spatial layer, where the third value is a quantity of preset orthogonal beam vectors whose wideband amplitude coefficients are non-zero in a combination coefficient set. The CSI part 2 includes a wideband PMI information field, a first subband PMI information field, and a second subband PMI information field.

With reference to any one of the foregoing possible implementations of the seventh aspect, in a sixth possible implementation of the seventh aspect, the CSI part 1 further includes a first indicator, and the first indicator is used to indicate whether the precoding matrix type is the compressed type or the uncompressed type.

With reference to any one of the foregoing possible implementations of the seventh aspect, in a seventh possible implementation of the seventh aspect, if the combination coefficient quantity indication field is zero, the precoding matrix type is the compressed type; or if the combination coefficient quantity indication field is non-zero, the precoding matrix type is the uncompressed type.

With reference to any one of the foregoing possible implementations of the seventh aspect, in an eighth possible implementation of the seventh aspect, the CSI part 1 further includes a rank indicator, a wideband channel quality indicator CQI of a first transport block, and a subband differential CQI of the first transport block; and the first transport block is the $1^{st}$ transport block on a physical downlink data channel corresponding to the first CSI report.

With reference to any one of the foregoing possible implementations of the seventh aspect, in a ninth possible implementation of the seventh aspect, the method further includes: The first device obtains a precoding matrix type preconfigured by the second device, and determines the precoding matrix type based on the preconfigured precoding matrix type.

With reference to any one of the foregoing possible implementations of the seventh aspect, in a tenth possible implementation of the seventh aspect, that the first device determines the precoding matrix type based on the preconfigured precoding matrix type includes: When the preconfigured precoding matrix type is the uncompressed type, the first device determines that the precoding matrix type is the uncompressed type; or when the preconfigured precoding matrix type is the compressed type, the first device determines uplink control information UCI including at least one compressed-type CSI report; and if a code rate of the UCI is greater than a first threshold, the first device determines that the precoding matrix type is the uncompressed type; or if a code rate of the UCI is less than or equal to a first threshold, the first device determines that the precoding matrix type is the compressed type; or when the preconfigured precoding matrix type is the compressed type, if the first device determines that a number of bits of a CSI part 2 corresponding to a compressed-type CSI report is less than a number of bits of a CSI part 2 corresponding to an uncompressed-type CSI report, the first device determines that the precoding matrix type is the compressed type; or if the first device determines that a number of bits of a CSI part 2 corresponding to a compressed-type CSI report is greater than or equal to a number of bits of a CSI part 2 corresponding to an uncompressed-type CSI report, the first device determines that the precoding matrix type is the uncompressed type.

With reference to any one of the foregoing possible implementations of the seventh aspect, in an eleventh possible implementation of the seventh aspect, the method further includes: The second device receives UCI including the first CSI report, where the UCI further includes at least one second CSI report, and the at least one second CSI report and the first CSI report are of a same type.

With reference to any one of the foregoing possible implementations of the seventh aspect, in a twelfth possible implementation of the seventh aspect, when the precoding matrix type is the uncompressed type, a CSI part 2 corresponding to at least one CSI report in the UCI does not include a first subband PMI information field and/or a second subband PMI information field, so that a code rate of the UCI is less than or equal to the first threshold.

With reference to any one of the foregoing possible implementations of the seventh aspect, in a thirteenth possible implementation of the seventh aspect, a number of bits of a CSI part 1 used when the precoding matrix type is the compressed type is the same as a number of bits of a CSI part 1 used when the precoding matrix type is the uncompressed type.

According to an eighth aspect, a device is disclosed. The device is the second device described in the foregoing embodiment of the present invention, and includes: a communications unit, configured to receive a first CSI report from a first device, where the first CSI report is a compressed-type CSI report, the first CSI report includes a CSI part 1 and a CSI part 2, the CSI part 1 is used to indicate a number of bits of the CSI part 2, the CSI part 2 is used to indicate wideband precoding matrix indicator PMI information, the wideband PMI information is used to indicate an oversampling factor of a preset orthogonal beam vector and/or an index of the preset orthogonal beam vector, and the preset orthogonal beam vector is a spatial-domain orthogonal basis vector selected by the first device from a spatial-domain basis vector set; and a processing unit, configured to determine a precoding matrix based on the first CSI report, and precode a transmit signal based on the precoding matrix.

With reference to the eighth aspect, in a first possible implementation of the eighth aspect, the method further includes. The first device determines a combination coefficient set based on the compressed-type precoding matrix, where the combination coefficient set includes at least one combination coefficient, and the combination coefficient includes an amplitude coefficient and a phase coefficient.

With reference to the foregoing possible implementation of the eighth aspect, in a second possible implementation of the eighth aspect, the CSI part 1 includes a combination coefficient quantity indication field, and the combination coefficient quantity indication field is a first value or a second value, where the first value is a quantity of combination coefficients whose amplitude coefficients are zero in the combination coefficient set or a quantity of combination coefficients whose amplitude coefficients are non-zero in the combination coefficient set, and the second value is a quantity of combination coefficients corresponding to the preset orthogonal beam vector.

With reference to any one of the foregoing possible implementations of the eighth aspect, in a third possible implementation of the eighth aspect, all spatial layers correspond to a same first value, or different spatial layers correspond to different first values.

With reference to any one of the foregoing possible implementations of the eighth aspect, in a fourth possible implementation of the eighth aspect, all spatial layers correspond to a same second value, and all preset orthogonal beam vectors correspond to a same quantity of combination coefficients at one spatial layer; or all spatial layers correspond to a same second value, and all preset orthogonal beam vectors correspond to different quantities of combination coefficients at one spatial layer; or different spatial layers correspond to different second values, and all preset orthogonal beam vectors correspond to a same quantity of combination coefficients at one spatial layer; or different spatial layers correspond to different second values, and all preset orthogonal beam vectors correspond to different quantities of combination coefficients at one spatial layer.

With reference to any one of the foregoing possible implementations of the eighth aspect, in a fifth possible implementation of the eighth aspect, the CSI part 1 further includes a rank indicator, a wideband channel quality indicator CQI of a first transport block, and a subband differential CQI of the first transport block; and the first transport block is the $1^{st}$ transport block on a physical downlink data channel corresponding to the CSI part 1 and the CSI part 2.

With reference to any one of the foregoing possible implementations of the eighth aspect, in a sixth possible implementation of the eighth aspect, the CSI part 2 includes a wideband PMI information field $X_1$ and a PMI information field $X_2$.

The wideband PMI information field $X_1$ includes information of a selected information of an oversampling rotation factor of a spatial-domain beam, selection information of a spatial-domain beam vector, and selection information of a strongest combination coefficient corresponding to each spatial layer.

The PMI information field $X_2$ includes a combination coefficient information field corresponding to all preset orthogonal beam vectors at each spatial layer in each spatial layer group, a non-zero combination coefficient index corresponding to each spatial layer, and a frequency-domain basis vector index corresponding to each spatial layer, where the combination coefficient information field is used to indicate Q combination coefficients, and the combination coefficients include combination coefficient amplitude quantized values corresponding to 2L beam vectors at each spatial layer and combination coefficient phase quantized values corresponding to 2L beam vectors at each spatial layer.

Alternatively, the CSI part 2 includes a wideband PMI information field and a combination coefficient information field that corresponds to all preset orthogonal beam vectors at each spatial layer in each spatial layer group, where the combination coefficient information field includes Q combination coefficients corresponding to all the preset orthogonal beam vectors at one spatial layer in one spatial layer group.

With reference to any one of the foregoing possible implementations of the eighth aspect, in a seventh possible implementation of the eighth aspect, the combination coefficient information field includes a first combination coefficient information field and a second combination coefficient information field. The first combination coefficient information field includes $\lfloor Q/2 \rfloor$ combination coefficients in the Q combination coefficients, and the second combination coefficient information field includes (Q−⌊Q/2⌋) combination coefficients in the Q combination coefficients other than the ⌊Q/2⌋ combination coefficients.

With reference to any one of the foregoing possible implementations of the eighth aspect, in an eighth possible implementation of the eighth aspect, the ⌊Q/2⌋ combination coefficients are the first ⌊Q/2⌋ combination coefficients in the Q combination coefficients that are arranged in descending order of power, and the (Q−⌊Q/2⌋) combination coefficients are the last (Q−⌊Q/2⌋) combination coefficients in the Q combination coefficients that are arranged in descending order of the power.

Alternatively, the first combination coefficient information field includes the first ⌊Q/2⌋ combination coefficients in the Q combination coefficients that are arranged in descending order of power, and the second combination coefficient information field includes the last (Q−⌊Q/2⌋) combination coefficients in the Q combination coefficients that are arranged in descending order of the power. With reference to any one of the foregoing possible implementations of the eighth aspect, in a ninth possible implementation of the eighth aspect, a priority of the wideband PMI information field is higher than a priority of the combination coefficient information field.

A smaller number of a CSI report indicates a higher priority of a combination coefficient information field in the CSI report.

When CSI reports have a same number, a higher priority of a spatial layer group corresponding to a combination coefficient information field in a CSI report indicates a higher priority of the combination coefficient information field in the CSI report.

With reference to any one of the foregoing possible implementations of the eighth aspect, in a tenth possible implementation of the eighth aspect, when CSI reports have a same number, and spatial layer groups corresponding to combination coefficient information fields in the CSI reports have a same priority, a priority of the first combination coefficient information field is higher than a priority of the second combination coefficient information field.

With reference to any one of the foregoing possible implementations of the eighth aspect, in an eleventh possible implementation of the eighth aspect, the method further includes: The second device receives uplink control information UCI including the first CSI report, where the UCI further includes at least one second CSI report, and the at least one second CSI report is a compressed-type CSI report.

With reference to any one of the foregoing possible implementations of the eighth aspect, in a twelfth possible implementation of the eighth aspect, at least one CSI report in the UCI includes some combination coefficient information fields, so that a code rate of the UCI is less than or equal to a first threshold. Alternatively, at least one CSI report in the UCI includes some first combination coefficient information fields and/or some second combination coefficient information fields, so that a code rate of the UCI is less than or equal to a first threshold.

According to a ninth aspect, a first device is disclosed. The first device includes one or more processors and one or more memories. The one or more memories are coupled to the one or more processors. The one or more memories are configured to store computer program code. The computer program code includes a computer instruction, and when the one or more processors execute the computer instruction, the first device is enabled to perform the communication method according to the first aspect or the second aspect.

According to a tenth aspect, a second device is disclosed. The second device includes one or more processors and one or more memories. The one or more memories are coupled to the one or more processors. The one or more memories are configured to store computer program code. The computer program code includes a computer instruction, and when the one or more processors execute the computer instruction, the second device is enabled to perform the communication method according to the third aspect or the fourth aspect.

According to an eleventh aspect, a computer-readable storage medium is disclosed. The computer-readable storage medium stores instructions, and when the computer-readable storage medium is run on the first device according to any one of the fifth aspect and the implementations of the fifth aspect or any one of the sixth aspect and the implementations of the sixth aspect, the first device is enabled to perform the communication method according to any one of the first aspect and the implementations of the first aspect or any one of the second aspect and the implementations of the second aspect.

According to a twelfth aspect, a computer-readable storage medium is disclosed. The computer-readable storage medium stores instructions, and when the computer-readable storage medium is run on the second device according to any one of the seventh aspect and the implementations of the seventh aspect or any one of the eighth aspect and the implementations of the eighth aspect, the second device is enabled to perform the communication method according to any one of the third aspect and the implementations of the third aspect or any one of the fourth aspect and the implementations of the fourth aspect.

According to a thirteenth aspect, a computer-readable storage medium is disclosed. The computer-readable storage medium stores instructions, and when the computer-readable storage medium is run on the first device according to any one of the fifth aspect and the implementations of the fifth aspect or any one of the sixth aspect and the implementations of the sixth aspect, the first device is enabled to perform the communication method according to any one of the first aspect and the implementations of the first aspect or any one of the second aspect and the implementations of the second aspect.

According to a fourteenth aspect, a computer-readable storage medium is disclosed. The computer-readable storage medium stores instructions, and when the computer-readable storage medium is run on the second device according to any one of the seventh aspect and the implementations of the seventh aspect or any one of the eighth aspect and the implementations of the eighth aspect, the second device is enabled to perform the communication method according to any one of the third aspect and the implementations of the third aspect or any one of the fourth aspect and the implementations of the fourth aspect.

According to a fifteenth aspect, a wireless communications apparatus is disclosed. The wireless communications apparatus stores instructions, and when the wireless communications apparatus runs on the first device according to any one of the fifth aspect and the implementations of the fifth aspect or any one of the sixth aspect and the implementations of the sixth aspect, the first device is enabled to perform the communication method according to any one of the first aspect and the implementations of the first aspect or any one of the second aspect and the implementations of the second aspect. The wireless communications apparatus is a chip.

According to a sixteenth aspect, a wireless communications apparatus is disclosed. The wireless communications apparatus stores instructions, and when the wireless communications apparatus runs on the second device according to any one of the seventh aspect and the implementations of the seventh aspect or any one of the eighth aspect and the implementations of the eighth aspect, the second device is enabled to perform the communication method according to any one of the third aspect and the implementations of the third aspect or any one of the fourth aspect and the implementations of the fourth aspect. The wireless communications apparatus is a chip.

According to a seventeenth aspect, an embodiment of the present invention further provides a communication method. The method includes: If a first device determines that a number of bits of a CSI part 2 corresponding to a compressed-type CSI report is less than a number of bits of a CSI part 2 corresponding to an uncompressed-type CSI report, the first device determines that an actually used precoding matrix type is a compressed type.

If the first device determines that a number of bits of a CSI part 2 corresponding to a compressed-type CSI report is greater than or equal to a number of bits of a CSI part 2 corresponding to an uncompressed-type CSI report, the first device determines that an actually used precoding matrix type is a compressed type.

In the embodiments of the present invention, the first device (for example, the terminal) may calculate a number of bits of a CSI part 2 of an uncompressed-type CSI report based on a format of the uncompressed-type CSI report, or may calculate a number of bits of a CSI part 2 of a compressed-type CSI report based on a format of the compressed-type CSI report, and further select a report of a relatively small number of bits for reporting. This can reduce reporting overheads.

DESCRIPTION OF EMBODIMENTS

The following describes technical solutions of this application with reference to the accompanying drawings.

Figure 1:
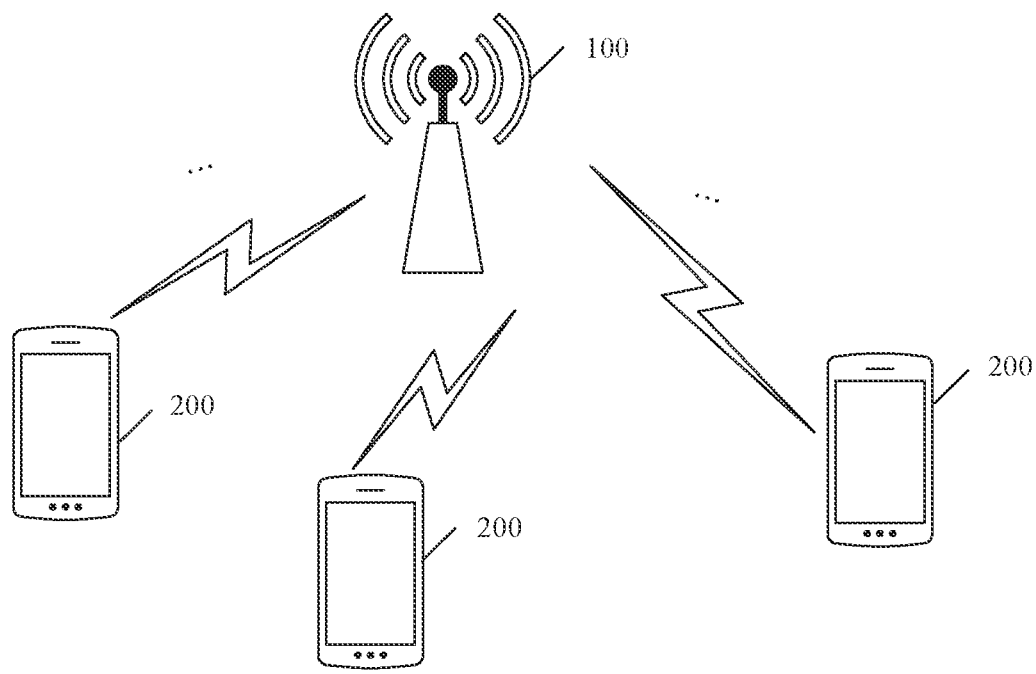
FIG. 1 is an architecture diagram of a communications system according to an embodiment of this application.

FIG. 1 is a schematic diagram of a communications system to which a technical solution provided in this application is applicable. The communications system may include one or more network devices 100 (only one network device is shown) and one or more terminals 200 connected to each network device 100. FIG. 1 is merely a schematic diagram, and does not constitute a limitation on a scenario to which the technical solution provided in this application is applicable.

The network device 100 may be a transmission reception point (transmission reception point, TRP), a base station, a relay station, an access point, or the like. The network device 100 may be a network device in a 5G communications system or a network device in a future evolved network, or may be a wearable device, a vehicle-mounted device, or the like. Alternatively, the network device 100 may be a base transceiver station (base transceiver station, BTS) in a global system for mobile communications (global system for mobile communication, GSM) or a code division multiple access (code division multiple access, CDMA) network, or may be an NB (NodeB) in wideband code division multiple access (wideband code division multiple access, WCDMA), or may be an eNB or an eNodeB (evolutional NodeB) in long term evolution (long term evolution, LTE). The network device 100 may alternatively be a radio controller in a cloud radio access network (cloud radio access network, CRAN) scenario.

The terminal 200 may be user equipment (user equipment, UE), an access terminal, a UE unit, a UE station, a mobile station, a mobile console, a remote station, a remote terminal, a mobile device, a UE terminal, a wireless communications device, a UE agent, a UE apparatus, or the like. The access terminal may be a cellular phone, a cordless telephone set, a session initiation protocol (session initiation protocol, SIP) phone, a wireless local loop (wireless local loop, WLL) station, a personal digital assistant (personal digital assistant, PDA), a handheld device with a wireless communication function, a computing device, another processing device connected to a wireless modem, a vehicle-mounted device, a wearable device, a terminal in a 5G network, a terminal in a future evolved public land mobile network (public land mobile network, PLMN), or the like.

In the communications system shown in FIG. 1, a plurality of antennas may be deployed on the network device 100 and the terminal 200, and communication is performed through MIMO, thereby significantly improving performance of the wireless communications system. In some implementations, the network device 100 is a transmit end device, and the terminal 200 is a receive end device. In another possible implementation, the terminal 200 is a transmit end device, and the network device 100 is a receive end device.

Referring to FIG. 1, in a communication process, a receive end device determines a channel matrix based on a reference signal transmitted by a transmit end device, and determines a precoding vector based on the channel matrix and a precoding matrix. Further, the receive end device feeds back related information (for example, a combination coefficient set) for obtaining the precoding vector to the transmit end device. The transmit end device obtains the precoding vector based on the information fed back by the receive end device, precodes to-be-transmitted data based on the precoding vector, and sends precoded data to the receive end device.

The following explains and describes terms in the embodiments of the present invention.

(1) Precoding Matrix:

In a MIMO system, a precoding technology is usually used to improve a channel, so as to improve spatial multiplexing (Spatial Multiplexing) system performance. Specifically, in the precoding technology, a precoding matrix that matches the channel is used to process a data stream (briefly referred to as a spatial stream or a spatial layer below) used for spatial multiplexing, so as to implement channel precoding and improve spatial stream received quality.

Each spatial stream in the MIMO system corresponds to one column vector in a precoding matrix. In a precoding process, a transmit end precodes the spatial stream by using the column vector. Therefore, the foregoing column vector may also be referred to as a precoding vector. The precoding vector may be determined by a receive end based on a channel condition and the precoding matrix, and is fed back to the transmit end device. Specifically, a network device may obtain a precoding matrix in a manner in which a terminal feeds back the precoding matrix or a precoding matrix indicator (Precoding Matrix Indicator, PMI) to the network device.

In addition, one spatial stream is a data stream at one spatial layer. In the embodiments of the present invention, there may be a plurality of spatial layers for spatial multiplexing. One or more spatial layers may be included in one spatial layer group.

(2) Space-domain basis vector set, precoding matrix, and combination coefficient set:

The spatial-domain basis vector set is a set of a series of spatial-domain orthogonal basis vectors, and a weighted sum of a plurality of candidate vectors that best match a channel may be used as a precoding vector. Currently, a precoding matrix W supported in the NR protocol may be represented as follows:

$$W = W_1 \times W_2 \quad (1)$$

First, L spatial-domain orthogonal basis vectors are selected from the spatial-domain basis vector set. Each of the L spatial-domain orthogonal basis vectors corresponds to two orthogonal beam vectors in two polarization directions, and 2L orthogonal beam vectors corresponding to the L spatial-domain orthogonal basis vectors constitute the matrix $W_1$. The 2L orthogonal beam vectors in the matrix $W_1$ may be referred to as preset orthogonal beam vectors. Specifically, $W_1$ may be represented as follows:

$$W_1 = \begin{bmatrix} b_{ls(0)} & b_{ls(1)} & \ldots & b_{ls(L-1)} & 0 & 0 & \ldots & 0 \\ 0 & 0 & \ldots & 0 & b_{ls(0)} & b_{ls(1)} & \ldots & b_{ls(L-1)} \end{bmatrix} \quad (2)$$

Specifically, $W_1$ is a matrix $(2N_1N_2*2L)$ formed by selected spatial-domain beam basis vectors, and there are 2L spatial-domain beam basis vectors (column vectors in $W_1$) in total in two polarization directions, where $N_1$ and $N_2$ respectively represent a quantity of antenna ports in a horizontal direction and a quantity of antenna ports in a vertical direction, and L is a quantity that is configured by a base station and that is of spatial-domain beam basis vectors selected for each spatial layer. In an implementation, same spatial-domain beam basis vectors are selected in two polarization directions, where a selected spatial-domain beam basis vector $b_{l_s(i)}$ (i=0, 1, ..., or L-1) is an $i^{th}$ basis vector selected from a rotation DFT basis matrix $(N_1N_2*N_1N_2)$. Correspondingly, $l_s(i)$ represents an index corresponding to a selected basis vector. A rotation 2D-DFT basis matrix may be represented as follows:

$$B_{N_1,N_2}(q_1,q_2) = (R_{N_1}(q_1)D_{N_1}) \otimes (R_{N_2}(q_2)D_{N_2}) = [b_0 b_1 \ldots b_{N_1N_2-1}]$$

Herein, $D_N$ is an orthogonal N×N DFT matrix, an element in an $m^{th}$ row and an $n^{th}$ column is $$[D_N]_{m,n} = \frac{1}{\sqrt{N}} e^{\frac{j2\pi mn}{N}}, \text{ and}$$

$$R_N(q) = \text{diag}\left(\left[e^{j2\pi \cdot 0 \cdot \frac{q}{N}} \ e^{j2\pi \cdot 1 \cdot \frac{q}{N}} \ \ldots \ e^{j2\pi \cdot (N-1) \cdot \frac{q}{N}}\right]\right)$$

represents an N×N rotation matrix. Assuming that rotation factors q are evenly distributed, $$q_1 = \frac{i}{O_1}, i = 0, 1, \ldots, O_1 - 1, \text{ and } q_2 = \frac{i}{O_2}, i = 0, 1, \ldots, O_2 - 1.$$

Correspondingly, a matrix formed by products of a rotation matrix and an orthogonal DFT matrix satisfies the following formula:

$$[R_N(q)D_N]_{m,n} = \frac{1}{\sqrt{N}} e^{\frac{j2\pi m(n+q)}{N}}.$$

The rotation factor q may also be referred to as a spatial-domain oversampling rotation factor.

In Formula (2), $b_{ls(i)}$ is a preset orthogonal beam vector described in the embodiments of the present invention, and lS(i) represents an index corresponding to a selected beam vector, where i=0, 1, ..., or L-1.

In the embodiments of the present invention, the spatial-domain basis vector set may be a set of basis vectors included in a dual-polarized rotation 2D-DFT basis matrix. It may be understood that several spatial-domain orthogonal basis vectors in the spatial-domain basis vector set may be weighted and combined to obtain one new spatial-domain vector, and the spatial-domain vector may correspond to a new transmit beam.

$W_2$ is a combination coefficient matrix. When a quantity of spatial layers is 1 (rank=1), $W_2$ may be represented as follows:

$$W_2 = \begin{bmatrix} p^{(1)}_{0,0,0} p^{(2)}_{0,0,0} \varphi^{(2)}_{0,0,0} \\ p^{(1)}_{0,0,1} p^{(2)}_{0,0,1} \varphi^{(2)}_{0,0,1} \\ \ldots \\ p^{(1)}_{0,0,(L-1)} p^{(2)}_{0,0,(L-1)} \varphi^{(2)}_{0,0,(L-1)} \\ p^{(1)}_{1,0,0} p^{(2)}_{1,0,0} \varphi^{(2)}_{1,0,0} \\ p^{(1)}_{1,0,1} p^{(2)}_{1,0,1} \varphi^{(2)}_{1,0,1} \\ \ldots \\ p^{(1)}_{1,0,(L-1)} p^{(2)}_{1,0,(L-1)} \varphi^{(2)}_{1,0,(L-1)} \end{bmatrix} \quad (3)$$

When a quantity of spatial layers is 2 (rank=2), $W_2$ may be represented as follows:

$$W_2 = \begin{bmatrix} p_{0,0,0}^{(1)}p_{0,0,0}^{(2)}\varphi_{0,0,0}^{(2)} & p_{0,1,0}^{(1)}p_{0,1,0}^{(2)}\varphi_{0,1,0}^{(2)} \\ p_{0,0,1}^{(1)}p_{0,0,1}^{(2)}\varphi_{0,0,1}^{(2)} & p_{0,1,1}^{(1)}p_{0,1,1}^{(2)}\varphi_{0,1,1}^{(2)} \\ \cdots & \cdots \\ p_{0,0,(L-1)}^{(1)}p_{0,0,(L-1)}^{(2)}\varphi_{0,0,(L-1)}^{(2)} & p_{0,1,(L-1)}^{(1)}p_{0,1,(L-1)}^{(2)}\varphi_{0,1,(L-1)}^{(2)} \\ p_{1,0,0}^{(1)}p_{1,0,0}^{(2)}\varphi_{1,0,0}^{(2)} & p_{1,1,0}^{(1)}p_{1,1,0}^{(2)}\varphi_{1,1,0}^{(2)} \\ p_{1,0,1}^{(1)}p_{1,0,1}^{(2)}\varphi_{1,0,1}^{(2)} & p_{1,1,1}^{(1)}p_{1,1,1}^{(2)}\varphi_{1,1,1}^{(2)} \\ \cdots & \cdots \\ p_{1,0,(L-1)}^{(1)}p_{1,0,(L-1)}^{(2)}\varphi_{1,0,(L-1)}^{(2)} & p_{1,1,(L-1)}^{(1)}p_{1,1,(L-1)}^{(2)}\varphi_{1,1,(L-1)}^{(2)} \end{bmatrix} \quad (4)$$

An element in the combination coefficient matrix may be referred to as a combination coefficient. The combination coefficient is a complex number, and is represented by an amplitude and a phase. The amplitude of the combination coefficient is referred to as an amplitude coefficient, and the phase of the combination coefficient is referred to as a phase coefficient. In a possible implementation, combination coefficients may include $p_{i,j,k}^{(1)}$, $p_{i,j,k}^{(2)}$, and $\varphi_{i,j,k}^{(2)}$ where $p_{i,j,k}^{(1)}$ represents a wideband amplitude coefficient of a combination coefficient corresponding to an $i^{th}$ polarization direction, a $j^{th}$ spatial layer, and a $k^{th}$ preset orthogonal beam vector, $p_{i,j,k}^{(2)}$ represents a subband amplitude coefficient of the combination coefficient corresponding to the $i^{th}$ polarization direction, the $j^{th}$ spatial layer, and the $k^{th}$ preset orthogonal beam vector, and $\varphi_{i,j,k}^{(1)}$ represents a subband phase coefficient of the combination coefficient corresponding to the $i^{th}$ polarization direction, the $j^{th}$ spatial layer, and the $k^{th}$ preset orthogonal beam vector.

It should be noted that a wideband may be a system bandwidth, or may be a part of the system bandwidth. In addition, the wideband may be divided into a plurality of subbands, and the subband may be understood as a bandwidth allocated by the network device to the terminal. A quantity of subbands into which the wideband is divided is not limited in the embodiments of the present invention.

In a possible implementation, in an entire bandwidth, all subbands use a same amplitude coefficient or phase coefficient. The amplitude coefficient may be referred to as a wideband amplitude coefficient, and the phase coefficient may be referred to as a wideband phase coefficient.

Specifically, 3-bit quantization is performed for $p_{i,j,k}^{(1)}$, 1-bit quantization is performed for $p_{i,j,k}^{(2)}$, and 2-bit quantization or 3-bit quantization is performed for $\varphi_{i,j,k}^{(1)}$. Because a combination coefficient corresponding to each subband needs to be reported, the precoding matrix shown in Formula (1) causes high PMI feedback overheads. To reduce PMI overheads, the precoding matrix shown in Formula (1) may be compressed. Currently, the combination coefficient matrix $W_2$ may be compressed through a frequency-domain correlation of the combination coefficient matrix $W_2$, thereby achieving an objective of compressing a precoding matrix.

For example, when rank=1, if a quantity of preset orthogonal beam vectors is 2L, a PMI frequency-domain granularity is δ, there are $N_3$ PMI frequency-domain granularities in total in frequency domain, and the entire bandwidth includes $N_{SB}$ subbands, the combination coefficient matrix $W_2$ corresponding to the $N_3$ PMI frequency-domain granularities includes 2L*N3 combination coefficients in total in two polarization directions. The PMI frequency-domain granularity δ may be X times a subband bandwidth. For example, X=1, ½, or ¼. Correspondingly, $N_3$ may be the quantity $N_{SB}$ of subbands, or may be twice or four times the quantity $N_{SB}$ of subbands. Alternatively, the PMI frequency-domain granularity δ may be a preconfigured bandwidth value, for example, X RBs, and $N_3$ may be a predefined value. Specifically, a frequency-domain basis matrix $W_{freq}$ is predefined. Generally, $W_{freq}$ is a matrix with $N_3$ rows and $N_3$ columns. By using a space-frequency compression idea, $W_2$ is compressed into $\tilde{W}$ by using a frequency-domain basis vector matrix $W_3$, where $W_3$ is a matrix formed by M frequency-domain basis vectors that are selected from the frequency-domain basis matrix $W_{freq}$. After the compression, the combination coefficient matrix becomes a matrix with 2L rows and M columns. Specifically, the compressed combination coefficient matrix is $\tilde{W}$, and $\tilde{W}$ may be represented as follows:

$$\tilde{W} = \begin{bmatrix} p_{0,0,0}\varphi_{0,0,0} & p_{0,0,1}\varphi_{0,0,1} & p_{0,0,(M-1)}\varphi_{0,0,(M-1)} \\ p_{0,1,0}\varphi_{0,1,0} & p_{0,1,1}\varphi_{0,1,1} & p_{0,1,(M-1)}\varphi_{0,1,(M-1)} \\ \cdots & \cdots & \cdots \\ p_{0,(L-1),0}\varphi_{0,(L-1),0} & p_{0,(L-1),1}\varphi_{0,(L-1),1} & \cdots & p_{0,(L-1),(M-1)}\varphi_{0,(L-1),(M-1)} \\ p_{1,0,0}\varphi_{1,0,0} & p_{1,0,1}\varphi_{1,0,1} & p_{1,0,(M-1)}\varphi_{1,0,(M-1)} \\ p_{1,1,0}\varphi_{1,1,0} & p_{1,1,1}\varphi_{1,1,1} & p_{1,1,(M-1)}\varphi_{1,1,(M-1)} \\ \cdots & \cdots & \cdots \\ p_{1,(L-1),0}\varphi_{1,(L-1),0} & p_{1,(L-1),1}\varphi_{1,(L-1),1} & p_{1,(L-1),(M-1)}\varphi_{1,(L-1),(M-1)} \end{bmatrix}$$

Herein, $p_{i,j,f}$ represents an amplitude coefficient of a combination coefficient corresponding to an $i^{th}$ polarization direction, a $j^{th}$ preset orthogonal beam vector, and an $f^{th}$ selected frequency-domain basis vector, and $\varphi_{i,j,f}$ represents a phase coefficient of the combination coefficient corresponding to the $i^{th}$ polarization direction, the $j^{th}$ preset orthogonal beam vector, and the $f^{th}$ selected frequency-domain basis vector. It may be understood that $p_{i,j,f}$ may also be referred to as a combination coefficient amplitude quantized value, and $\varphi_{i,j,f}$ may also be referred to as a combination coefficient phase quantized value.

It should be noted that, there is no frequency-domain wideband concept and/or subband concept for a combination coefficient in a compressed combination coefficient matrix. The combination coefficient in the compressed combination coefficient matrix is a combination complex coefficient corresponding to a space-frequency two-dimensional basis vector, and is represented by an amplitude coefficient and a phase coefficient. In a possible implementation, only a subset (including K' combination coefficients) of a combination coefficient set including 2L*K combination coefficients may be reported. Generally, during quantization, a combination coefficient with highest power (or a largest amplitude) in the 2L*K or K' combination coefficients is used as a reference to perform normalization processing on amplitudes and phases of all the combination coefficients. Therefore, the terminal only needs to report 2L*K−1 or K'−1 combination coefficients (except the strongest combination coefficient), indexes of preset orthogonal beam vectors, and indexes of selected frequency-domain basis vectors. It should be noted that the combination coefficient with the highest power (or the largest amplitude) in the 2L*K or K' combination coefficients may also be referred to as the strongest combination coefficient.

(3) Compressed-Type Precoding Matrix and Uncompressed-Type Precoding Matrix:

In the embodiments of the present invention, the transmit end precodes a transmit signal based on a precoding matrix.

If the receive end determines a precoding matrix by using the uncompressed combination coefficient matrix $W_2$, it is considered that the precoding matrix used by the receive end is an uncompressed-type precoding matrix; or if the receive end determines a precoding matrix by using the compressed combination coefficient matrix $\tilde{W}$, it is considered that the precoding matrix used by the receive end is a compressed-type precoding matrix.

(4) Compressed-Type Channel State Information (Channel State Information, CSI) Report and Uncompressed-Type CSI Report:

Generally, the terminal may report a PMI to the network device by using a CSI report. The PMI may include wideband PMI information, a combination coefficient corresponding to a preset orthogonal beam vector, and the like. Specifically, the terminal sends uplink control information (uplink control information, UCI) including a plurality of CSI reports to the network device. If the terminal uses an uncompressed-type precoding matrix, the terminal reports an uncompressed-type CSI report, which can indicate an uncompressed combination coefficient set and the like; or if the terminal uses a compressed-type precoding matrix, the terminal reports a compressed-type CSI report, which can indicate a compressed combination coefficient set and the like.

An existing CSI report supports a wideband reporting granularity and a subband reporting granularity, to report a wideband amplitude coefficient, a subband amplitude coefficient, and a subband phase coefficient that correspond to each subband. After a combination coefficient set is compressed based on a frequency-domain subband correlation, a compressed combination coefficient set does not include a subband-related amplitude coefficient and a subband-related phase coefficient. Therefore, a compressed combination coefficient set cannot be reported by using the existing CSI report.

An embodiment of the present invention provides a CSI report, so that a terminal can report a compressed combination coefficient set and the like, thereby improving transmission performance by using a MIMO technology.

Figure 2:
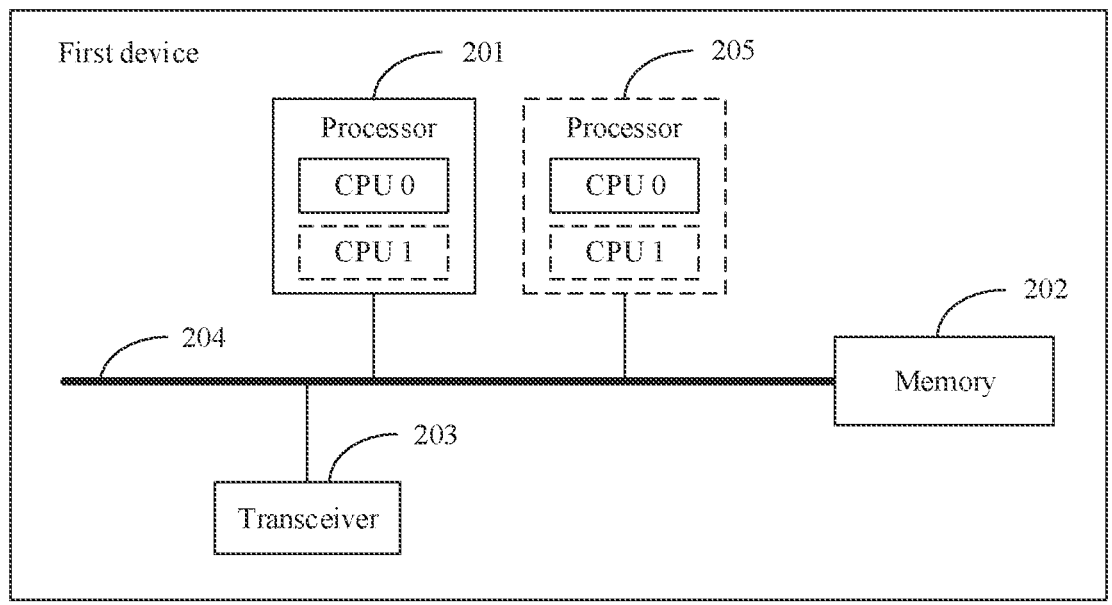
FIG. 2 is a structural block diagram of a first device according to an embodiment of the present invention.

An embodiment of the present invention provides a first device. The device may be the terminal 200 in the system shown in FIG. 1. As shown in FIG. 2, the device may include at least one processor 201, a memory 202, a transceiver 203, and a communications bus 204.

The following describes the components of the device in detail with reference to FIG. 2.

The processor 201 is a control center of the device, and may be one processor, or may be a collective name of a plurality of processing elements. For example, the processor 201 may be a central processing unit (central processing unit, CPU) or an application-specific integrated circuit (Application Specific Integrated Circuit, ASIC), or may be configured as one or more integrated circuits implementing the embodiments of the present invention, for example, one or more microprocessors (digital signal processor, DSP) or one or more field programmable gate arrays (Field Programmable Gate Array, FPGA).

The processor 201 may run or execute a software program stored in the memory 202, and invoke data stored in the memory 202, to perform various functions of the device.

During specific implementation, in an embodiment, the processor 201 may include one or more CPUs, for example, a CPU 0 and a CPU 1 shown in FIG. 2.

During specific implementation, in an embodiment, the device may include a plurality of processors, for example, the processor 201 and a processor 205 shown in FIG. 2. Each of the processors may be a single-core processor (single-CPU) or may be a multi-core processor (multi-CPU). The processor herein may be one or more devices, circuits, and/or processing cores configured to process data (for example, a computer program instruction).

The memory 202 may be a read-only memory (read-only memory, ROM) or another type of static storage device that can store static information and a static instruction, or may be a random access memory (random access memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. This is not limited thereto. The memory 202 may exist independently and is connected to the processor 201 by using the communications bus 204. Alternatively, the memory 202 may be integrated with the processor 201.

The memory 202 is configured to store a software program for executing the solutions of the present invention, and the processor 201 controls the execution.

The transceiver 203 is configured to communicate with a second device. Certainly, the transceiver 203 may be further configured to communicate with a communications network, such as the Ethernet, a radio access network (radio access network, RAN), or a wireless local area network (Wireless Local Area Networks, WLAN). The transceiver 203 may include a receiving unit for implementing a receiving function and a sending unit for implementing a sending function.

The communications bus 204 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, and the like. For ease of representation, only one thick line is used to represent the bus in FIG. 2, but this does not mean that there is only one bus or only one type of bus.

The device structure shown in FIG. 2 does not constitute a limitation on the device. The device may include more or fewer components than those shown in the figure, or combine some components, or have different component arrangements.

Figure 3:
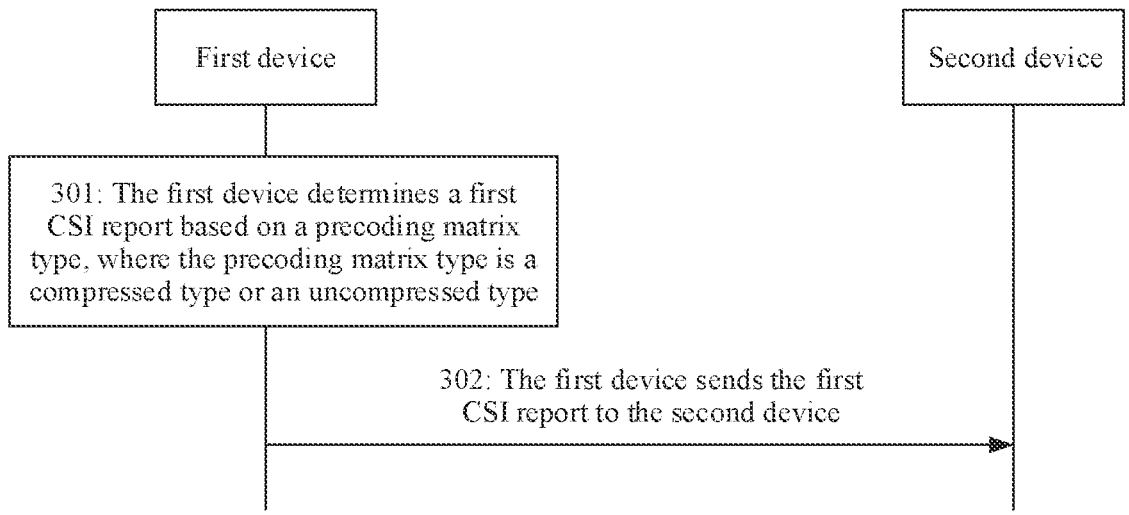
FIG. 3 is a schematic flowchart of a communication method according to an embodiment of the present invention.

An embodiment of the present invention provides a communication method. As shown in FIG. 3, the method includes the following steps.

301: A first device determines a first CSI report based on a precoding matrix type, where the precoding matrix type is a compressed type or an uncompressed type.

It should be noted that the precoding matrix type is a precoding matrix type actually used by the first device. A second device preconfigures a precoding matrix type for the first device, and the first device may use the precoding matrix type preconfigured by the second device, or may not use the precoding matrix type preconfigured by the second device. In addition, the first device may be the terminal in the communications system shown in FIG. 1, for example, UE, and the second device may be the network device in the communications system shown in FIG. 1, for example, a base station.

Further, a type of a CSI report of the first device that is finally reported by the first device to the second device matches the actually used precoding matrix type. If the precoding matrix type actually used by the first device is the compressed type, the CSI report reported by the first device is compressed-type CSI report; or if the precoding matrix type actually used by the first device is the uncompressed type, the CSI report reported by the first device is uncompressed-type CSI report.

Specifically, the first CSI report includes a CSI part 1 and a CSI part 2. The CSI part 1 is used to indicate a number of bits of the CSI part 2 and the precoding matrix type, and the CSI part 2 is used to indicate wideband PMI information.

It should be noted that the CSI part 1 indicates a maximum bit length of the CSI part 2, and the wideband PMI information is used to indicate an oversampling factor of a preset orthogonal beam vector and/or an index of the preset orthogonal beam vector. Specifically, if the first device uses an uncompressed-type precoding matrix, the wideband PMI information includes the oversampling factor of the preset orthogonal beam vector and/or the index of the preset orthogonal beam vector, index indication information of a strongest preset orthogonal beam vector, and a wideband amplitude coefficient corresponding to each preset orthogonal beam vector.

If the first device uses a compressed-type precoding matrix, the wideband PMI information includes at least one of the oversampling factor of the preset orthogonal beam vector, the index of the preset orthogonal beam vector, a frequency-domain oversampling factor, a frequency-domain basis vector index, and index indication information of a strongest combination coefficient. In a possible implementation, the wideband PMI information may further include index information of a combination coefficient whose amplitude coefficient is zero and/or index information of a combination coefficient whose amplitude coefficient is non-zero.

In addition, preset orthogonal beam vectors are 2L orthogonal beam vectors in two polarization directions for L spatial-domain orthogonal basis vectors selected by the first device from a spatial-domain basis vector set.

In a possible implementation, the first device may obtain, by using a message from the second device, the precoding matrix type preconfigured by the second device for the first device. For example, the second device configures the precoding matrix type for the first device by using higher layer signaling. Further, the first device may determine the actually used precoding matrix type based on the precoding matrix type preconfigured by the second device. Specifically, the following four implementations are included:

In a first implementation, if the precoding matrix type preconfigured by the second device for the first device is the uncompressed type, the precoding matrix type actually used by the first device is the uncompressed type.

In a second implementation, if the precoding matrix type preconfigured by the second device for the first device is the compressed type, the first device first determines at least one compressed-type CSI report, and calculates a code rate of UCI including the at least one compressed-type CSI report. If the code rate of the UCI is greater than a first threshold, the first device considers that an overhead requirement cannot be satisfied by using the compressed-type CSI report, and a reporting type needs to be switched to an uncompressed type. Subsequently, the first device reports an uncompressed-type CSI report to the second device by using an uncompressed-type precoding matrix.

In a third implementation, if the precoding matrix type preconfigured by the second device for the first device is the compressed type, similarly, the first device first determines at least one compressed-type CSI report, and calculates a code rate of UCI including the at least one compressed-type CSI report. If the code rate of the UCI is less than or equal to a first threshold, the first device considers that an overhead requirement can be satisfied by using the compressed-type CSI report. Subsequently, the first device reports the compressed-type CSI report to the second device by using a compressed-type precoding matrix.

In a fourth implementation, when the preconfigured precoding matrix type is the compressed type, if the first device determines that a number of bits of a CSI part 2 corresponding to a compressed-type CSI report is less than a number of bits of a CSI part 2 corresponding to an uncompressed-type CSI report, the first device determines that the finally used precoding matrix type is the compressed type; or if the first device determines that a number of bits of a CSI part 2 corresponding to a compressed-type CSI report is greater than or equal to a number of bits of a CSI part 2 corresponding to an uncompressed-type CSI report, the first device determines that the finally used precoding matrix type is the uncompressed type.

It should be noted that the first threshold is a code rate threshold determined based on the overhead requirement for reporting a CSI report. Specifically, the first device sends at least one CSI report to the second device by using UCI, so that whether the overhead requirement is satisfied can be determined based on a code rate of the UCI. For example, if the code rate of the UCI is greater than the first threshold, it may be considered that overheads for reporting a CSI report are very high, and consequently the overhead requirement is not satisfied; or if the code rate of the UCI is less than the first threshold, it may be considered that overheads for reporting a CSI report satisfy the overhead requirement. It should be noted that the first threshold in the second implementation may be the same as or different from the first threshold in the third implementation.

When the UE is scheduled to transmit a CSI report (report) and uplink data on a PUSCH in a multiplexing manner, a code rate threshold is $$c_T = \frac{C_{MCS}}{\beta_{offset}^{CSI-2}},$$

where $c_{MCS}$ represents a code rate of a target PUSCH, and $\beta_{offset}^{CSI-2}$ represents a predefined CSI offset value. Alternatively, when the UE is scheduled to transmit a CSI report on a PUSCH without multiplexing an uplink data block, a code rate threshold is $$c_T = \frac{R}{\beta_{offset}^{CSI-part2}},$$

where $\beta_{offset}^{CSI-part2}$ represents a predefined CSI offset value, and R depends on a code rate calculated by the UE or a code rate indicated in DCI. When the CSI report of the UE and the uplink data are transmitted on the PUSCH in a multiplexing manner, or when the CSI report of the UE is transmitted on the PUSCH without multiplexing the uplink data block, some fields in a CSI part 2 may be deleted in ascending order of deletion priorities, until a code rate of the UCI is less than or equal to the code rate threshold cr. The target PUSCH is a PUSCH on which a CSI report and uplink data are transmitted in a multiplexing manner.

In a possible implementation, when the UE is scheduled to transmit the CSI report and the uplink data on the PUSCH in a multiplexing manner, and when $$\left[ (O_{CSI\text{-}2} + L_{CSI\text{-}2}) \cdot \beta_{offset}^{PUSCH} \cdot \sum_{l=0}^{N_{symb,all}^{PUSCH}-1} M_{sc}^{UCI}(l) \bigg/ \sum_{r=0}^{C_{UL\text{-}SCH}-1} K_r \right] >$$

$$\left[ \alpha \cdot \sum_{l=0}^{N_{symb,all}^{PUSCH}-1} M_{SC}^{UCI}(l) \right] - Q'_{ACK} - Q'_{CSI\text{-}1},$$

deletion is performed, $$\text{until} \left[ (O_{CSI\text{-}2} + L_{CSI\text{-}2}) \cdot \beta_{offset}^{PUSCH} \cdot \sum_{l=0}^{N_{symb,all}^{PUSCH}-1} M_{sc}^{UCI}(l) \bigg/ \sum_{r=0}^{C_{UL\text{-}SCH}-1} K_r \right] \le$$

$$\left[ \alpha \cdot \sum_{l=0}^{N_{symb,all}^{PUSCH}-1} M_{SC}^{UCI}(l) \right] - Q'_{ACK} - Q'_{CSI\text{-}1}.$$

Herein, $M_{sc}^{UCI}(l)$ is a quantity of resource units that can be occupied by the UCI on an OFDM symbol l: $O_{CSI\text{-}2}$ is a quantity of bits of a CSI part 2; $Q'_{CSI\text{-}1}$ is a quantity of symbols obtained by performing coding and modulation on a CSI part 1 at each spatial layer carried on the PUSCH; $\alpha$ is a proportional coefficient configured by using higher layer signaling: $Q'_{ACK}$ is a quantity of symbols obtained by performing coding and modulation on a hybrid automatic repeat request-acknowledgment (hybrid automatic repeat request ACK, HARQ-ACK) at each spatial layer carried on the PUSCH; $L_{CSI\text{-}2}$ is a cyclic redundancy check (cyclic redundancy check, CRC) bit length of the CSI part 2; and $\beta$ is a predefined code rate compensation value. The resource unit may be a resource element (resource element, RE).

In a possible implementation, the first device may further determine a combination coefficient set based on the actually used precoding matrix type. The combination coefficient set includes at least one combination coefficient. It should be noted that the combination coefficient varies with the precoding matrix type actually used by the first device. For example, if the precoding matrix type actually used by the first device is the compressed type, the combination coefficient includes an amplitude coefficient and a phase coefficient. For details, refer to the matrix form shown in Formula (5) above. If the precoding matrix type actually used by the first device is the uncompressed type, the combination coefficient includes a wideband amplitude coefficient, a subband amplitude coefficient, and a subband phase coefficient. For details, refer to the matrix form shown in Formula (3) or Formula (4) above.

Further, the first device may determine a CSI report based on the combination coefficient set. The following describes two types of CSI reports in detail:

(1) Compressed-Type CSI Report

Specifically, the compressed-type CSI report includes a CSI part 1 and a CSI part 2.

The CSI part 1 includes a rank indicator (rank indicator, RI), a wideband channel quality indicator (channel quality index, CQI) of a first transport block (TB), a subband differential CQI of the first transport block, and a combination coefficient quantity indication field.

During specific implementation, the rank indicator represents a quantity (rank) of spatial layers used by the first device and the second device to perform communication by using a sampling precoding technology.

The first transport block is the $1^{st}$ transport block on a physical downlink data channel corresponding to the first CSI report, that is, the $1^{st}$ transport block on the physical downlink data channel that is scheduled after the second device receives UCI including the first CSI report.

The subband differential CQI is a differential CQI based on a wideband CQI, that is, a difference between a subband CQI and the wideband CQI. The subband CQI may be determined based on the wideband CQI and the subband differential CQI.

The combination coefficient quantity indication field is a field that is in the CSI part 1 and that is used to indicate a quantity of combination coefficients. In this embodiment of the present invention, the combination coefficient quantity indication field may be a first value corresponding to each spatial layer or a second value corresponding to each spatial layer. The first value is a quantity of combination coefficients whose amplitude coefficients are zero in a combination coefficient set or a quantity of combination coefficients whose amplitude coefficients are non-zero in a combination coefficient set, and the second value is a quantity of combination coefficients corresponding to a preset orthogonal beam vector. All preset orthogonal beam vectors correspond to a same quantity of combination coefficients.

It should be noted that, in a MIMO technology, precoding at each spatial layer may be relatively independent, and quantities of combination coefficients included in corresponding combination coefficient sets are different when precoding is performed at all spatial layers.

In a possible implementation, if the compressed-type CSI report continues to use an existing uncompressed-type CSI report, a number of bits of the CSI part 1 of the compressed-type CSI report is the same as a number of bits of a CSI part 1 of the uncompressed-type CSI report.

Further, in the CSI part 1 of the compressed-type CSI report, the first value is a quantity M of combination coefficients whose amplitude coefficients are zero in a combination coefficient set, and quantities of combination coefficients whose amplitude coefficients are zero in combination coefficient sets are the same or different when precoding is performed at all the spatial layers; or the first value is a quantity R of combination coefficients whose amplitude coefficients are non-zero in a combination coefficient set, and quantities of combination coefficients whose amplitude coefficients are non-zero in combination coefficient sets are the same or different when precoding is performed at all the spatial layers.

Therefore, the CSI part 1 of the compressed-type CSI report includes first values corresponding to different spatial layers, and the first values corresponding to the different spatial layers may be the same or may be different.

In addition, the second value is a quantity N of combination coefficients corresponding to a preset orthogonal beam vector, and quantities of combination coefficients corresponding to each preset orthogonal beam vector are the same or different when precoding is performed at each spatial layer. Therefore, the CSI part 1 of the compressed-type CSI report includes second values corresponding to different spatial layers, and the second values corresponding to the different spatial layers may be the same or may be different.

In this embodiment of the present invention, a combination coefficient corresponding to the preset orthogonal beam vector may be considered as a weighting coefficient used when the preset orthogonal beam vector simulates a transmit beam.

In some possible implementations, a first indicator may be added to the CSI part 1, to explicitly indicate a precoding matrix type. Specifically, the CSI part 1 further includes the first indicator. The first indicator may indicate whether the precoding matrix type is a compressed type or an uncompressed type. For example, the first indicator may be "0" or "1", where "0" indicates that the precoding matrix type is the compressed type, and "1" indicates that the precoding matrix type is the uncompressed type. The CSI part 1 of the compressed-type CSI report may include an indicator bit "0", which indicates that the precoding matrix type is the compressed type. On the contrary, the CSI part 1 of the uncompressed-type CSI report may include an indicator bit "1", which indicates that the precoding matrix type is the uncompressed type.

In some possible implementations, an existing field in the CSI part 1 may be used to implicitly indicate a precoding matrix type. For example, if the combination coefficient quantity indication field is zero, the precoding matrix type is a compressed type; or if the combination coefficient quantity indication field is non-zero, the precoding matrix type is an uncompressed type.

In this possible implementation, the CSI part 1 of the compressed-type CSI report does not include a first indicator, and the combination coefficient quantity indication field is zero. In addition, a same quantity of combination coefficients are used at all the spatial layers, and a quantity of combination coefficients that correspond to each spatial layer and whose amplitude coefficients are zero is a preconfigured value, or a quantity of combination coefficients that correspond to each spatial layer and whose amplitude coefficients are non-zero is a preconfigured value, or quantities of combination coefficients corresponding to all the preset orthogonal beam vectors are a same preconfigured value.

The CSI part 2 includes a wideband PMI information field and a combination coefficient information field that corresponds to all the preset orthogonal beam vectors at each spatial layer in each spatial layer group.

The wideband PMI information field is used to indicate wideband PMI information, and the wideband PMI information is used to indicate an oversampling factor of a preset orthogonal beam vector and/or an index of the preset orthogonal beam vector. Specifically, the wideband PMI information field may include spatial-domain related PMI information and frequency-domain related PMI information. The spatial-domain related PMI information may be the oversampling factor of the preset orthogonal beam vector and/or the index of the preset orthogonal beam vector. The frequency-domain related PMI information is an oversampling factor of a frequency-domain basis vector and/or an index of the frequency-domain basis vector, and index indication information of a strongest combination coefficient.

The wideband PMI information may further include index information of a combination coefficient whose amplitude coefficient is zero and/or index information of a combination coefficient whose amplitude coefficient is non-zero. The index information of the combination coefficient whose amplitude coefficient is zero and/or the index information of the combination coefficient whose amplitude coefficient is non-zero may be indicated in a bitmap form.

The combination coefficient information field includes Q combination coefficients corresponding to all the preset orthogonal beam vectors at one spatial layer in one spatial layer group. It should be noted that all the preset orthogonal beam vectors are L spatial-domain orthogonal basis vectors selected from a spatial-domain basis vector set. During specific implementation, the Q combination coefficients corresponding to all the preset orthogonal beam vectors at one spatial layer in one spatial layer group constitute one combination coefficient information field. Therefore, the CSI part 2 of the compressed-type CSI report includes a plurality of combination coefficient information fields. In addition, different combination coefficient information fields may be arranged in descending order of priorities of corresponding spatial layer groups, and a plurality of combination coefficient information fields corresponding to one spatial layer group may be arranged in ascending order of indexes of spatial layers. In one combination coefficient information field, all combination coefficients may be arranged in ascending order of indexes of corresponding preset orthogonal beam vectors. In one combination coefficient information field, a plurality of combination coefficients corresponding to one preset orthogonal beam vector may be arranged in descending order of power. It should be noted that a power value of a combination coefficient may be determined by using an amplitude coefficient of the combination coefficient. In this embodiment of the present invention, an order of arranging all combination coefficient information fields in a CSI part 2 and an order of arranging all combination coefficients in a combination coefficient information field are not limited to the foregoing several possible implementations, and there may be another arrangement order. This is not limited in this embodiment of the present invention.

It should be noted that a priority of a spatial layer group may be determined based on a number of the spatial layer group, or may be determined based on another attribute of the spatial layer group. For example, a smaller number of a spatial layer group indicates a higher priority of the spatial layer group.

For example, there are four spatial layers for spatial multiplexing, and the spatial layers are a spatial layer 1, a spatial layer 2, a spatial layer 3, and a spatial layer 4 in descending order of index numbers of the spatial layers. The spatial layer 1 and the spatial layer 2 are in a spatial layer group 1, and the spatial layer 3 and the spatial layer 4 are in a spatial layer group 2. A priority of the spatial layer group 1 is higher than a priority of the spatial layer group 2. Four spatial-domain orthogonal basis vectors are selected from the spatial-domain basis vector set as preset orthogonal beam vectors, and the preset orthogonal beam vectors are a beam vector 1, a beam vector 2, a beam vector 3, and a beam vector 4 in ascending order of index numbers of the preset orthogonal beam vectors. Quantities of combination coefficients corresponding to each beam vector at all the spatial layers are the same, and the combination coefficients may be specifically A and B. In this case, the combination coefficient information field included in the CSI part 2 is (A, B).

In a possible implementation, one combination coefficient information field may further include a first combination coefficient information field and a second combination coefficient information field. The first combination coefficient information field includes the first $\lfloor Q/2 \rfloor$ combination coefficients in the Q combination coefficients that are arranged in descending order of power, and the second combination coefficient information field includes the last $(Q-\lfloor Q/2 \rfloor)$ combination coefficients in the Q combination coefficients that are arranged in descending order of the power.

For example, there are four spatial layers for spatial multiplexing, and the spatial layers are a spatial layer 1, a spatial layer 2, a spatial layer 3, and a spatial layer 4 in descending order of index numbers of the spatial layers. The spatial layer 1 and the spatial layer 2 are in a spatial layer group 1, and the spatial layer 3 and the spatial layer 4 are in a spatial layer group 2. A priority of the spatial layer group 1 is higher than a priority of the spatial layer group 2. Four spatial-domain orthogonal basis vectors are selected from the spatial-domain basis vector set as preset orthogonal beam vectors, and the preset orthogonal beam vectors are a beam vector 1, a beam vector 2, a beam vector 3, and a beam vector 4 in ascending order of index numbers of the preset orthogonal beam vectors. Quantities of combination coefficients corresponding to each beam vector at all the spatial layers are the same and each are 6, and the combination coefficients are specifically A, B, C, D, E and F in descending order of power. In this case, the first combination coefficient information field included in the CSI part 2 is (A, B, C), and the second combination coefficient information field is (D, E, F).

It should be noted that different combination coefficient information fields in the CSI part 2 may be arranged based on indexes of corresponding spatial layers, and combination coefficients in a combination coefficient information field at one spatial layer are arranged based on beam indexes.

(2) Uncompressed-Type CSI Report

Similarly, the uncompressed-type CSI report includes a CSI part 1 and a CSI part 2.

The CSI part 1 includes a rank indicator, a wideband CQI of a first transport block, a subband differential CQI of the first transport block, and a combination coefficient quantity indication field. The first transport block is the $1^{st}$ transport block on a physical downlink data channel corresponding to the first CSI report.

The combination coefficient quantity indication field in the CSI part 1 of the uncompressed-type CSI report is a third value corresponding to each spatial layer, and the third value is a quantity of preset orthogonal beam vectors corresponding to non-zero wideband amplitude coefficients in a combination coefficient set. In addition, quantities of preset orthogonal beam vectors corresponding to non-zero wideband amplitude coefficients in a combination coefficient set may be the same or may be different at all spatial layers. In other words, the CSI part 1 of the uncompressed-type CSI report may include a plurality of different third values corresponding to different spatial layers, and the third values corresponding to the different spatial layers may be the same or may be different.

In a possible implementation, the CSI part 1 further includes a first indicator, and the first indicator is used to indicate whether a precoding matrix type is a compressed type or an uncompressed type. For example, the first indicator may be "0" or "1", where "0" indicates that the precoding matrix type is the compressed type, and "1" indicates that the precoding matrix type is the uncompressed type. The CSI part 1 of the uncompressed-type CSI report may include an indicator bit "1", which indicates that the precoding matrix type is the compression type.

In a possible implementation, if the combination coefficient quantity indication field is non-zero, the precoding matrix type is the uncompressed type.

The CSI part 2 includes a wideband PMI information field, a first subband PMI information field, and a second subband PMI information field.

The wideband PMI information field is used to indicate wideband PMI information, and the wideband PMI information may include an oversampling factor of a preset orthogonal beam vector, an index of the preset orthogonal beam vector, a wideband amplitude coefficient corresponding to the preset orthogonal beam vector, and the like. The first subband PMI information field is used to indicate PMI information of an even-numbered subband, and the PMI information of the even-numbered subband may include a subband amplitude corresponding to each preset orthogonal beam vector of the even-numbered subband and a subband phase corresponding to each preset orthogonal beam vector of the even-numbered subband. The second subband PMI information field is used to indicate PMI information of an odd-numbered subband, and the PMI information of the odd-numbered subband may include a subband amplitude corresponding to each preset orthogonal beam vector of the odd-numbered subband and a subband phase corresponding to each preset orthogonal beam vector of the odd-numbered subband.

It should be noted that a number of bits of a CSI part 1 used when the precoding matrix type is the compressed type is the same as a number of bits of a CSI part 1 used when the precoding matrix type is the uncompressed type, in other words, the number of bits of the CSI part 1 of the compressed-type CSI report is the same as the number of bits of the CSI part 1 of the uncompressed-type CSI report.

302: The first device sends the first CSI report to the second device.

During specific implementation, the first device may send a plurality of CSI reports to the second device by using UCI. Before actually sending the CSI report, the first device may first determine whether the to-be-sent UCI satisfies the overhead requirement, and adjust the to-be-sent UCI based on a determining result.

Specifically, the first device determines UCI including the first CSI report. The UCI includes the first CSI report. The UCI further includes at least one second CSI report. The at least one second CSI report and the first CSI report are of a same type. In other words, the plurality of CSI reports from the first device by using the UCI are of a same type.

Further, when a code rate of the UCI is greater than the first threshold, the first device may delete some fields from the to-be-sent UCI. Therefore, when a code rate of the UCI from which the fields are deleted satisfies the first threshold, the first device sends the UCI to the second device.

In a possible implementation, the first device deletes first subband PMI information fields and/or second subband PMI information fields in some CSI reports based on a preset priority. In other words, a CSI part 2 corresponding to at least one CSI report in the finally to-be-sent UCI does not include at least one of the first subband PMI information field and the second subband PMI information field, so that a code rate of the UCI is less than or equal to the first threshold.

It should be noted that the preset priority may be that the wideband PMI information field has a highest priority.

A smaller number of a CSI report indicates a higher priority of a field in the CSI report.

In fields in one CSI report, a priority of the first subband PMI information field is higher than a priority of the second subband PMI information field.

It should be noted that the present invention does not limit a priority sequence of the foregoing pieces of information.

The following describes in detail a format of a CSI report that is reported in the method procedure shown in FIG. 3. First, the CSI report may be used to report compressed-type precoding information, or may be used to report uncompressed-type precoding information. The UE may autonomously select a to-be-used reporting format based on factors such as an overhead requirement and system performance. The following describes in detail the format of the CSI report. Specifically, the CSI report includes a CSI part 1 and a CSI part 2.

The CSI part 1 uses a predefined fixed bit length, and the number of bits is completely equal to a number of bits of the CSI part 1 of the uncompressed-type CSI report. The CSI part 1 includes an RI, a CQI, and a combination coefficient quantity indication field. A bit length of each field is fixed, and the combination coefficient quantity indication field is used to indicate a quantity of combination coefficients included in the CSI part 2. A format of the CSI part 1 is shown in Table 1 or Table 2.

mined when an uncompressed-type precoding matrix is used). At all the spatial layers, quantities of preset orthogonal beam vectors corresponding to combination coefficients whose wideband amplitude coefficients are non-zero in the combination coefficient set are the same or different. Therefore, when the CSI part 1 explicitly indicates that the precoding matrix type is the uncompressed type, the combination coefficient quantity indication field may be a plurality of values (for example, X), and each value indicates a quantity of preset orthogonal beam vectors corresponding to combination coefficients whose wideband amplitude coefficients are non-zero in the combination coefficient set at one spatial layer. A quantity of preset orthogonal beam vectors corresponding to combination coefficients whose wideband amplitude coefficients are non-zero may be considered as a total quantity of preset orthogonal beam vectors corresponding to non-zero wideband amplitude coefficients.

The quantity Y of combination coefficients is a quantity of combination coefficients corresponding to each preset orthogonal beam. Quantities of combination coefficients corresponding to all the preset orthogonal beam vectors may be the same or may be different. In addition, at all the spatial layers, each preset orthogonal beam vector also corresponds to a same quantity of combination coefficients.

The quantity Z of combination coefficients whose amplitude coefficients are zero is a quantity of combination coefficients whose amplitude coefficients are zero in a com-

TABLE 1

| CSI report index | CSI field |
|---|---|
| CSI report #n (CSI report numbered n) | RI<br>Wideband CQI of the first transport block<br>Subband differential CQI of the first transport block |
| CSI part 1 | First indicator: indicate that a precoding matrix type is a compressed type or an uncompressed type.<br>Combination coefficient quantity indication field:<br>In an uncompressed mode, this field is a quantity X of preset orthogonal beam vectors whose wideband amplitude coefficients are non-zero at each spatial layer.<br>In a compressed mode, this field is a quantity Y of combination coefficients corresponding to each preset orthogonal beam vector at each spatial layer, or a quantity Z of combination coefficients that correspond to each spatial layer and whose amplitude coefficients are zero, or a quantity H of combination coefficients that correspond to each spatial layer and whose amplitude coefficients are non-zero.<br>Reference signal received power RSRP (Reference signal received power (if reported)<br>Differential RSRP (if reported) |

Referring to Table 1, the CSI part 1 explicitly indicates the precoding matrix type by using the first indicator. The first indicator may have two values, which indicate that the precoding matrix type is the compressed type or the uncompressed type. In addition, in this reporting mode, all the preset orthogonal beam vectors use a same combination coefficient set at all the spatial layers, and the CSI part 1 describes only a quantity of combination coefficients corresponding to one spatial layer.

For example, X is a quantity of preset orthogonal beam vectors corresponding to combination coefficients whose wideband amplitude coefficients are non-zero in a combination coefficient set (the combination coefficient set deterbination coefficient set (the combination coefficient set determined when a compressed-type precoding matrix is used). At all the spatial layers, quantities of combination coefficients whose amplitude coefficients are zero in the combination coefficient set are the same or different.

The quantity Z of combination coefficients whose amplitude coefficients are zero is a quantity of combination coefficients whose amplitude coefficients are non-zero in a combination coefficient set (the combination coefficient set determined when a compressed-type precoding matrix is used). At all the spatial layers, quantities of combination coefficients whose amplitude coefficients are non-zero in the combination coefficient set are the same or different.

TABLE 2

| CSI report index | CSI field |
|---|---|
| CSI report #n | RT |
| CSI part 1 | Wideband CQI of the first transport block |
| CSI report index | CSI field |
| | Subband differential CQI of the first transport block |
| | Combination coefficient quantity indication field: |
| | In an uncompressed mode, this field is a quantity X of preset orthogonal beam vectors corresponding to combination coefficients whose wideband amplitude coefficients are non-zero at each spatial layer. |
| | In a compressed mode, this field is 0, which implicitly indicates that a precoding matrix is of a compressed-type. |
| | (Optional) Reference signal received power (reference signal received power, RSRP) |
| | (Optional) Differential RSRP |

Referring to Table 2, the CSI part 1 implicitly indicates the precoding matrix type by using the combination coefficient quantity indication field, and X is a quantity of preset orthogonal beam vectors corresponding to combination coefficients whose wideband amplitude coefficients are non-zero in a corresponding combination coefficient set at one spatial layer. All the spatial layers may correspond to same or different values of X. The CSI part 1 may include a plurality of values of X, which correspond to different spatial layers. When the combination coefficient quantity indication field is zero, a quantity of combination coefficients that correspond to each spatial layer and whose amplitude coefficients are zero is a preconfigured value, or quantities of combination coefficients corresponding to all the preset orthogonal beam vectors are a same preconfigured value.

For the CSI part 2, a number of bits of a CSI part 2 of a compressed-type CSI report is not equal to a number of bits of a CSI part 2 of an uncompressed-type CSI report. If the CSI part 1 indicates that the precoding matrix type is the uncompressed type, the CSI part 2 is reported in an existing CSI part 2 format. The CSI part 2 includes a wideband PMI information field and a subband PMI information field. For a specific format of the CSI part 2, refer to Table 3 to Table 5. If the CSI part 1 indicates that the precoding matrix type is the compressed mode, the CSI part 2 is reported in the format shown in Table 6 to Table 12.

TABLE 3

| CSI report index | CSI field |
|---|---|
| CSI report #n | Spatial layer indication (if reported) |
| CSI part 2 | Wideband PMI information field $X_1$ |
| | Subband PMI information field $X_2$ corresponding to even-numbered subbands in ascending order of subband indexes |
| | Subband PMI information field $X_2$ corresponding to odd-numbered subbands in ascending order of the subband indexes |

It should be noted that the wideband PMI information field $X_1$ in Table 3 is used to indicate wideband PMI information. For a specific format and specific content of the field, refer to Table 4. The subband PMI information field $X_2$ corresponding to the even-numbered subbands is the first subband PMI information field described in this embodiment of the present invention, and the subband PMI information field $X_2$ corresponding to the odd-numbered subbands is the second subband PMI information field described in this embodiment of the present invention. In this embodiment of the present invention, the even-numbered subband is a subband with an even-numbered subband index, for example, a subband 0, a subband 2, or a subband 4, and the odd-numbered subband is a subband with an odd-numbered subband index, for example, a subband 1, a subband 3, or a subband 5. The subband PMI information field $X_2$ is used to indicate subband PMI information. For a specific format and specific content of the field, refer to Table 5.

TABLE 4

| | Wideband PMI information field $X_1$ | | | | | |
|---|---|---|---|---|---|---|
| | $i_{1,1}$ | $i_{1,2}$ | $i_{1,3,1}$ | $i_{1,4,1}$ | $i_{1,3,2}$ | $i_{1,4,2}$ |
| Rank = 1: wideband amplitude | $\lceil \log_2(O_1 O_2) \rceil$ | $\left\lceil \log_2\binom{N_1 N_2}{L} \right\rceil$ | $\lceil \log_2(2L) \rceil$ | $3(2L-1)$ | N/A | N/A |

TABLE 4-continued

| | Wideband PMI information field $X_1$ | | | | | |
|---|---|---|---|---|---|---|
| | $i_{1,1}$ | $i_{1,2}$ | $i_{1,3,1}$ | $i_{1,4,1}$ | $i_{1,3,2}$ | $i_{1,4,2}$ |
| Rank = 2: wideband amplitude | $\lceil\log_2(O_1O_2)\rceil$ | $\left\lceil\log_2\binom{N_1N_2}{L}\right\rceil$ | $\lceil\log_2(2L)\rceil$ | $3(2L-1)$ | $\lceil\log_2(2L)\rceil$ | $3(2L-1)$ |
| Rank = 1: subband amplitude | $\lceil\log_2(O_1O_2)\rceil$ | $\left\lceil\log_2\binom{N_1N_2}{L}\right\rceil$ | $\lceil\log_2(2L)\rceil$ | $3(2L-1)$ | N/A | N/A |
| Rank = 2: subband amplitude | $\lceil\log_2(O_1O_2)\rceil$ | $\left\lceil\log_2\binom{N_1N_2}{L}\right\rceil$ | $\lceil\log_2(2L)\rceil$ | $3(2L-1)$ | $\lceil\log_2(2L)\rceil$ | $3(2L-1)$ |

It should be noted that, in Table 4, the field $i_{1,1}$ is used to indicate an oversampling factor of a selected spatial-domain beam, that is, a selected candidate spatial-domain beam basis vector group (including $N_1N_2$ candidate spatial-domain beam basis vectors); the field $i_{1,2}$ is used to indicate indexes of L spatial-domain orthogonal basis vectors selected from $N_1N_2$ spatial-domain basis vector sets: the field $i_{1,3,1}$ is used to indicate an index of a strongest beam vector in 2L preset orthogonal beam vectors, where the strongest beam vector may be a spatial-domain beam vector with a maximum wideband amplitude coefficient; the field $i_{1,4,1}$ is used to indicate an index of a strongest beam vector in 2L−1 preset orthogonal beam vectors; $O_1O_2$ represents an oversampling factor of a spatial-domain beam; L is a quantity of preset orthogonal beam vectors; and $N_1$ and $N_2$ respectively represent a quantity of antennas in a horizontal direction and a quantity of antennas in a vertical direction.

including 2L preset orthogonal beam vectors; $N_{PSK}$ represents a quantity of phase quantization bits ($N_{PSK}$=4/8/16) used by $M_l$ strongest beam vectors in all the preset orthogonal beam vectors corresponding to the $l^{th}$ spatial layer in the two polarization directions; and $K^{(2)}$ is a preset value (determined based on a value of L), and is used to represent $K^{(2)}$ strongest beam vectors in all the preset orthogonal beam vectors in the two polarization directions.

TABLE 6

CSI report #n
CSI part 2        Wideband PMI information field $X_1$

Each combination coefficient information field $X_2$ corresponding to a spatial layer group 1

TABLE 5

| | Subband PMI information field $X_2$ | | | |
|---|---|---|---|---|
| | $i_{2,1,1}$ | $i_{2,1,2}$ | $i_{2,2,1}$ | $i_{2,2,2}$ |
| Rank = 1: wideband amplitude | $(M_1-1)\cdot\log_2 N_{PSK}$ | N/A | N/A | N/A |
| Rank = 2: wideband amplitude | $(M_1-1)\cdot\log_2 N_{PSK}$ | $(M_2-1)\cdot\log_2 N_{PSK}$ | N/A | N/A |
| Rank = 1: subband amplitude | $\min(M_1,K^{(2)})\cdot\log_2 N_{PSK^-}\log_2 N_{PSK}+2\cdot(M_1-\min(M_1,K^{(2)}))$ | N/A | $\min(M_1,K^{(2)})-1$ | N/A |
| Rank = 2: subband amplitude | $\min(M_1,K^{(2)})\cdot\log_2 N_{PSK^-}\log_2 N_{PSK}+2\cdot(M_1-\min(M_1,K^{(2)}))$ | $\min(M_2,K^{(2)})\cdot\log_2 N_{PSK^-}\log_2 N_{PSK}+2\cdot(M_2-\min(M_2,K^{(2)}))$ | $\min(M_1,K^{(2)})-1$ | $\min(M_2,K^{(2)})-1$ |

It should be noted that, in Table 4, the field $i_{2,1,1}$ is used to indicate subband phases corresponding to all preset orthogonal beam vectors in two polarization directions at a first spatial layer: the field $i_{2,1,2}$ is used to indicate subband phases corresponding to all the preset orthogonal beam vectors in the two polarization directions at a second spatial layer: the field $i_{2,2,1}$ is used to indicate subband amplitudes corresponding to all the preset orthogonal beam vectors in the two polarization directions at the first spatial layer; the field $i_{2,2,2}$ is used to indicate subband amplitudes corresponding to all the preset orthogonal beam vectors in the two polarization directions at the second spatial layer; $M_l$ represents a quantity of beams that are in a beam subset and that correspond to an $l^{th}$ spatial layer in the two polarization directions, where the beam subset is a subset of a set TABLE 6-continued CSI report #n
CSI part 2        Wideband PMI information field $X_1$ Each combination coefficient information field $X_2$ corresponding to a spatial layer group 2
...

It should be noted that combination coefficient information fields are first arranged in descending order of priorities of spatial layer groups. In one spatial layer group, all combination coefficient information fields are arranged in ascending order of indexes of spatial layers. In one combination coefficient information field corresponding to one spatial layer, all combination coefficients are arranged in ascending order of indexes of preset orthogonal beam vectors. In one combination coefficient information field, a plurality of combination coefficients corresponding to one preset orthogonal beam vector are arranged in ascending order of power of the combination coefficients or in ascending order of indexes of the combination coefficients.

Further, for specific implementation of the wideband PMI information field $X_1$, refer to Table 7 to Table 12.

Information fields in a CSI part 2 of a CSI report are mapped in a sequence shown in Table 7.

TABLE 7

| | Wideband PMI information field $X_1$ | | | | | |
|---|---|---|---|---|---|---|
| | Selection information of an oversampling rotation factor of a spatial-domain beam | Selection information of a spatial-domain beam vector | Selection information of an oversampling rotation factor of a frequency-domain basis vector at a spatial layer 1 | Selection information of a strongest combination coefficient at the spatial layer 1 | Selection information of an oversampling rotation factor of a frequency-domain basis vector at a spatial layer 2 | Selection information of a strongest combination coefficient at the spatial layer 2 |
| Rank = 1 | $\lceil \log_2(O_1 O_2) \rceil$ | $\left\lceil \log_2 \binom{N_1 N_2}{L} \right\rceil$ | $\lceil \log_2(O_3) \rceil$ | $\lceil \log_2(2LM) \rceil$ | N/A | N/A |
| Rank = 2 | $\lceil \log_2(O_1 O_2) \rceil$ | $\left\lceil \log_2 \binom{N_1 N_2}{L} \right\rceil$ | $\lceil \log_2(O_3) \rceil$ | $\lceil \log_2(2LM) \rceil$ | $\lceil \log_2(O_3) \rceil$ | $\lceil \log_2(2LM) \rceil$ |

TABLE 8

| | PMI information field $X_2$ | | | | | |
|---|---|---|---|---|---|---|
| | Frequency-domain basis vector indexes corresponding to 2L beam vectors at a spatial layer 1 | Combination coefficient amplitude quantized value corresponding to the 2L beam vectors at the spatial layer 1 | Combination coefficient phase quantized values corresponding to the 2L beam vectors at the spatial layer 1 | Frequency-domain basis vector indexes corresponding to the 2L beam vectors at a spatial layer 2 | Combination coefficient amplitude quantized values corresponding to the 2L beam vectors at the spatial layer 2 | Combination coefficient phase quantized values corresponding to the 2L beam vectors at the spatial layer 2 |
| Rank = 1 | $2L\lceil(\log_2 C_{N_3}^M)\rceil$ | $(2LM - 1) \times \log_2 N_{AMP}$ | $(2LM - 1) \times \log_2 N_{phase}$ | N/A | N/A | N/A |
| Rank = 2 | $2L\lceil(\log_2 C_{N_3}^M)\rceil$ | $(2LM - 1) \times \log_2 N_{AMP}$ | $(2LM - 1) \times \log_2 N_{phase}$ | $2L \times \lceil(\log_2 C_{N_3}^M)\rceil N (2LM - 1) \times \log_2 N_{AMP}$ | $(2LM - 1) \times \log_2 N_{phase}$ |

It should be noted that, in Table 7 and Table 8, each preset orthogonal beam vector (beam) at each spatial layer (layer) uses different frequency-domain basis vectors. A quantity of bits used to indicate the indexes of the frequency-domain basis vectors corresponding to the 2L beam vectors at the spatial layer 1 and the spatial layer 2 may also be $2LN_3$.

TABLE 9

| | Wideband PMI information field $X_1$ | | | | | | |
|---|---|---|---|---|---|---|---|
| | Selection information of an oversampling rotation factor of a spatial-domain beam | Selection information of a spatial-domain beam vector | Selection information of an oversampling rotation factor of a frequency-domain basis vector at a spatial layer 1 | Selection information of a strongest combination coefficient at the spatial layer 1 | Frequency-domain basis vector index selected at the spatial layer 1 | Selection information of an oversampling rotation factor of a frequency-domain basis vector at a spatial layer 2 | Selection information of a strongest combination coefficient at the spatial layer 2 | Frequency-domain basis vector index selected at the spatial layer 2 |
| Rank = 1 | $\lceil \log_2(O_1 O_2) \rceil$ | $\left\lceil \log_2 \binom{N_1 N_2}{L} \right\rceil$ | $\lceil \log_2(O_3) \rceil$ | $\lceil \log_2(2LM) \rceil$ | $\lceil \log_2(C_{N_3}^M) \rceil$ | N/A | N/A | N/A |
| Rank = 2 | $\lceil \log_2(O_1 O_2) \rceil$ | $\left\lceil \log_2 \binom{N_1 N_2}{L} \right\rceil$ | $\lceil \log_2(O_3) \rceil$ | $\lceil \log_2(2LM) \rceil$ | $\lceil \log_2(C_{N_3}^M) \rceil$ | $\lceil \log_2(O_3) \rceil$ | $\lceil \log_2(2LM) \rceil$ | $\lceil \log_2(C_{N_3}^M) \rceil$ |

TABLE 10

PMI information field $X_2$

| | Combination coefficient amplitude quantized values corresponding to 2 L beam vectors at a spatial layer 1 | Combination coefficient phase quantized values corresponding to the 2 L beam vectors at the spatial layer 1 | Combination coefficient amplitude quantized values corresponding to the 2 L beam vectors at a spatial layer 2 | Combination coefficient phase quantized values corresponding to the 2 L beam vectors at the spatial layer 2 |
|---|---|---|---|---|
| Rank = 1 | $(2LM - 1)\log_2 N_{AMP}$ | $(2LM - 1)\log_2 N_{phase}$ | N/A | N/A |
| Rank = 2 | $(2LM - 1)\log_2 N_{AMP}$ | $(2LM - 1)\log_2 N_{phase}$ | $(2LM - 1)\log_2 N_{AMP}$ | $(2LM - 1)\log_2 N_{phase}$ |

It should be noted that, in Table 9 and Table 10, each preset orthogonal beam vector (beam) at each spatial layer (layer) corresponds to same frequency-domain basis vectors. A quantity of bits used to indicate indexes of frequency-domain basis vectors corresponding to the 2L beam vectors at the spatial layer 1 and the spatial layer 2 may also be $N_3$.

field, refer to Table 7 to Table 12. Details are not described herein again. In addition, if all the spatial layers use a same frequency-domain basis vector, there is only one piece of information of a selected information of an oversampling rotation factor of the frequency-domain basis vector in the wideband PMI information field $X_1$, and there is only one

TABLE 11

Wideband PMI information field $X_1$

| | Selection information of an oversampling rotation factor of a spatial-domain beam | Selection information of a spatial-domain beam vector | Selection information of an oversampling rotation factor of a frequency-domain basis vector at a spatial layer 1 | Selection information of a strongest combination coefficient at the spatial layer 1 | Frequency-domain basis vector index selected at the spatial layer 1 | Selection information of an oversampling rotation factor of a frequency-domain basis vector at a spatial layer 2 | Selection information of a strongest combination coefficient at the spatial layer 2 | Frequency domain basis vector index selected at the spatial layer 2 |
|---|---|---|---|---|---|---|---|---|
| Rank = 1 | $\lceil \log_2(O_1 O_2) \rceil$ | $\left\lceil \log_2 \binom{N_1 N_2}{L} \right\rceil$ | $\lceil \log_2(O_3) \rceil$ | $\lceil \log_2 K \rceil$ | $2L\lceil \log_2(C_{N_3}^M) \rceil$ | N/A | N/A | N/A |
| Rank = 2 | $\lceil \log_2(O_1 O_2) \rceil$ | $\left\lceil \log_2 \binom{N_1 N_2}{L} \right\rceil$ | $\lceil \log_2(O_3) \rceil$ | $\lceil \log_2 K \rceil$ | $2L\lceil \log_2(C_{N_3}^M) \rceil$ | $\lceil \log_2(O_3) \rceil$ | $\lceil \log_2 K \rceil$ | $2L\lceil \log_2(C_{N_3}^M) \rceil$ |

TABLE 12

PMI information field $X_2$

| | Non-zero combination coefficient index at a spatial layer 1 | Combination coefficient amplitude quantized values corresponding to 2L beam vectors at the spatial layer 1 | Combination coefficient phase quantized values corresponding to the 2L beam vectors at the spatial layer 1 | Non-zero combination coefficient index at a spatial layer 2 | Combination coefficient amplitude quantized values corresponding to the 2L beam vectors at the spatial layer 2 | Combination coefficient phase quantized values corresponding to the 2L beam vectors at the spatial layer 2 |
|---|---|---|---|---|---|---|
| Rank = 1 | 2LM | $(K - 1)\log_2 N_{AMP}$ | $(K - 1)\log_2 N_{phase}$ | N/A | N/A | N/A |
| Rank = 2 | 2LM | $(K - 1)\log_2 N_{AMP}$ | $(K - 1)\log_2 N_{phase}$ | 2LM | $(K - 1)\log_2 N_{AMP}$ | $(K - 1)\log_2 N_{phase}$ |

In a possible implementation, the wideband PMI information field may be alternatively determined based on the information format provided in Table 11 or Table 12. The non-zero combination coefficient index at the spatial layer 1 may be indicated by using a bitmap of a number of bits 2LM. Each bit corresponds to one of 2LM combination coefficients. If the bit is 1, it indicates that an amplitude coefficient and a phase coefficient corresponding to a corresponding combination coefficient need to be reported. The non-zero combination coefficient index at the spatial layer 1 may alternatively be indicated by using a combination number of a number of bits $\lceil \log_2(C_{2LM}^K) \rceil$.

It should be noted that the spatial layer 1 and the spatial layer 2 are used as an example in Table 7 to Table 12. Actually, the spatial layers may be extended to the spatial layer 3 and the spatial layer 4. For determining of a specific frequency-domain basis vector index corresponding to the 2L beam vectors in the wideband PMI information field $X_2$.

In this embodiment of the present invention, if a precoding matrix type preconfigured by the base station for the UE is an uncompressed type, the UE reports an uncompressed-type CSI report to the base station with reference to Table 1 to Table 5. If a precoding matrix type preconfigured by the base station for the UE is a compressed type, the UE determines a compressed-type CSI report with reference to Table 1, Table 2, and Table 6 to Table 12, and calculates a code rate of UCI (including at least one compressed-type CSI report). If the code rate of the UCI is greater than the first threshold, the UE finally reports an uncompressed-type CSI report to the base station by using an uncompressed-type precoding matrix.

In addition, if the overhead requirement is still not satisfied when the UE reports the at least one uncompressed-type CSI report, in other words, if a code rate of UCI (including the at least one uncompressed-type CSI report) is greater than the first threshold, some fields in some CSI reports are deleted in ascending order of priorities shown in Table 13.

TABLE 13

Priority 0:
Wideband PMI information fields corresponding to a CSI report 1 to a CSI report $N_{Rep}$
Priority 1:
Subband PMI information field corresponding to an even-numbered subband corresponding to the CSI report 1
Priority 2:
Subband PMI information field corresponding to an odd-numbered subband corresponding to the CSI report 1
Priority 3:
Subband PMI information field corresponding to an even-numbered subband corresponding to the CSI report 2
Priority 4:
Subband PMI information field corresponding to an odd-numbered subband corresponding to the CSI report 2
...
Priority $2N_{Rep} - 1$:
Subband PMI information field corresponding to an even-numbered subband corresponding to the CSI report $N_{Rep}$
Priority $2N_{Rep}$:
Subband PMI information field corresponding to an odd-numbered subband corresponding to the CSI report $N_{Rep}$ Referring to Table 8, $N_{Rep}$ is a quantity of CSI reports from the UE by using one piece of UCI, and numbers of the CST reports are sequentially 1 to $N_{Rep}$. There are $2N_{Rep+1}$ priority levels in total. A wideband PMI information field in all the CSI reports has a highest priority. A smaller number of a CSI report indicates a higher priority of a subband PMI information field in the CSI report. In addition, for one CSI report, a priority of a subband PMI information field corresponding to an even-numbered subband is higher than a priority of a PMI information field corresponding to an odd-numbered subband, in other words, the priority of the first subband PMI information field is higher than the priority of the second subband PMI information field in this embodiment of the present invention.

According to the communication method provided in this embodiment of the present invention, a problem that a current CSI reporting format cannot be applied to a compressed-type CSI report is resolved. The UE may autonomously select, based on the overhead requirement, whether to report an uncompressed-type CSI report or a compressed-type CSI report. Therefore, the UE has more autonomous selection capabilities. In addition, this solution can simplify a deletion rule design for the CSI part 2. When the overhead requirement is not satisfied, a reporting type may be switched to an uncompressed type, and a priority deletion rule in an existing CSI part 2 is used.

Figure 4:
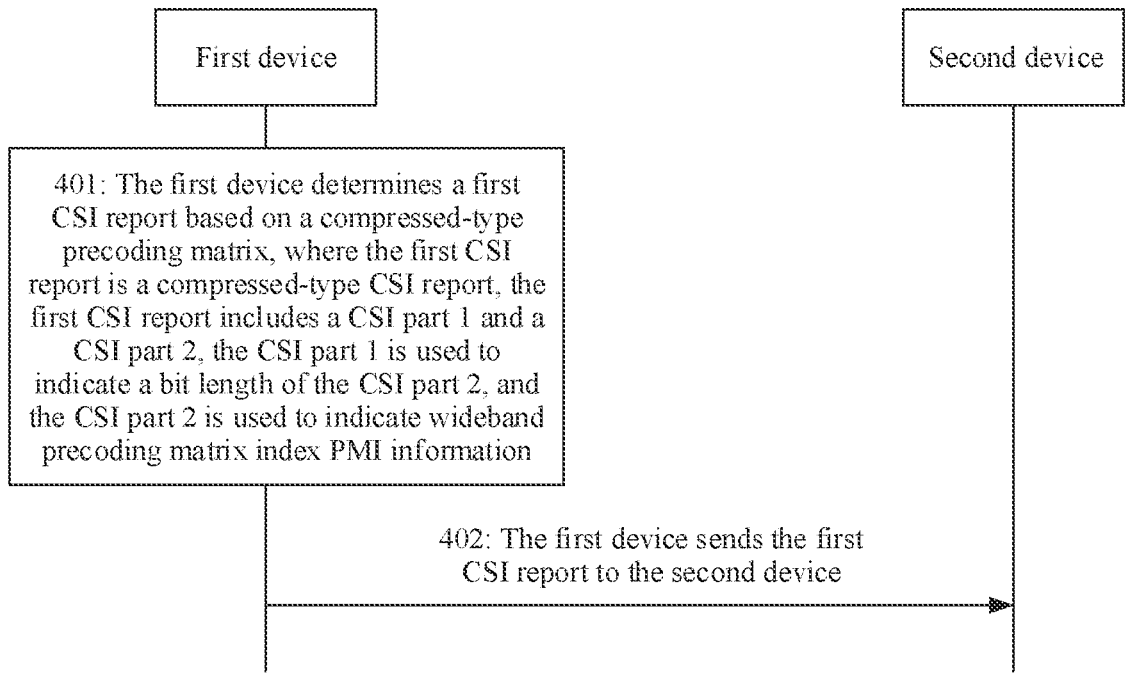
FIG. 4 is another schematic flowchart of a communication method according to an embodiment of the present invention.

An embodiment of the present invention further provides a communication method. As shown in FIG. 4, the method includes the following steps.

401: A first device determines a first CSI report based on a compressed-type precoding matrix, where the first CSI report is a compressed-type CSI report, the first CSI report includes a CSI part 1 and a CSI part 2, the CSI part 1 is used to indicate a number of bits of the CSI part 2, and the CSI part 2 is used to indicate wideband precoding matrix indicator PMI information.

The wideband PMI information is used to indicate an oversampling factor of a preset orthogonal beam vector and/or an index of the preset orthogonal beam vector, and the preset orthogonal beam vector is a spatial-domain orthogonal basis vector selected by the first device from a spatial-domain basis vector set.

Generally, A second device may preconfigure a precoding matrix type for the first device. To reduce overheads, the second device preconfigures a compressed-type precoding matrix for the first device. In this embodiment of the present invention, the first device may report a compressed-type CSI report to the second device by using the precoding matrix type preconfigured by the second device. Specifically, this embodiment of the present invention provides a CSI report dedicated to a compressed type.

In a possible implementation, the first device determines a combination coefficient set based on the compressed-type precoding matrix. The combination coefficient set includes at least one combination coefficient, and the combination coefficient includes an amplitude coefficient and a phase coefficient. For a specific form, refer to Formula (5). Further, the CSI report is determined based on the combination coefficient set.

A format of the compressed-type CSI report is designed in this embodiment of the present invention, and the compressed-type CSI report includes a CSI part 1 and a CSI part 2. Specific descriptions are as follows:

(1) The CSI part 1 includes a rank indicator, a wideband CQI of a first transport block, a subband differential CQI of the first transport block, and a combination coefficient quantity indication field.

The combination coefficient quantity indication field is a first value or a second value. The first value is a quantity of combination coefficients whose amplitude coefficients are zero in the combination coefficient set or a quantity of combination coefficients whose amplitude coefficients are non-zero in the combination coefficient set, and the second value is a quantity of combination coefficients corresponding to the preset orthogonal beam vector.

It should be noted that, during precoding, each spatial layer may be independent. Therefore, combination coefficient sets corresponding to all spatial layers may be the same or may be different. Further, all the spatial layers may correspond to different quantities of combination coefficients whose amplitude coefficients are zero, in other words, all the spatial layers may correspond to different first values.

If the combination coefficient sets corresponding to all the spatial layers are the same, when precoding is performed at one spatial layer, quantities of combination coefficients corresponding to all preset orthogonal beam vectors may be the same or may be different.

In this embodiment of the present invention, the CSI part 1 may include a plurality of first values, or may include a second value. Specifically, there are the following several possible implementations:

In a first implementation, all the spatial layers correspond to a same first value, or different spatial layers correspond to different first values.

That all the spatial layers correspond to a same first value means that all the spatial layers correspond to a same quantity of combination coefficients whose amplitude coefficients are zero. In this implementation, the CSI part 1 includes only one first value, and the first value is applicable to all the spatial layers.

For example, there are a spatial layer 1 and a spatial layer 2 for spatial multiplexing, and the first value is 5. To be specific, when precoding is performed at the spatial layer 1, there are five combination coefficients whose amplitude coefficients are zero in a combination coefficient set. When precoding is performed at the spatial layer 2, there are five combination coefficients whose amplitude coefficients are zero in a combination coefficient set.

In a second implementation, all the spatial layers correspond to a same second value, and at one spatial layer, all the preset orthogonal beam vectors correspond to a same quantity of combination coefficients.

In other words, when precoding is performed at all the spatial layers, one preset orthogonal beam vector corresponds to a same quantity of combination coefficients, and at one spatial layer, the preset orthogonal beam vectors correspond to a same quantity of combination coefficients. In this implementation, the CSI part 1 includes only one second value, and the second value is applicable to all the preset orthogonal beam vectors.

For example, there are a spatial layer 1 and a spatial layer 2 for spatial multiplexing, the second value is 4, and there are two preset orthogonal beam vectors in total. To be specific, when precoding is performed at the spatial layer 1, a preset orthogonal beam vector 1 corresponds to four combination coefficients, and a preset orthogonal beam vector 2 corresponds to four combination coefficients. When precoding is performed at the spatial layer 2, the preset orthogonal beam vector 1 corresponds to four combination coefficients, and the preset orthogonal beam vector 2 corresponds to four combination coefficients.

In a third implementation, all the spatial layers correspond to a same second value, and at one spatial layer, all the preset orthogonal beam vectors correspond to different quantities of combination coefficients.

In other words, when precoding is performed at all the spatial layers, one preset orthogonal beam vector corresponds to a same quantity of combination coefficients, and at one spatial layer, the preset orthogonal beam vectors correspond to different quantities of combination coefficients. In this implementation, the CSI part 1 may include a plurality of second values, and the plurality of second values are applicable to all the spatial layers.

For example, there are a spatial layer 1 and a spatial layer 2 for spatial multiplexing, and there are two preset orthogonal beam vectors in total. A second value corresponding to a preset orthogonal beam vector 1 is 4, and a second value corresponding to a preset orthogonal beam vector 2 is 3. To be specific, when precoding is performed at the spatial layer 1, the preset orthogonal beam vector 1 corresponds to four combination coefficients, and the preset orthogonal beam vector 2 corresponds to three combination coefficients. When precoding is performed at the spatial layer 2, the preset orthogonal beam vector 1 corresponds to four combination coefficients, and the preset orthogonal beam vector 2 corresponds to three combination coefficients.

In a fourth implementation, different spatial layers correspond to different second values, and at one spatial layer, all the preset orthogonal beam vectors correspond to a same quantity of combination coefficients.

In other words, when precoding is performed at the spatial layers, one preset orthogonal beam vector corresponds to different quantities of combination coefficients, and at one spatial layer, the preset orthogonal beam vectors correspond to a same quantity of combination coefficients. In this implementation, the CSI part 1 may include a plurality of second values, and one second value is a quantity of combination coefficients corresponding to each preset orthogonal beam vector when precoding is performed at one spatial layer.

For example, there are a spatial layer 1 and a spatial layer 2 for spatial multiplexing, and there are two preset orthogonal beam vectors in total. A second value corresponding to the spatial layer 1 is 4, and a second value corresponding to the spatial layer 2 is 3. To be specific, when precoding is performed at the spatial layer 1, the preset orthogonal beam vector 1 corresponds to three combination coefficients, and the preset orthogonal beam vector 2 corresponds to three combination coefficients. When precoding is performed at the spatial layer 2, the preset orthogonal beam vector 1 corresponds to four combination coefficients, and the preset orthogonal beam vector 2 corresponds to three combination coefficients.

In a fifth implementation, different spatial layers correspond to different second values, and at one spatial layer, all the preset orthogonal beam vectors correspond to different quantities of combination coefficients.

In other words, when precoding is performed at all the spatial layers, one preset orthogonal beam vector corresponds to different quantities of combination coefficients, and at one spatial layer, all the preset orthogonal beam vectors also correspond to different quantities of combination coefficients. In this implementation, the CSI part 1 includes a plurality of second values. For example, the CSI part 1 may include S*R second values, where S is a quantity of spatial layers, and R is a quantity of preset orthogonal beam vectors.

For example, there are a spatial layer 1 and a spatial layer 2 for spatial multiplexing, and there are two preset orthogonal beam vectors in total. Second values corresponding to a spatial layer 1 are 3 and 4, where 3 is a second value corresponding to a preset orthogonal beam vector 1, and 4 is a second value corresponding to the preset orthogonal beam vector 2. Second values corresponding to a spatial layer 2 are 5 and 2, where 5 is a second value corresponding to the preset orthogonal beam vector 1, and 2 is a second value corresponding to the preset orthogonal beam vector 2.

To be specific, when precoding is performed at the spatial layer 1, the preset orthogonal beam vector 1 corresponds to three combination coefficients, and the preset orthogonal beam vector 2 corresponds to four combination coefficients. When precoding is performed at the spatial layer 2, the preset orthogonal beam vector 1 corresponds to five combination coefficients, and the preset orthogonal beam vector 2 corresponds to two combination coefficients.

(2) The CSI part 2 includes a wideband PMI information field and a combination coefficient information field that corresponds to all the preset orthogonal beam vectors at each spatial layer in each spatial layer group.

The combination coefficient information field includes Q combination coefficients corresponding to all the preset orthogonal beam vectors at one spatial layer in one spatial layer group. It should be noted that all the preset orthogonal beam vectors are L spatial-domain orthogonal basis vectors selected from the spatial-domain basis vector set. During specific implementation. Q combination coefficients corresponding to all the preset orthogonal beam vectors at one spatial layer in one spatial layer group constitute one combination coefficient information field. Therefore, the CSI part 2 of the compressed-type CSI report includes a plurality of combination coefficient information fields. In addition, different combination coefficient information fields may be arranged in descending order of priorities of corresponding spatial layer groups, and a plurality of combination coefficient information fields corresponding to one spatial layer group may be arranged in ascending order of indexes of spatial layers. In one combination coefficient information field, all combination coefficients may be arranged in ascending order of indexes of corresponding preset orthogonal beam vectors. In one combination coefficient information field, a plurality of combination coefficients corresponding to one preset orthogonal beam vector may be arranged in descending order of power. It should be noted that a power value of the combination coefficient may be determined by using an amplitude coefficient of the combination coefficient. In this embodiment of the present invention, an order of arranging all combination coefficient information fields in the CSI part 2 and an order of arranging all combination coefficients in a combination coefficient information field are not limited to the foregoing several possible implementations, and there may be another arrangement order. This is not limited in this embodiment of the present invention.

For example, there are four spatial layers for spatial multiplexing, and the spatial layers are a spatial layer 1, a spatial layer 2, a spatial layer 3, and a spatial layer 4 in descending order of index numbers of the spatial layers. The spatial layer 1 and the spatial layer 2 are in a spatial layer group 1, and the spatial layer 3 and the spatial layer 4 are in a spatial layer group 2. A priority of the spatial layer group 1 is higher than a priority of the spatial layer group 2. Two spatial-domain orthogonal basis vectors are selected from the spatial-domain basis vector set as preset orthogonal beam vectors, and are a beam vector 1 and a beam vector 2 in ascending order of index numbers of the preset orthogonal beam vectors. Combination coefficients corresponding to the beam vector 1 at the spatial layer 1 is A1 and B1, and power of A1 is higher than that of B1. Combination coefficients corresponding to the beam vector 1 at the spatial layer 2 are A2 and B2, and power of A2 is higher than that of B2. Combination coefficients corresponding to the beam vector 1 at the spatial layer 3 are A3 and B3, and power of A3 is higher than that of B3. Combination coefficients corresponding to the beam vector 1 at the spatial layer 4 are A4 and B4, and power of A4 is higher than that of B4. Combination coefficients corresponding to the beam vector 2 at the spatial layer 1 are C1 and D1, and power of C1 is higher than that of D1. Combination coefficients corresponding to the beam vector 2 at the spatial layer 2 are C2 and D2, and power of C2 is higher than that of D2. Combination coefficients corresponding to the beam vector 2 at the spatial layer 3 are C3 and D3, and power of C3 is higher than that of D3. Combination coefficients corresponding to the beam vector 2 at the spatial layer 1 are C4 and D4, and power of C4 is higher than that of D4. It should be noted that amplitude coefficients and phase coefficients of combination coefficients may also be arranged in descending order of power.

Therefore, all the preset orthogonal beam vectors correspond to four combination coefficients in total at one spatial layer, and the CSI part 2 includes four combination coefficient information fields: (A1, B1, C1, D1) (A2, B2, C2, D2), (A3, B3, C3, D3), and (A4, B4, C4. D4).

In a possible implementation, one combination coefficient information field may further include a first combination coefficient information field and a second combination coefficient information field. The first combination coefficient information field includes the first $\lfloor Q/2 \rfloor$ combination coefficients in the Q combination coefficients that are arranged in descending order of power, and the second combination coefficient information field includes the last $(Q-\lfloor Q/2 \rfloor)$ combination coefficients in the Q combination coefficients that are arranged in descending order of the power.

It should be noted that, in the CSI part 2, first combination coefficient information fields and second combination coefficient information fields corresponding to spatial layer groups are arranged in descending order of priorities of the spatial layer groups. In fields corresponding to one spatial layer group, first combination coefficient information fields and second combination coefficient information fields that correspond to spatial layers are arranged in descending order of index numbers of the spatial layers. In one spatial layer, a first combination coefficient information field corresponding to all the preset orthogonal beam vectors at the spatial layer is arranged before a second combination coefficient information field corresponding to all the preset orthogonal beam vectors at the spatial layer. In one first combination coefficient information field, combination coefficients may be arranged in descending order of indexes of corresponding preset orthogonal beam vectors. In one first combination coefficient information fields, a plurality of combination coefficients corresponding to one preset orthogonal beam vector may be arranged in ascending order of power. In one second combination coefficient information field, combination coefficients may be arranged in descending order of indexes of corresponding preset orthogonal beam vectors. In one second combination coefficient information field, a plurality of combination coefficients corresponding to one preset orthogonal beam vector may be arranged in ascending order of power.

Referring to the foregoing example, the CSI part 2 includes four first combination coefficient information fields and four second combination coefficient information fields, and the CSI part 2 may be (A1, C1), (A2, C2), (A3, C3), (A4, C4), (B1, D1), (B2, D2), (B3, D3), and (B4, D4).

402: The first device sends the first CSI report to the second device.

During specific implementation, the first device may send a plurality of compressed-type CSI reports to the second device by using UCI. Before actually sending the CSI report, the first device may first determine whether the to-be-sent UCI satisfies an overhead requirement, and adjust the to-be-sent UCI based on a determining result.

Specifically, the first device determines UCI including the first CSI report. The UCI includes the first CSI report. The UCI further includes at least one second CSI report. The at least one second CSI report is also a compressed-type CSI report.

Further, when a code rate of the UCI is greater than a first threshold, the first device may delete some fields from the to-be-sent UCI. Therefore, when a code rate of the UCI from which the fields are deleted satisfies the first threshold, the first device sends the UCI to the second device.

In a possible implementation, the first device deletes some combination coefficient information fields from some CSI reports based on a preset priority. In other words, a CSI part 2 corresponding to at least one CSI report in finally to-be-sent UCI includes only some combination coefficient information fields, so that a code rate of the UCI is less than or equal to the first threshold. During specific implementation, combination coefficient information fields in some CSI reports may be deleted, or first combination coefficient information fields and/or second combination coefficient information fields in some CSI reports may be deleted.

In a possible implementation, X combination coefficient information fields are inserted into the UCI in descending order of priorities of combination coefficient information fields, so that a code rate of the UCI is less than or equal to the first threshold, where X is a positive integer, and X satisfies the following condition: If the UCI includes X+1 combination coefficient information fields, a code rate of the UCI is greater than the first threshold.

It should be noted that the preset priority may be as follows:

a priority of the wideband PMI information field is higher than a priority of the combination coefficient information field;

a smaller number of a CSI report indicates a higher priority of a combination coefficient information field in the CSI report; and when CSI reports have a same number, a higher priority of a spatial layer group corresponding to a combination coefficient information field in a CSI report indicates a higher priority of the combination coefficient information field in the CSI report.

In a possible implementation, when CSI reports have a same number, and spatial layer groups corresponding to combination coefficient information fields in the CSI reports have a same priority, a priority of the first combination coefficient information field is higher than a priority of the second combination coefficient information field.

The following describes in detail a format of the CSI report reported in the method procedure shown in FIG. 4. Specifically, the compressed-type CSI report includes a CSI part 1 and a CSI part 2.

During specific implementation, a base station indicates UE to use a compressed-type precoding matrix. In this case, the UE reports a compressed-type CSI report in a format shown in Table 14 to Table 20. Specifically, the UE reports the compressed-type CSI report based on a quantity L of preset orthogonal beam vectors and a quantity K of frequency-domain basis vectors that are indicated by the base station. In this implementation, the CSI part 1 uses a predefined fixed bit length, and the number of bits is not equal to a number of bits of a CSI part 1 of an uncompressed-type CSI report. Specifically, the CSI part 1 is reported in a format shown in Table 14 or Table 15.

TABLE 14

| CSI report index | CSI field |
| --- | --- |
| CSI report #n | RI |
| CSI part 1 | Wideband CQI of the first transport block (TB) |
| | Subband differential CQI of the first transport block (TB) |
| | Combination coefficient quantity indication field: |
| | a quantity of combination coefficients that correspond to each spatial layer and whose amplitude coefficients are zero or a quantity of combination coefficients that correspond to each spatial layer and whose amplitude coefficients are non-zero |
| | (Optional) RSRP |
| | (Optional) Differential RSRP |

It should be noted that, in the format shown in Table 14, the combination coefficient quantity indication field is filled with the first value. In addition, the combination coefficient quantity indication field may include a plurality of first values, or may include only one first value.

TABLE 15

| CSI report index | CSI field |
| --- | --- |
| CSI report #n | RI |
| CSI part 1 | Wideband CQI of the first transport block (TB) |
| | Subband differential CQI of the first transport block (TB) |
| | Combination coefficient quantity indication field: |
| | a quantity of combination coefficients corresponding to each preset orthogonal beam vector at each spatial layer |

It should be noted that, in the format shown in Table 15, the combination coefficient quantity indication field is a first value. In addition, the combination coefficient quantity indication field may be a plurality of first values, or may be only one first value.

A compressed-type CSI part 2 can indicate a combination coefficient set when a compressed-type precoding matrix is used. A bit length of the CSI part 2 is not equal to a number of bits of a CSI part 2 of an uncompressed-type CSI report. The CSI part 2 is reported in a format shown in Table 16 or Table 17.

TABLE 16

CSI report #n Wideband PMI information field $X_1$
CSI part 2  Combination coefficient information field $X_2$ corresponding to a spatial layer 1 in a spatial layer group 1
Combination coefficient information field $X_2$ corresponding to a spatial layer 2 in the spatial layer group 1
Combination coefficient information field $X_2$ corresponding to a spatial layer 3 in a spatial layer group 2
Combination coefficient information field $X_2$ corresponding to a spatial layer 4 in the spatial layer group 2
...

Referring to Table 16, the spatial layer group 1 includes the spatial layer 1 and the spatial layer 2, and the spatial layer group 2 includes the spatial layer 3 and the spatial layer 4.

A spatial layer m in a spatial layer group M is used as an example. A combination coefficient information field corresponding to the spatial layer m in the spatial layer group M includes Q combination coefficients corresponding to all the preset orthogonal beam vectors when precoding is performed at the spatial layer m in the spatial layer group M. The Q combination coefficients are arranged in ascending order of indexes of the preset beam vectors, and a plurality of combination coefficients corresponding to one preset orthogonal beam vector may be arranged in ascending order of indexes of the combination coefficients.

The first combination coefficient information fields corresponding to the spatial layer group 1 include Q combination coefficients with relatively high power in combination coefficients corresponding to all preset orthogonal beam vectors at all spatial layers in the spatial layer group 1, and the second combination coefficient information fields corresponding to the spatial layer group 1 include the remaining combination coefficients corresponding to all the preset orthogonal beam vectors at all the spatial layers in the spatial layer group 1.

The first combination coefficient information fields corresponding to the spatial layer group 2 include Q combination coefficients with relatively high power in combination coefficients corresponding to all the preset orthogonal beam vectors at all spatial layers in the spatial layer group 2, and the second combination coefficient information fields corresponding to the spatial layer group 2 include the remaining combination coefficients corresponding to all the preset orthogonal beam vectors at all the spatial layers in the spatial layer group 2.

TABLE 17

CSI report #n Wideband PMI information field $X_1$
CSI part 2  First combination coefficient information field $X_2$ corresponding to a spatial layer 1 in a spatial layer group 1
Second combination coefficient information field $X_2$ corresponding to the spatial layer 1 in the spatial layer group 1
First combination coefficient information field $X_2$ corresponding to a spatial layer 2 in a spatial layer group 1
Second combination coefficient information field $X_2$ corresponding to the spatial layer 2 in the spatial layer group 1
First combination coefficient information field $X_2$ corresponding to a spatial layer 3 in a spatial layer group 2
Second combination coefficient information field $X_2$ corresponding to the spatial layer 3 in the spatial layer group 2
First combination coefficient information field $X_2$ corresponding to a spatial layer 4 in the spatial layer group 2
Second combination coefficient information field $X_2$ corresponding to the spatial layer 4 in the spatial layer group 2

Referring to Table 17, the spatial layer group 1 includes the spatial layer 1 and the spatial layer 2, and the spatial layer group 2 includes the spatial layer 3 and the spatial layer 4. It should be noted that, in the CSI part 2, the combination coefficient information field is determined by using a spatial layer as a granularity, or the combination coefficient information field may be determined by using a spatial layer group as a granularity. For example, the CSI part 2 includes the first combination coefficient information field corresponding to the spatial layer group 1, the second combination coefficient information field corresponding to the spatial layer group 1, the first combination coefficient information field corresponding to the spatial layer group 2, the second combination coefficient information field corresponding to the spatial layer group 2, and the like.

A spatial layer m in a spatial layer group M is used as an example. A first combination coefficient information field corresponding to the spatial layer m in the spatial layer group M includes the first $\lfloor Q/2 \rfloor$ combination coefficients in Q combination coefficients that correspond to all the preset orthogonal beam vectors and that are arranged in descending order of power of the combination coefficients when precoding is performed at the spatial layer m in the spatial layer group M. The $\lfloor Q/2 \rfloor$ combination coefficients are arranged in ascending order of indexes of the preset beam vectors, and a plurality of combination coefficients corresponding to one preset orthogonal beam vector may be arranged in ascending order of indexes of the combination coefficients. A second combination coefficient information field corresponding to the spatial layer m in the spatial layer group M includes the last (Q−⌊Q/2⌋) combination coefficients in the Q combination coefficients that correspond to all the preset orthogonal beam vectors and that are arranged in descending order of the power of the combination coefficients when precoding is performed at the spatial layer m in the spatial layer group M. The (Q−⌊Q/2⌋) combination coefficients are arranged in ascending order of the indexes of the preset beam vectors, and a plurality of combination coefficients corresponding to one preset orthogonal beam vector may be arranged in ascending order of indexes of the combination coefficients.

In some embodiments, the wideband PMI information is mapped in an order shown in Table 18, Table 19, or Table 20.

TABLE 18

| | Wideband PMI information field $X_1$ | | | | | |
|---|---|---|---|---|---|---|
| | Selection information of an oversampling rotation factor of a spatial-domain beam | Selection information of a spatial-domain beam vector | Selection information of an oversampling rotation factor of a frequency-domain basis vector at the spatial layer 1 | Selection information of a strongest combination coefficient at the spatial layer 1 | Selection information of an oversampling rotation factor of a frequency-domain basis vector at the spatial layer 2 | Selection information of a strongest combination coefficient at the spatial layer 2 |
| Rank = 1 | $\lceil \log_2(O_1 O_2) \rceil$ | $\left\lceil \log_2\binom{N_1 N_2}{L} \right\rceil$ | $\lceil \log_2(O_3) \rceil$ | $\lceil \log_2(2LM) \rceil$ | N/A | N/A |
| Rank = 2 | $\lceil \log_2(O_1 O_2) \rceil$ | $\left\lceil \log_2\binom{N_1 N_2}{L} \right\rceil$ | $\lceil \log_2(O_3) \rceil$ | $\lceil \log_2(2LM) \rceil$ | $\lceil \log_2(O_3) \rceil$ $\lceil \log_2(O_3) \rceil$ | $\lceil \log_2(2LM) \rceil$ |

TABLE 19

| | Wideband PMI information field $X_1$ | | | | | | | |
|---|---|---|---|---|---|---|---|---|
| | Selection information of an oversampling rotation factor of a spatial-domain beam | Selection information of a spatial-domain beam vector | Selection information of an oversampling rotation factor of a frequency-domain basis vector at the spatial layer 1 | Selection information of a strongest combination coefficient at the spatial layer 1 | Frequency-domain basis vector index selected at the spatial layer 1 | Selection information of an oversampling rotation factor of a frequency-domain basis vector at the spatial layer 2 | Selection information of a strongest combination coefficient at basis layer 2 | Frequency-domain basis vector index selected at the spatial layer 2 the spatial |
| Rank = 1 | $\lceil \log_2(O_1 O_2) \rceil$ | $\left\lceil \log_2\binom{N_1 N_2}{L} \right\rceil$ | $\lceil \log_2(O_3) \rceil$ | $\lceil \log_2(2LM) \rceil$ | $\lceil \log_2(C_{N_3}^M) \rceil$ | N/A | N/A | N/A |
| Rank = 2 | $\lceil \log_2(O_1 O_2) \rceil$ | $\left\lceil \log_2\binom{N_1 N_2}{L} \right\rceil$ | $\lceil \log_2(O_3) \rceil$ | $\lceil \log_2(2LM) \rceil$ | $\lceil \log_2(C_{N_3}^M) \rceil$ | $\lceil \log_2(O_3) \rceil$ | $\lceil \log_2(2LM) \rceil$ | $\lceil \log_2(C_{N_3}^M) \rceil$ |

TABLE 20

| | Wideband PMI information field $X_1$ | | | | | | | |
|---|---|---|---|---|---|---|---|---|
| | Selection information of an oversampling rotation factor of a spatial-domain beam | Selection information of a spatial-domain beam vector | Selection information of an oversampling rotation factor of a frequency-domain basis vector at the spatial layer 1 | Wideband amplitudes corresponding to 2L beam vectors at the spatial layer 1 | Selection information of a strongest combination coefficient at the spatial layer 1 | Selection information of an oversampling rotation factor of a frequency-domain basis vector at the spatial layer 2 | Selection information of a strongest combination coefficient at the spatial layer 2 | Wideband amplitudes corresponding to the 2L beam vectors at the spatial layer 2 |
| Rank = 1 | $\lceil \log_2(O_1 O_2) \rceil$ | $\left\lceil \log_2\binom{N_1 N_2}{L} \right\rceil$ | $\lceil \log_2(O_3) \rceil$ | 3*2L | $\lceil \log_2(2LM) \rceil$ | N/A | N/A | 3*2L |
| Rank = 2 | $\lceil \log_2(O_1 O_2) \rceil$ | $\left\lceil \log_2\binom{N_1 N_2}{L} \right\rceil$ | $\lceil \log_2(O_3) \rceil$ | 3*2L | $\lceil \log_2(2LM) \rceil$ | $\lceil \log_2(O_3) \rceil$ $\lceil \log_2(O_3) \rceil$ | $\lceil \log_2(2LM) \rceil$ | 3*2L |

In this embodiment of the present invention, if the precoding matrix type preconfigured by the base station for the UE is the compressed type, the UE reports a compressed-type CSI report to the base station with reference to Table 14 to Table 20. The UE first calculates a code rate of UCI (including at least one compressed-type CSI report). If the code rate of the UCI is greater than the first threshold, some fields in some CSI reports are deleted in ascending order of priorities shown in Table 21.

Herein, $c_{i,j}$ represents a combination coefficient corresponding to a $j^{th}$ spatial-domain beam at an $i^{th}$ spatial layer.

According to the communication method provided in this embodiment of the present invention, a problem that a current CSI reporting format cannot be applied to compressed-type CSI reporting is resolved. New CSI part 1 and CSI part 2 formats are designed for a compressed-type CSI report, so that different combination coefficients can be used for each preset orthogonal beam vector at each spatial layer.

TABLE 21

| | |
|---|---|
| Priority 0 | Wideband CSI corresponding to a CSI report 1 to a CSI report $N_{Rep}$ |
| Priority 1 | First combination coefficient information field formed by [Q/2] combination coefficients with relatively high power in Q combination coefficients corresponding to all preset orthogonal beam vectors in a spatial layer group 1 in the CSI report 1 |
| Priority 2 | Second combination coefficient information field formed by Q – [Q/2] combination coefficients with relatively low power in the Q combination coefficients corresponding to all the preset orthogonal beam vectors in the spatial layer group 1 in the CSI report 1 |
| Priority 3 | First combination coefficient information field formed by [Q/2] combination coefficients with relatively high power in Q combination coefficients corresponding to all the preset orthogonal beam vectors in a spatial layer group 2 in the CSI report 1 |
| Priority 4 | Second combination coefficient information field formed by Q – [Q/2] combination coefficients with relatively low power in the Q combination coefficients corresponding to all the preset orthogonal beam vectors in the spatial layer group 2 in the CSI report 1 |
| ... | |
| Priority 4 $N_{Rep}$ – 3 | First combination coefficient information field formed by [Q/2] combination coefficients with relatively high power in Q combination coefficients corresponding to all preset orthogonal beam vectors in a spatial layer group 1 in the CSI report $N_{Rep}$ |
| Priority 4 $N_{Rep}$ – 2 | Second combination coefficient information field formed by Q – [Q/2] combination coefficients with relatively low power in the Q combination coefficients corresponding to all the preset orthogonal beam vectors in the spatial layer group 1 in the CSI report $N_{Rep}$ |
| Priority 4 $N_{Rep}$ – 1 | First combination coefficient information field formed by [Q/2] combination coefficients with relatively high power in Q combination coefficients corresponding to all the preset orthogonal beam vectors in a spatial layer group 2 in the CSI report $N_{Rep}$ |
| Priority 4 $N_{Rep}$ | Second combination coefficient information field formed by Q – [Q/2] combination coefficients with relatively low power in the Q combination coefficients corresponding to all the preset orthogonal beam vectors in the spatial layer group 2 in the CSI report $N_{Rep}$ |

It should be noted that, in Table 21, $N_{Rep}$ is a quantity of CSI reports from the UE by using one piece of UCI, and numbers are sequentially 1 to $N_{Rep}$. Fields in each CSI report have $2N_{Rep}$ priority levels in total, where a priority 0 is highest, and a priority 4 $N_{Rep}$ is lowest.

In a possible implementation, if information about the CSI part 2 corresponding to the spatial layer group 2 is deleted, the base station may obtain, in a predefined construction manner, a combination coefficient set corresponding to the spatial layer group 2. For example, if rank=4, and a quantity L of preset orthogonal beam vectors is equal to 2, the spatial layer group 1 includes the spatial layer 1 and the spatial layer 2, and the spatial layer group 2 includes the spatial layer 3 and the spatial layer 4. As shown in Table 14, the spatial layer group 2 has a lower priority. If the layer group 2 is deleted, a combination coefficient set correspondingly constructed for one subband may be as follows:

$$W_2 = \begin{bmatrix} c_{0,0} & c_{1,0} & c_{0,0} & c_{1,0} \\ c_{0,1} & c_{1,1} & c_{0,1} & c_{1,1} \\ c_{0,2} & c_{1,2} & -c_{0,2} & -c_{1,2} \\ c_{0,3} & c_{1,3} & -c_{0,3} & -c_{1,3} \end{bmatrix}$$

In this way, an optimum compromise between reporting overheads and system performance can be achieved.

In addition, a deletion priority of a CSI part 2 is designed for a compressed-type CSI report. Frequency-domain redundancy has been fully used for the compressed-type CSI report. Therefore, in this embodiment of the present invention, when a priority of each field in the CSI part 2 is designed, a space dimension and a power dimension are further introduced, so that a finer deletion granularity is implemented and performance of all CSI reports can be ensured to a maximum extent, thereby avoiding a severe CSI report performance loss caused by deletion from the CSI part 2.

Figure 5:
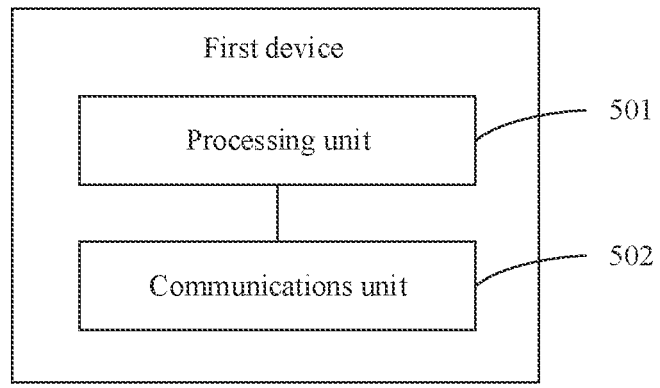
FIG. 5 is another structural block diagram of a first device according to an embodiment of the present invention.

When each function module is obtained through division based on each corresponding function, FIG. 5 is a possible schematic structural diagram of the first device in the foregoing embodiment. As shown in FIG. 5, the first device includes a processing unit 501 and a communications unit 502.

The processing unit 501 is configured to support the first device in performing step 301 or step 401 in the foregoing embodiment, and/or configured to perform another process of the technology described in this specification.

The communications unit 502 is configured to support the first device in performing step 302 or step 402 in the foregoing embodiment, and/or configured to perform another process of the technology described in this specification.

It should be noted that all related content of the steps in the foregoing method embodiments may be cited in function descriptions of corresponding function modules. Details are not described herein again.

Figure 6:
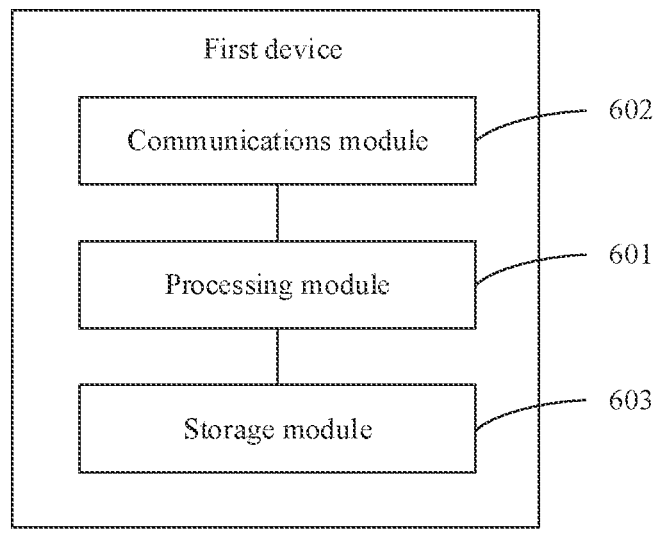
FIG. 6 is another structural block diagram of a first device according to an embodiment of the present invention.

For example, when an integrated unit is used, FIG. 6 is a schematic structural diagram of a first device according to an embodiment of this application. In FIG. 6, the first device includes a processing module 601 and a communications module 602. The processing module 601 is configured to control and manage actions of the first device, for example, perform the step performed by the foregoing processing unit 501, and/or configured to perform another process of the technology described in this specification. The communications module 602 is configured to perform the step performed by the foregoing communications unit 502, and support interaction between the first device and another device, for example, interaction between the first device and a second device. As shown in FIG. 6, the first device may further include a storage module 603. The storage module 603 is configured to store program code and data of the first device.

When the processing module 601 is a processor, the communications module 602 is a transceiver, and the storage module 603 is a memory, the first device is the first device shown in FIG. 2.

Figure 7:
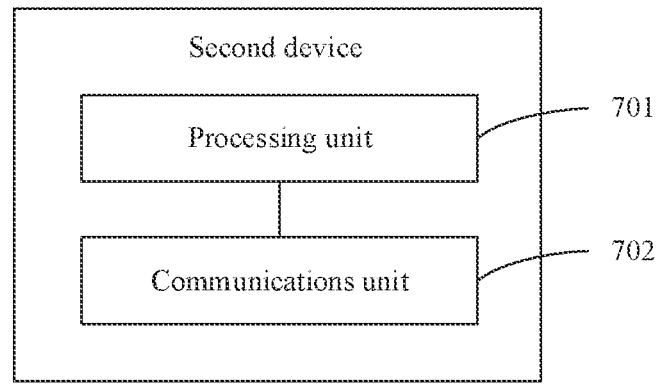
FIG. 7 is a structural block diagram of a second device according to an embodiment of the present invention.

When each function module is obtained through division based on each corresponding function, FIG. 7 is a possible schematic structural diagram of the second device in the foregoing embodiment. As shown in FIG. 7, the second device includes a processing unit 701 and a communications unit 702.

The communications unit 702 is configured to support the second device in receiving a CSI report from a first device, and/or configured to perform another process of the technology described in this specification.

The processing unit 701 is configured to support the second device in determining a precoding matrix based on the received CSI report, and precode a transmit signal based on the precoding matrix, and/or configured to perform another process of the technology described in this specification.

It should be noted that all related content of the steps in the foregoing method embodiments may be cited in function descriptions of corresponding function modules. Details are not described herein again.

Figure 8:
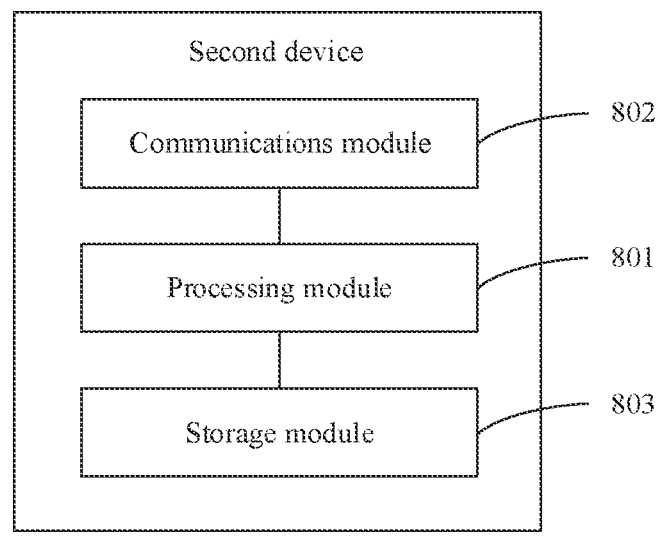
FIG. 8 is another structural block diagram of a second device according to an embodiment of the present invention.

For example, when an integrated unit is used, FIG. 8 is a schematic structural diagram of a second device according to an embodiment of this application. In FIG. 8, the second device includes a processing module 801 and a communications module 802. The processing module 801 is configured to control and manage actions of the second device, for example, perform the steps performed by the foregoing processing unit 701, and/or configured to perform another process of the technology described in this specification. The communications module 802 is configured to perform the step performed by the foregoing communications unit 702, and support interaction between the second device and another device, for example, interaction between the second device and the first device. As shown in FIG. 8, the second device may further include a storage module 803. The storage module 803 is configured to store program code and data of the second device.

Figure 9:
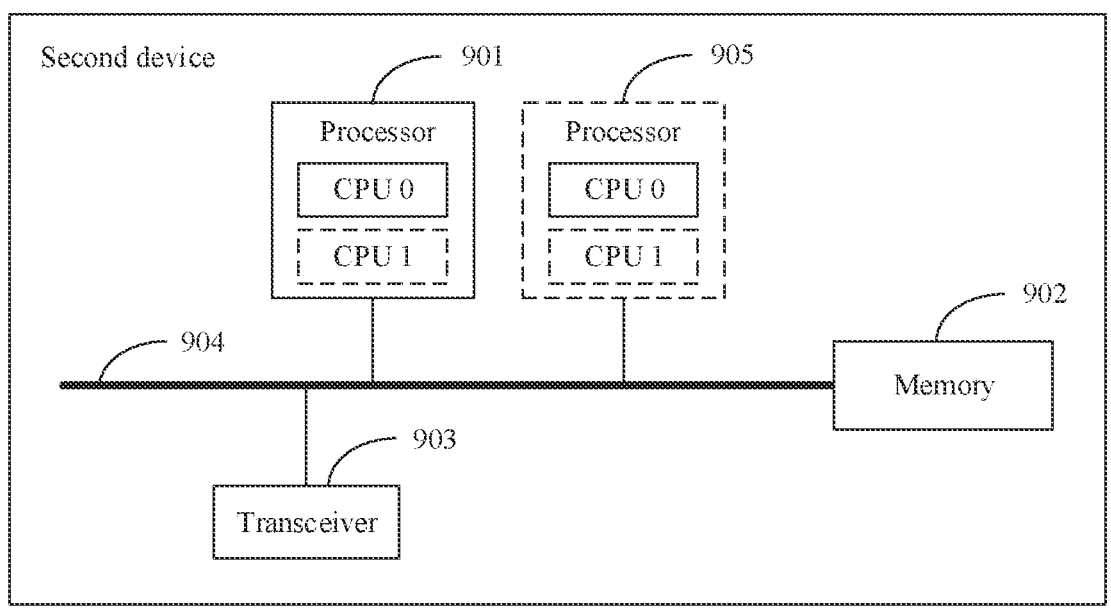
FIG. 9 is another structural block diagram of a second device according to an embodiment of the present invention.

When the processing module 801 is a processor, the communications module 802 is a transceiver, and the storage module 803 is a memory, the second device is a second device shown in FIG. 9.

The following describes components of the second device in detail with reference to FIG. 9.

A processor 901 is a control center of the second device, and may be one processor or may be a collective name of a plurality of processing elements. For example, the processor 901 is a central processing unit (central processing unit, CPU) or an application-specific integrated circuit (Application Specific Integrated Circuit, ASIC), or is configured as one or more integrated circuits implementing the embodiments of the present invention, for example, one or more microprocessors (digital signal processor, DSP) or one or more field programmable gate arrays (Field Programmable Gate Array, FPGA).

The processor 901 may run or execute a software program stored in a memory 902, and invoke data stored in the memory 902, to perform various functions of the second device.

During specific implementation, in an embodiment, the processor 901 may include one or more CPUs, for example, a CPU 0 and a CPU 1 in FIG. 9.

During specific implementation, in an embodiment, the second device may include a plurality of processors, for example, the processor 901 and a processor 905 shown in FIG. 9. Each of the processors may be a single-core processor (single-CPU) or may be a multi-core processor (multi-CPU). The processor herein may be one or more devices, circuits, and/or processing cores configured to process data (for example, a computer program instruction).

The memory 902 may be a read-only memory (read-only memory. ROM) or another type of static storage second device that can store static information and a static instruction, or may be a random access memory (random access memory, RAM) or another type of dynamic storage second device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, or the like), a magnetic disk storage medium or another magnetic storage second device, or any other medium that can be configured to carry or store expected program code in a form of instructions or a data structure and that can be accessed by a computer. This is not limited thereto. The memory 902 may exist independently and is connected to the processor 901 by using a communications bus 904. Alternatively, the memory 902 may be integrated with the processor 901.

The memory 902 is configured to store a software program for executing the solutions of the present invention, and the processor 901 controls the execution.

The transceiver 903 is configured to communicate with the second device. The transceiver 903 may be an antenna array of the second device. Certainly, the transceiver 903 may be further configured to communicate with a communications network, such as the Ethernet, a radio access network (radio access network. RAN), or a wireless local area network (Wireless Local Area Networks, WLAN). The transceiver 903 may include a receiving unit for implementing a receiving function and a sending unit for implementing a sending function.

The communications bus 904 may be an industry standard architecture (industry Standard Architecture, ISA) bus, a peripheral second device interconnect (Peripheral Component, PCI) bus, an extended industry standard architecture (Extended Industry Standard Architecture, EISA) bus, or the like. The bus 904 may be classified into an address bus, a data bus, a control bus, and the like. For ease of representation, only one thick line is used to represent the bus in FIG. 9, but this does not mean that there is only one bus or only one type of bus.

The structure of the second device shown in FIG. 9 does not constitute a limitation on the second device, and the second device may include more or fewer components than those shown in the figure, or combine some components, or have different component arrangements.

The foregoing descriptions about implementations allow a person skilled in the art to understand that, for ease of brief description, division of the foregoing function modules is used as an example for description. During actual application, the foregoing functions may be allocated to different modules and implemented based on a requirement. In other words, an inner structure of a database access apparatus is divided into different function modules to implement all or some of the functions described above.

In the several embodiments provided in this application, it should be understood that the disclosed database access apparatus and method may be implemented in another manner. For example, the described database access apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the database access apparatuses or units may be implemented in electrical, mechanical, or other forms.

The units described as separate parts may or may not be physically separate, and parts displayed as units may be one or more physical units, in other words, may be located in one place, or may be distributed on different places. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, for example, a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
   determining, by a first device, a first channel state information (CSI) report based on a precoding matrix type, wherein the precoding matrix type is a compressed-type, the first CSI report is a compressed-type CSI report, the first CSI report comprises a CSI part 1 and a CSI part 2, the CSI part 1 indicates a number of bits of the CSI part 2, the CSI part 2 indicates wideband precoding matrix indicator (PMI) information, the wideband PMI information indicates at least one of an oversampling factor of a preset orthogonal beam vector or an index of the preset orthogonal beam vector, and the preset orthogonal beam vector is a spatial-domain orthogonal basis vector selected by the first device from a spatial-domain basis vector set; and
   sending, by the first device, the first CSI report to a second device.

2. The method according to claim 1, wherein the method further comprises:
   determining, by the first device, a combination coefficient set based on the precoding matrix type, wherein the combination coefficient set comprises at least one combination coefficient, and the at least one combination coefficient comprises an amplitude coefficient and a phase coefficient.

3. The method according to claim 2, wherein the CSI part 1 comprises a combination coefficient quantity indication field, and the combination coefficient quantity indication field is a first value or a second value, wherein the first value is a quantity of combination coefficients whose amplitude coefficients are zero in the combination coefficient set or a quantity of combination coefficients whose amplitude coefficients are non-zero in the combination coefficient set, and the second value is a quantity of combination coefficients corresponding to the preset orthogonal beam vector.

4. The method according to claim 3, wherein
   the CSI part 2 comprises a wideband PMI information field $X_1$ and a PMT information field $X_2$, wherein
   the wideband PMI information field $X_1$ comprises information of a selected oversampling rotation factor of a spatial-domain beam, selection information of a spatial-domain beam vector, and selection information of a strongest combination coefficient corresponding to each spatial layer; and
   the PMI information field $X_2$ comprises a combination coefficient information field corresponding to all preset orthogonal beam vectors at each spatial layer in each spatial layer group, a non-zero combination coefficient index corresponding to each spatial layer, and a frequency-domain basis vector index corresponding to each spatial layer, wherein the combination coefficient information field indicates Q combination coefficients, and the Q combination coefficients comprise combination coefficient amplitude quantized values corresponding to 2L beam vectors at each spatial layer and combination coefficient phase quantized values corresponding to 2L beam vectors at each spatial layer and L is a quantity that is of spatial-domain beam vectors selected for each spatial layer.

5. The method according to claim 4, wherein the combination coefficient information field comprises a first combination coefficient information field and a second combination coefficient information field, wherein the first combination coefficient information field comprises $\lfloor Q/2 \rfloor$ combination coefficients in the Q combination coefficients, and the second combination coefficient information field comprises (Q−$\lfloor Q/2 \rfloor$) combination coefficients in the Q combination coefficients other than the $\lfloor Q/2 \rfloor$ combination coefficients.

6. The method according to claim 4, wherein a priority of the wideband PMI information field is higher than a priority of the combination coefficient information field; and a smaller number of a CSI report indicates a higher priority of a combination coefficient information field in the CSI report.

7. An apparatus, comprising at least one processor, one or more memories coupled to the at least one processor, and storing programming instructions for execution by the at least one processor to cause the apparatus to:

determine a first channel state information (CSI) report based on a precoding matrix type, wherein the precoding matrix type is a compressed-type, the first CSI report is a compressed-type CSI report, the first CST report comprises a CSI part 1 and a CSI part 2, the CSI part 1 indicates a number of bits of the CSI part 2, the CST part 2 indicates wideband precoding matrix indicator (PMI) information, the wideband PMI information indicates at least one of an oversampling factor of a preset orthogonal beam vector or an index of the preset orthogonal beam vector, and the preset orthogonal beam vector is a spatial-domain orthogonal basis vector selected by a first device from a spatial-domain basis vector set; and send the first CSI report to a second device.

8. The apparatus according to claim 7, wherein the programming instructions for execution by the at least one processor to cause the apparatus to:

determine a combination coefficient set based on the precoding matrix type, wherein the combination coefficient set comprises at least one combination coefficient, and the at least one combination coefficient comprises an amplitude coefficient and a phase coefficient.

9. The apparatus according to claim 8, wherein the CSI part 1 comprises a combination coefficient quantity indication field, and the combination coefficient quantity indication field is a first value or a second value, wherein the first value is a quantity of combination coefficients whose amplitude coefficients are zero in the combination coefficient set or a quantity of combination coefficients whose amplitude coefficients are non-zero in the combination coefficient set, and the second value is a quantity of combination coefficients corresponding to the preset orthogonal beam vector.

10. The apparatus according to claim 9, wherein the CSI part 2 comprises a wideband PMI information field $X_1$ and a PMI information field $X_2$, wherein the wideband PMI information field $X_1$ comprises information of a selected oversampling rotation factor of a spatial-domain beam, selection information of a spatial-domain beam vector, and selection information of a strongest combination coefficient corresponding to each spatial layer; and the PMI information field $X_2$ comprises a combination coefficient information field corresponding to all preset orthogonal beam vectors at each spatial layer in each spatial layer group, a non-zero combination coefficient index corresponding to each spatial layer, and a frequency-domain basis vector index corresponding to each spatial layer, wherein the combination coefficient information field indicates Q combination coefficients, and the Q combination coefficients comprise combination coefficient amplitude quantized values corresponding to 2L beam vectors at each spatial layer and combination coefficient phase quantized values corresponding to 2L beam vectors at each spatial layer and L is a quantity that is of spatial-domain beam vectors selected for each spatial layer.

11. The apparatus according to claim 10, wherein the combination coefficient information field comprises a first combination coefficient information field and a second combination coefficient information field, wherein the first combination coefficient information field comprises $\lfloor Q/2 \rfloor$ combination coefficients in the Q combination coefficients, and the second combination coefficient information field comprises (Q−$\lfloor Q/2 \rfloor$) combination coefficients in the Q combination coefficients other than the $\lfloor Q/2 \rfloor$ combination coefficients.

12. The apparatus according to claim 10, wherein a priority of the wideband PMI information field is higher than a priority of the combination coefficient information field; and a smaller number of a CSI report indicates a higher priority of a combination coefficient information field in the CSI report.

13. An apparatus, comprising at least one processor, one or more memories coupled to the at least one processor, and storing programming instructions for execution by the at least one processor to cause the apparatus to:

receive a first channel state information (CSI) report from a first device, wherein the first CSI report is a compressed-type CSI report, the first CSI report comprises a CSI part 1 and a CSI part 2, the CSI part 1 indicates a number of bits of the CSI part 2, the CSI part 2 indicates wideband precoding matrix indicator (PMI) information, the wideband PMI information indicates at least one of an oversampling factor of a preset orthogonal beam vector or an index of the preset orthogonal beam vector, and the preset orthogonal beam vector is a spatial-domain orthogonal basis vector selected by the first device from a spatial-domain basis vector set;

determine based on the first CSI report, a precoding matrix; and precode a transmit signal based on the precoding matrix.

14. The apparatus according to claim 13, wherein the CSI part 1 comprises a combination coefficient quantity indication field, and the combination coefficient quantity indication field is a first value or a second value, wherein the first value is a quantity of combination coefficients whose amplitude coefficients are zero in a combination coefficient set or a quantity of combination coefficients whose amplitude coefficients are non-zero in the combination coefficient set, and the second value is a quantity of combination coefficients corresponding to the preset orthogonal beam vector.

15. The apparatus according to claim 14, wherein the CSI part 2 comprises a wideband PMI information field $X_1$ and a PMI information field $X_2$, wherein the wideband PMI information field $X_1$ comprises information of a selected oversampling rotation factor of a spatial-domain beam, selection information of a spatial-domain beam vector, and selection information of a strongest combination coefficient corresponding to each spatial layer; and the PMI information field $X_2$ comprises a combination coefficient information field corresponding to all preset orthogonal beam vectors at each spatial layer in each spatial layer group, a non-zero combination coefficient index corresponding to each spatial layer, and a frequency-domain basis vector index corresponding to each spatial layer, wherein the combination coefficient information field indicates Q combination coefficients, and the Q combination coefficients comprise combination coefficient amplitude quantized values corresponding to 2L beam vectors at each spatial layer and combination coefficient phase quantized values corresponding to 2L beam vectors at each spatial layer and L is a quantity that is of spatial-domain beam vectors selected for each spatial layer.

16. The apparatus according to claim 15, wherein the combination coefficient information field comprises a first combination coefficient information field and a second combination coefficient information field, wherein the first combination coefficient information field comprises $\lfloor Q/2 \rfloor$ combination coefficients in the Q combination coefficients, and the second combination coefficient information field comprises $(Q-\lfloor Q/2 \rfloor)$ combination coefficients in the Q combination coefficients other than the $\lfloor Q/2 \rfloor$ combination coefficients.

17. The apparatus according to claim 15, wherein a priority of the wideband information field is higher than a priority of the combination coefficient information field; and a smaller number of a CSI report indicates a higher priority of a combination coefficient information field in the CSI report.

18. A communication method, comprising:

receiving, by a second device, a first channel state information (CSI) report from a first device, wherein the first CSI report is a compressed-type CSI report, the first CSI report comprises a CSI part 1 and a CSI part 2; the CSI part 1 indicates a number of bits of the CSI part 2, the CSI part 2 indicates wideband precoding matrix indicator (PMT) information, the wideband PMI information indicates at least one of an oversampling factor of a preset orthogonal beam vector or an index of the preset orthogonal beam vector, and the preset orthogonal beam vector is a spatial-domain orthogonal basis vector selected by the first device from a spatial-domain basis vector set;

determining, by the second device, based on the first CSI report, a precoding matrix; and precoding, by the second device, a transmit signal based on the precoding matrix.

19. The method according to claim 18, wherein the CSI part 1 comprises a combination coefficient quantity indication field, and the combination coefficient quantity indication field is a first value or a second value, wherein the first value is a quantity of combination coefficients whose amplitude coefficients are zero in a combination coefficient set or a quantity of combination coefficients whose amplitude coefficients are non-zero in the combination coefficient set, and the second value is a quantity of combination coefficients corresponding to the preset orthogonal beam vector.

20. The method according to claim 19, wherein the CSI part 2 comprises a wideband PMI information field $X_1$ and a PMI information field $X_2$, wherein the wideband PMI information field $X_1$ comprises information of a selected oversampling rotation factor of a spatial-domain beam, selection information of a spatial-domain beam vector, and selection information of a strongest combination coefficient corresponding to each spatial layer; and the PMI information field $X_2$ comprises a combination coefficient information field corresponding to all preset orthogonal beam vectors at each spatial layer in each spatial layer group, a non-zero combination coefficient index corresponding to each spatial layer, and a frequency-domain basis vector index corresponding to each spatial layer, wherein the combination coefficient information field indicates Q combination coefficients, and the Q combination coefficients comprise combination coefficient amplitude quantized values corresponding to 2L beam vectors at each spatial layer and combination coefficient phase quantized values corresponding to 2L beam vectors at each spatial layer and L is a quantity that is of spatial-domain beam vectors selected for each spatial layer.

21. The method according to claim 20, wherein the combination coefficient information field comprises a first combination coefficient information field and a second combination coefficient information field, wherein the first combination coefficient information field comprises $\lfloor Q/2 \rfloor$ combination coefficients in the Q combination coefficients, and the second combination coefficient information field comprises $(Q-\lfloor Q/2 \rfloor)$ combination coefficients in the Q combination coefficients other than the $\lfloor Q/2 \rfloor$ combination coefficients.

22. The method according to claim 20, wherein a priority of the wideband PMI information field is higher than a priority of the combination coefficient information field; and a smaller number of a CSI report indicates a higher priority of a combination coefficient information field in the CSI report.

* * * * *

UNITED STATES PATENT AND TRADEMARK OFFICE
CERTIFICATE OF CORRECTION

PATENT NO. : 11,424,803 B2  
APPLICATION NO. : 17/349007  
DATED : August 23, 2022  
INVENTOR(S) : Xiang Gao, Kunpeng Liu and Ruiqi Zhang Page 1 of 1

It is certified that error appears in the above-identified patent and that said Letters Patent is hereby corrected as shown below:

In the Claims

On Column 68 Line 48, In Claim 4, delete "PMT" and insert -- PMI --.

On Column 69 Line 26, In Claim 7, delete "CST" and insert -- CSI --.

On Column 69 Line 29, In Claim 7, delete "CST" and insert -- CSI --.

On Column 71 Line 30, In Claim 17, after "wideband" insert -- PMI --.

On Column 71 Line 39, In Claim 18, delete "2;" and insert -- 2, --.

On Column 71 Line 42, In Claim 18, delete "(PMT)" and insert -- (PMI) --.

Signed and Sealed this  
Twenty-second Day of November, 2022

Katherine Kelly Vidal  
*Director of the United States Patent and Trademark Office*